United States Patent
Baker et al.

(10) Patent No.: US 11,407,679 B2
(45) Date of Patent: Aug. 9, 2022

(54) LOW CRYSTALLINITY GLASS-CERAMICS

(71) Applicant: CORNING INCORPORATED, Corning, NY (US)

(72) Inventors: David Eugene Baker, Bath, NY (US); Matthew John Dejneka, Corning, NY (US); Indrajit Dutta, Horseheads, NY (US); Robert Michael Morena, Lindley, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/834,187

(22) Filed: Mar. 30, 2020

(65) Prior Publication Data

US 2020/0223745 A1 Jul. 16, 2020

Related U.S. Application Data

(60) Division of application No. 15/880,030, filed on Jan. 25, 2018, now Pat. No. 10,604,441, which is a (Continued)

(51) Int. Cl.
 *C03C 10/00* (2006.01)
 *C03C 21/00* (2006.01)
 (Continued)

(52) U.S. Cl.
 CPC .......... *C03C 10/0054* (2013.01); *C03C 3/091* (2013.01); *C03C 3/093* (2013.01); (Continued)

(58) Field of Classification Search
 CPC . C03C 10/00; C03C 10/0072; C03C 10/0081; Y10T 428/315
 See application file for complete search history.

(56) References Cited

U.S. PATENT DOCUMENTS

| 3,197,903 A | 8/1965 | Walley |
| 4,009,015 A | 2/1977 | McCollister |

(Continued)

FOREIGN PATENT DOCUMENTS

| CA | 2811187 A1 | 6/2012 |
| CN | 102491641 A | 6/2012 |

(Continued)

OTHER PUBLICATIONS

Japanese Patent Application No. 2019-178902, Office Action dated Oct. 14, 2020, 8 pages (4 pages of English Translation and 4 pages of Original Document); Japanese Patent Office.

(Continued)

*Primary Examiner* — Karl E Group

(57) ABSTRACT

Embodiments of the present disclosure pertain to crystallizable glasses and glass-ceramics that exhibit a black color and are opaque. In one or more embodiments, the crystallizable glasses and glass-ceramics include a precursor glass composition that exhibits a liquidus viscosity of greater than about 20 kPa*s. The glass-ceramics exhibit less than about 20 wt % of one or more crystalline phases, which can include a plurality of crystallites in the $Fe_2O_3$—$TiO_2$—$MgO$ system and an area fraction of less than about 15%. Exemplary compositions used in the crystallizable glasses and glass-ceramics include, in mol %, $SiO_2$ in the range from about 50 to about 76, $Al_2O_3$ in the range from about 4 to about 25, $P_2O_5+B_2O_3$ in the range from about 0 to about 14, $R_2O$ in the range from about 2 to about 20, one or more nucleating agents in the range from about 0 to about 5, and RO in the range from about 0 to about 20.

22 Claims, 36 Drawing Sheets

Related U.S. Application Data continuation of application No. 14/623,674, filed on Feb. 17, 2015, now Pat. No. 9,878,940.

(60) Provisional application No. 61/942,749, filed on Feb. 21, 2014.

(51) Int. Cl.
| | |
|---|---|
| *C03C 4/02* | (2006.01) |
| *C03C 3/091* | (2006.01) |
| *C03C 3/097* | (2006.01) |
| *C03C 3/093* | (2006.01) |

(52) U.S. Cl.
CPC ............... *C03C 3/097* (2013.01); *C03C 4/02* (2013.01); *C03C 10/0018* (2013.01); *C03C 10/0081* (2013.01); *C03C 21/002* (2013.01); *C03C 2204/00* (2013.01); *C03C 2204/04* (2013.01); *Y10T 428/315* (2015.01)

(56) References Cited

U.S. PATENT DOCUMENTS

| | | |
|---|---|---|
| 4,083,709 A | 4/1978 | Reade |
| 4,084,973 A | 4/1978 | Andrus et al. |
| 4,124,735 A | 11/1978 | O Horo |
| 4,126,437 A | 11/1978 | O Horo |
| 4,140,645 A | 2/1979 | Beall et al. |
| 4,506,956 A | 3/1985 | Dir |
| 5,220,442 A | 6/1993 | Dingwall et al. |
| 6,819,526 B2 | 11/2004 | Kataoka et al. |
| 8,232,218 B2 | 7/2012 | Dejneka et al. |
| 8,283,060 B2 | 10/2012 | Yagi et al. |
| 8,349,455 B2 | 1/2013 | Kondo et al. |
| 8,664,131 B2 | 3/2014 | Beall et al. |
| 8,772,684 B2 | 7/2014 | Isoda et al. |
| 8,852,764 B2 | 10/2014 | Yagi et al. |
| 9,139,469 B2 | 9/2015 | Comte et al. |
| 9,878,940 B2 | 1/2018 | Baker et al. |
| 2011/0135964 A1 | 6/2011 | Yagi et al. |
| 2011/0226231 A1 | 9/2011 | Siebers et al. |
| 2011/0273375 A1 | 11/2011 | Wilford |
| 2011/0293942 A1 | 12/2011 | Cornejo et al. |
| 2012/0135848 A1 | 5/2012 | Beall et al. |
| 2012/0196109 A1 | 8/2012 | Marjanovic et al. |
| 2013/0011695 A1 | 1/2013 | Yagi et al. |
| 2013/0128434 A1 | 5/2013 | Yamamoto et al. |
| 2013/0314642 A1 | 11/2013 | Timmerman et al. |
| 2014/0009370 A1 | 1/2014 | Weiss et al. |
| 2014/0023864 A1 | 1/2014 | Sumant et al. |
| 2014/0023865 A1 | 1/2014 | Comte et al. |
| 2014/0087194 A1 | 3/2014 | Dejneka et al. |
| 2014/0134397 A1 | 5/2014 | Amin et al. |
| 2014/0153234 A1 | 6/2014 | Knoche et al. |

FOREIGN PATENT DOCUMENTS

| | | |
|---|---|---|
| DE | 102012201600 A1 | 8/2013 |
| JP | 2001-148114 A | 5/2001 |
| JP | 2011-207626 A | 10/2011 |
| KR | 10-2010-0095274 A | 8/2010 |
| KR | 10-2011-0053322 A | 5/2011 |
| KR | 10-2012-0100624 A | 9/2012 |
| SU | 1662961 A1 | 7/1991 |
| WO | 2007069125 A2 | 6/2007 |
| WO | 2013011897 A1 | 1/2013 |
| WO | 2013174705 A1 | 11/2013 |
| WO | 2014002932 A1 | 1/2014 |
| WO | 2014035791 A2 | 3/2014 |
| WO | 2014052711 A1 | 4/2014 |
| WO | 2014095964 A1 | 6/2014 |

OTHER PUBLICATIONS

Aken et al., "Quantification of Ferrous/Ferric Ratios in Minerals: New Evaluation Schemes of Fe L23 Electron Energy-Loss Near-Edge Spectra," Phys. Chem. Minerals, vol. 29, pp. 188-200, 2002.
Boyd et al., "Glass," in Kirk-Othmer: Encyclopedia of Chemical Technology, John Wiley & Sons, 1980, p. 807.
Burns, "Intervalence Transitions in Mixed Valence Minerals of Iron and Titanium," Ann. Rev. Earth Plant. Sci. , vol. 9, pp. 345-383, 1981.
Callister, "Materials Science and Engineering (third edition)" pp. 130-132, John Wiley & Sons, New York, 1994.
Drbohlavova et al. "Preparation and Properties of Various Magnetic Nanoparticles," Sensors, vol. 9, pp. 2352-2362, 2009.
Duke et al., "Crystallization and chemical strenghtening of nepheline glass-ceramic.," J. Am. Ceram. Soc., vol. 50, pp. 67-74, 1967.
English Translation of JP2016553315 Office Action dated Oct. 24, 2018; 4 Pages; Japanese Patent Office.
G. Hunt, "Spectral Signitures of Particulate Minerals in the Visible and Near Infrared," Geophysics, vol. 42, pp. 501-513, 1977.
Garvie et al., "Ratios of Ferrous to Ferric Iron from Nanometre-sized Areas in Minerals," Nature, vol. 396, pp. 667-670, 1998.
Gulati et al., "Biaxial Strength of Ultrathin AMLCD Glass Substrates," in SID 02 Digest, 2002.
H?land et al., Glass-Ceramic Technology, Westerville, OH: The American Ceramic Society, 2002. pp. 97-98, 269-274.
International Search Report and Written Opinion of the International Searching Authority; PCT/US2015/016310; dated Apr. 23, 2015; 11 Pages; European Patent Office.
Nolet, "Optical absorption and Mossbauer spectra of Fe, Ti Silicate glasses" Journal of Non-Crystalline Solids 37(1980) pp. 99-110.
Park Jong Soo et al., "Alkali borosilicate glass by fly ash from a coal-fired power plant", Chemosphere, 2009, vol. 74, No. 2, p. 320.
Popovici et al., "Optimized Synthesis of the Elusive e-Fe2O3 Phase via Sol-Gel Chemistry," Chem. Mater., vol. 16, pp. 5542-5548, 2004.
Prichystal et al. "Invisible Display in Aluminum," Proc. SPIE 5713, Photon Processing in Microelectronics and Photonics IV, 215 (May 5, 2005); doi:10.1117/12.602043.
Schmidt et al., "Water solubility in phonolite melts: Influence of melt composition and temperature", Chemical Geology, 2008, vol. 256, No. 3-4, p. 259.
Schrader and G. Buttner, Z. "Eine neue Eisen(III)-oxidphase: e-Fe2O3" Anorg. Allg. Chem. , vol. 320, p. 220, 1963.
Stevens, "Forming," in Ceramics and Glasses, ASM International, 1991, pp. 394-401.
Taylor, "Liquidus Temperatures in the System FeO—Fe2O3—TiO2" J. Am. Ceram. Soc., vol. 46, No. 6, pp. 276-279, 1963.
"The solubility of H2O in phonolitic melts", American Mineralogist. vol. 82, Issue 5-6, pp. 549-556.
Tronc et al. "Structural and Magnetic Characterization of e-Fe2O3," J. of Solid State Chem., vol. 139, pp. 93-104, 1998.
Woermann et al., "Phase equilibria in the system MgO-Iron Oxide-TiO2 in air" Am. J. Sci., vol. 267A, pp. 463-479, 1969.
Zboril et al. "Iron(III) Oxides from Thermal Processes-Synthesis, Structural and Magnetic Properties, Mossbauer Spectroscopy Characterization, and Applications," Chem Mater., vol. 14, pp. 969-982, 2002.
Zhao et al., "Hierarchically nanostructured Fe3O4 microspheres and their novel microwave electromagnetic properties," Materials Letters, vol. 64, No. 3, pp. 457-459, 2010.

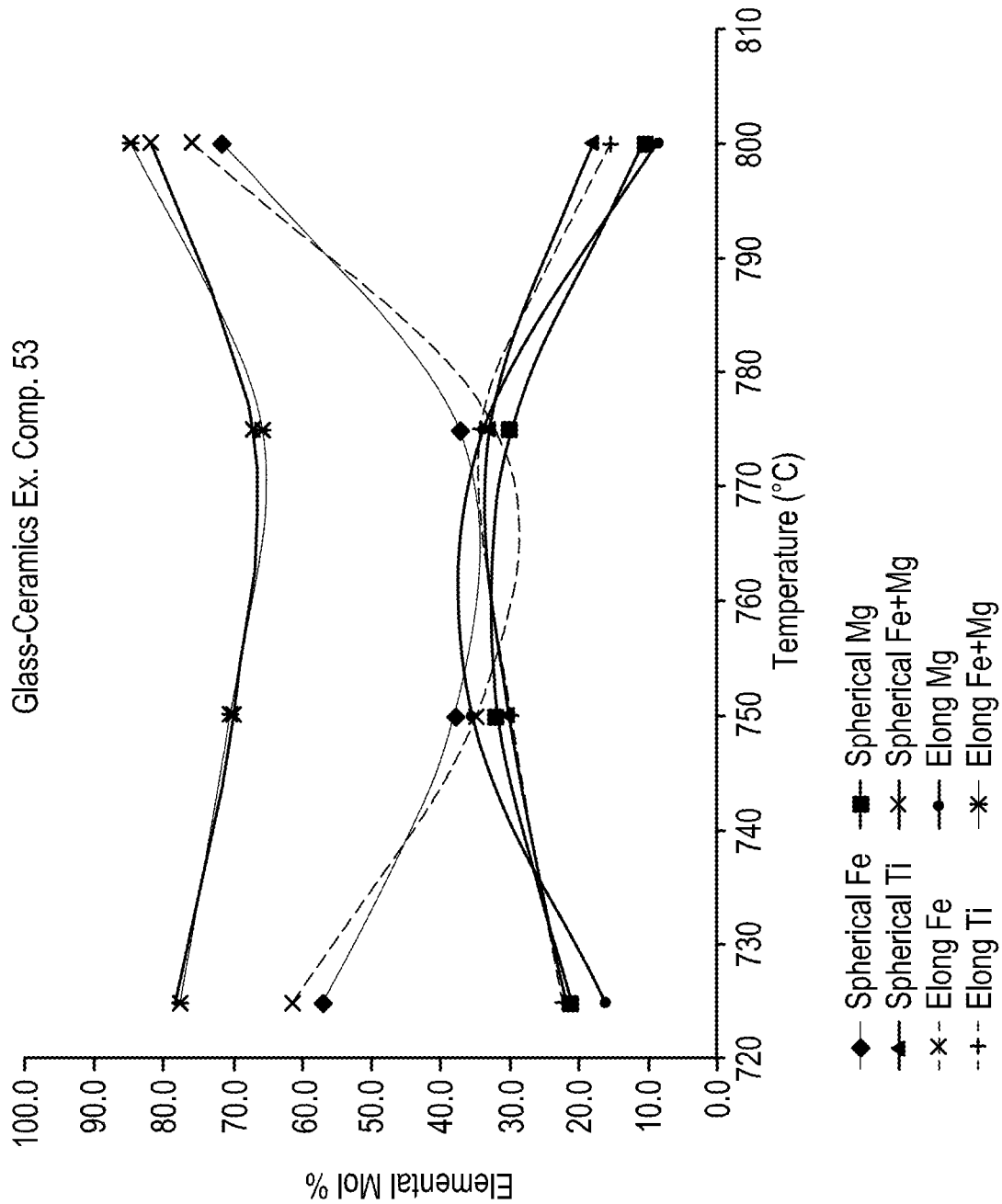

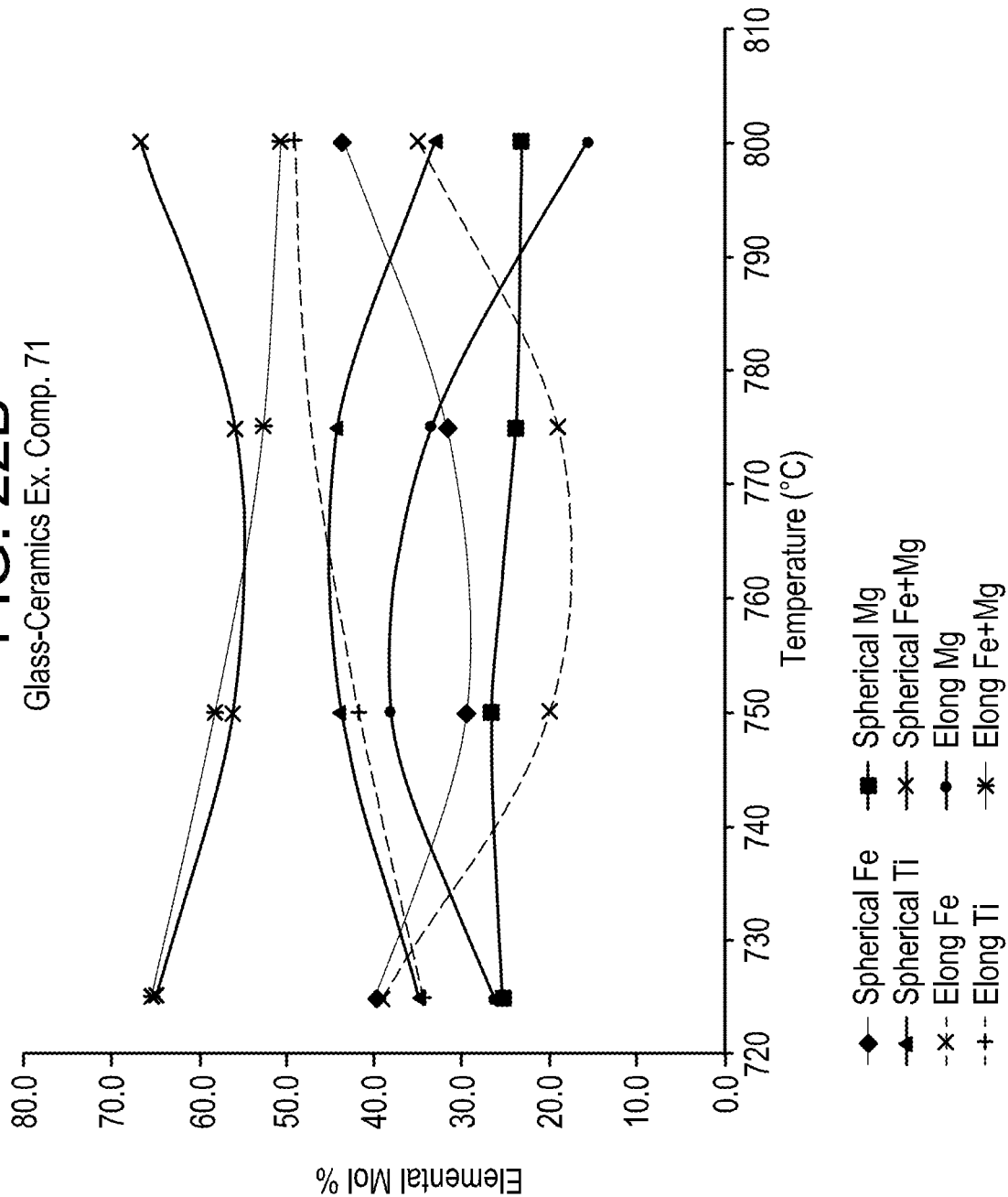

Glass-Ceramics Ex. Comp. 53 and Ex. Comp. 71
% Elongation
Aspect Ratio >1.41

Glass-Ceramics Ex. Comp. 53 and Ex. Comp. 71
Average Area Percent
ratio of area of particles to the total area of image

LOW CRYSTALLINITY GLASS-CERAMICS

CROSS-REFERENCE TO RELATED APPLICATIONS

This application is a divisional of U.S. application Ser. No. 15/880,030 filed on Jan. 25, 2018, which is a continuation of U.S. application Ser. No. 14/623,674 filed on Feb. 17, 2015, which claims the benefit of priority under 35 U.S.C. § 119 of U.S. Provisional Application Ser. No. 61/942,749 filed on Feb. 21, 2014 the content of which is relied upon and incorporated herein by reference in its entirety.

BACKGROUND

Aspects of this disclosure generally relate crystallizable glasses and glass-ceramics and processes for forming such crystallizable glasses and glass-ceramics. Specific aspects relate to crystallizable glasses exhibiting high liquidus viscosity and glass-ceramics exhibiting low crystallinity, which can be chemically strengthened.

Consumer electronic devices such as notebook computers, personal digital assistants (PDAs), portable navigation device (PNDs), media players, mobile phones, portable inventory devices (PIDs), etc. (frequently referred to as "portable computing devices") have converged while at the same time becoming small, light, and functionally more powerful. One factor contributing to the development and availability of such smaller devices is an ability to increase computational density and operating speed by ever decreasing electronic component sizes. However, the trend to smaller, lighter, and functionally more powerful electronic devices presents a continuing challenge regarding design of some components of the portable computing devices.

Components associated with the portable computing devices encountering particular design challenges include the enclosure or housing used to house the various internal/electronic components. This design challenge generally arises from two conflicting design goals—the desirability of making the enclosure or housing lighter and thinner, and the desirability of making the enclosure or housing stronger and more rigid. Lighter enclosures or housings, typically thin plastic structures with few fasteners, tend to be more flexible while having a tendency to buckle and bow as opposed to stronger and more rigid enclosure or housings, typically thicker plastic structures with more fasteners having more weight. Unfortunately, plastics are soft materials that are easily scratched and scuffed degrading their appearance.

Among known classes of materials are glass-ceramics that are used widely in various other applications and are much harder and more scratch resistant than polymers. Glass-ceramics are used widely in appliances (e.g., cooktops, ovens, dishwashers and refrigerators), cookware, and eating utensils, such as bowls, dinner plates, and the like. Transparent glass-ceramics are used in the production of oven and/or furnace windows, optical elements, mirror substrates, and the like. Glass-ceramics are typically made by thermally treating crystallizable glass compositions at pre-specified temperatures for pre-specified periods of time to nucleate and grow crystalline phases in a glass matrix. Two glass-ceramics based on the $SiO_2$—$Al_2O_3$—$Li_2O$ glass system comprise those having either β-quartz solid solution (β-quartz ss) as the predominant crystalline phase or β-spodumene solid solution (β-spodumene ss) as the predominant crystalline phase. These glass-ceramics are typically not formable by fusion forming techniques and, thus, have that forming limitation.

There exists a need for glass and glass-ceramic materials and technologies that provide improved choices for enclosures or housings of portable computing devices and for use in appliances.

SUMMARY

A first aspect of the present disclosure pertains to a glass-ceramic having a low crystallinity. In one or more embodiments, the glass-ceramic includes less than about 20 wt % of one or more crystalline phases. In one option, the one or more crystalline phases may include a solid solution of MgO, $TiO_2$, and $Fe_2O_3$. In another option, the one or more crystalline phases may include a plurality of crystallites in the $Fe_2O_3$—$TiO_2$—MgO system. In one or more examples, the crystallites may include MgO, $Fe_2O_3$, $TiO_2$, or combinations thereof. The crystallites may include MgO in an amount in the range from about 5 mol % to about 50 mol %, $Fe_2O_3$ in an amount in the range from about 15 mol % to about 65 mol %, and/or $TiO_2$ in an amount in the range from about 25 mol % to about 45 mol %. In some embodiments, the glass-ceramics can include $TiO_2$ and a ratio of $TiO_2$:$Fe_2O_3$ in the range from about 0.1 to about 3. In other embodiments, the glass-ceramics can include $TiO_2$ and a ratio of $TiO_2$:$Fe_2O_3$ of greater than about 2. In one example, the plurality of crystallites may include at least one of magnetite, pseudobrookite, and ε-$Fe_2O_3$. In one or more embodiments, the plurality of crystallites forms an area fraction of about 15% or less or about 10% or less.

In some embodiments, the glass-ceramic includes one or more ε-$Fe_2O_3$ crystallites. In some cases, the ε-$Fe_2O_3$ crystallites can include Mg2+, Fe2+ ions or a combination of Mg2+ and Fe2+ ions. In other embodiments, the one or more crystalline phases present the glass-ceramics can include a solid solution of ε-$Fe_2O_3$ and $MgTiO_3$.

The glass-ceramics according to one or more embodiments may exhibit a black and opaque color. In one or more embodiments, the glass-ceramics may exhibit a color presented in CIELAB color space coordinates for CIE illuminant D65 determined from reflectance spectra measurements using a spectrophotometer with SCE of the following ranges: L*=from about 14 to about 30, a*=from about −1 to about +3, and b*=from about −7 to about +3.

The glass-ceramic of one or more embodiments includes a precursor glass exhibiting a liquidus viscosity of greater than about 20 kPa*s or about 50 kPa*s or greater. In some embodiments, the precursor glass is substantially transparent and exhibits an average transmission of at least about 10% in the visible-to-near-IR spectrum in the wavelength range from about 375 nm to about 1000 nm. The composition of the glass-ceramics and/or precursor glass may include, in mol %: $SiO_2$ in the range from about 50 to about 76, $Al_2O_3$ in the range from about 4 to about 25, $P_2O_5$+$B_2O_3$ in the range from about 0 to about 14, $R_2O$ in the range from about 2 to about 20, one or more nucleating agents in the range from about 0 to about 5, and RO in the range from about 0 to about 20. Exemplary nucleating agents include $TiO_2$. The composition of the glass-ceramics and/or precursor glass can also include $Fe_2O_3$, on an oxide basis, in mol %, in an amount in the range from about 0 to about 5.

Another exemplary glass-ceramic and/or precursor glass composition may include, on an oxide basis, in mol %: $SiO_2$ in an amount in the range from about 58 to about 72, $Al_2O_3$ in an amount in the range from about 8 to about 20, $B_2O_3$ in an amount in the range from about 0 to about 12, $R_2O$ in an amount in the range from about 0 to about 20, RO in an amount in the range from about 0 to about 10, $SnO_2$ in an amount in the range from about 0 to about 0.5, $TiO_2$ in an amount in the range from about 0.25 to about 5, and $Fe_2O_3$ in an amount in the range from about 0.25 to about 5. The composition may optionally include one or more of the following compositional relationships: $R_2O$—$Al_2O_3$ in the range from about −2 to about 3; and $R_xO$—$Al_2O_3$ in the range from about −2 to about 5.

Yet another exemplary glass-ceramic and/or precursor glass composition may include, on an oxide basis, in mol %: $SiO_2$ in an amount in the range from about 62 to about 68, $Al_2O_3$ in an amount in the range from about 10 to about 14, $B_2O_3$ in an amount in the range from about 3 to about 10, $Li_2O$ in an amount in the range from about 0 to about 5, $Na_2O$ in an amount in the range from about 5 to about 18, MgO in an amount in the range from about 1 to about 3, CaO in an amount in the range from about 0 to about 2, $SnO_2$ in an amount in the range from about 0 to about 0.2, $TiO_2$ in an amount in the range from about 0.25 to about 5, and $Fe_2O_3$ in an amount in the range from about 0.25 to about 5. The composition may optionally include one or more of the following compositional relationships: $R_2O$—$Al_2O_3$ in the range from about −1 to about 1.5; and $R_xO$—$Al_2O_3$ in the range from about 0 to about 2.5.

The glass-ceramics described herein also exhibit improved mechanical properties. In one or more embodiments, the glass-ceramic may be chemically strengthened (e.g., by ion exchange process(es)). Such glass-ceramics may exhibit a compressive stress of at least about 200 MPa and a depth of compressive stress layer of at least about 15 µm. In one or more embodiments, the glass ceramics exhibit an average edge strength, as measured by 4—point bend of at least about 700 MPa. In other embodiments, the glass-ceramics exhibit an average flexural strength, as measured by ring-on-ring testing, of about 2000 N or greater. In yet other embodiments, the glass-ceramics exhibit an average flexural strength, as measured by abraded ring-on-ring testing, of about 1000 N or greater.

Numerous other aspects of embodiments, embodiments, features, and advantages of this disclosure will appear from the following description and the accompanying drawings. In the description and/or the accompanying drawings, reference is made to exemplary aspects and/or embodiments of this disclosure which can be applied individually or combined in any way with each other. Such aspects of embodiments and/or embodiments do not represent the full scope of this disclosure. Reference should therefore be made to the claims herein for interpreting the full scope of this disclosure. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a recitation in this disclosure of a range of from about 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of this disclosure will become apparent from the following description, the accompanying drawings, and the appended claims.

BRIEF DESCRIPTION OF THE DRAWINGS

The drawings referenced herein form a part of the specification. Features shown in the drawings are meant to be illustrative of some, but not all, embodiments of this disclosure, unless otherwise explicitly indicated, and implications to the contrary are otherwise not to be made.

FIG. 22A is a graph showing the elemental composition of the crystallites of glass-ceramics made from Example Composition 53;

FIG. 22B is a graph showing the elemental composition of the crystallites of glass-ceramics made from Example Composition 71;

DETAILED DESCRIPTION

Figure 1:
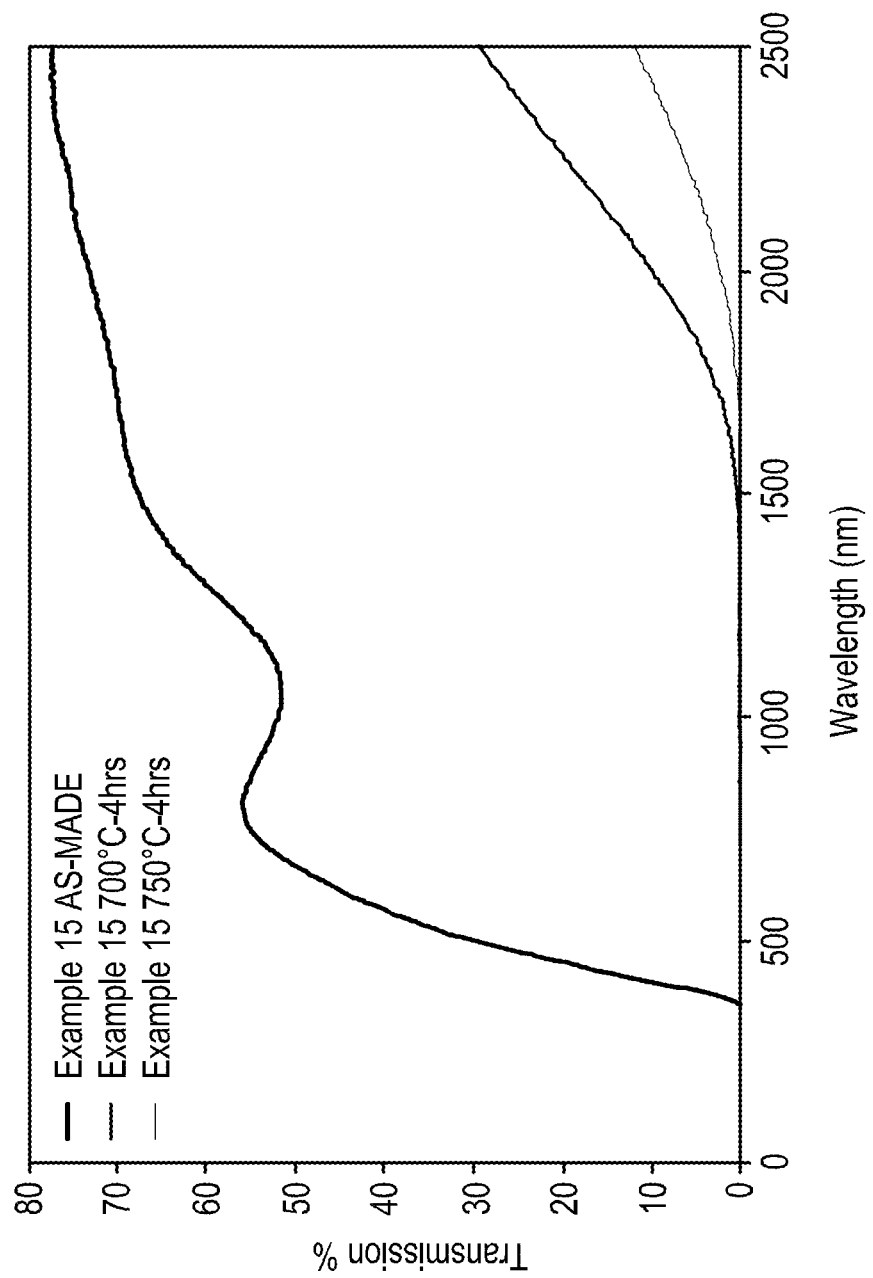
FIG. 1 shows comparisons of the transmission spectra for visible and infrared (IR) wavelengths obtained for glasses as-made and heat treated from Example Composition 15.

Reference will now be made in detail to the present preferred embodiment(s), examples of which are illustrated in the accompanying drawings. While these aspects of embodiments and/or embodiments are described in sufficient detail to enable those skilled in the art to practice this disclosure, it will nevertheless be understood that no limitation of the scope of this disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other aspects of embodiments and/or embodiments may be utilized, logical changes (e.g., without limitation, any one or more of chemical, compositional {e.g., without limitation, any one or more of chemicals, materials, . . . and the like}, electrical, electrochemical, electromechanical, electro-optical, mechanical, optical, physical, physiochemical, . . . and the like) and other changes may be made without departing from the spirit or scope of this disclosure.

Strong and opaque materials (often exhibiting a black color) are desirable for various applications. While known glass-ceramics have high strength and toughness, the liquidus viscosity of such materials is often too low to enable forming using fusion or slot draw methods. Alternative materials such as strengthened glasses provide high strength and scratch resistance and are transparent to visible, microwave, and radio frequency radiation; however such materials are not well suited for mobile device backs where the goal is to hide the interior workings of the device or appliance, yet allow wireless signals (e.g., cellular, WiFi, Bluetooth, etc.) to pass. Other alternative materials such as metals are tough, strong and opaque, but block wireless transmission and scratch easily. Thus, there is a need for strong, scratch resistant, opaque materials that are transparent to microwave and radio frequency radiation that are also economical to produce.

As mentioned above, strengthened glass ceramics provide good opacity and exhibit high retained strength and abraded strengths consistently above 1450 MPa, but the liquidus viscosity exhibited by these materials is often too low to enable pristine sheet formation via draw methods such as fusion or slot draw. To resolve this issue, often such materials are ground and polished after casting, pressing, or rolling, which adds additional processes steps and cost, especially for complex shapes (e.g., 3-dimensional shapes). Known glass-ceramic materials, such as β-spodumene glass-ceramics exhibit high liquidus viscosity (e.g., about 2 kPa*s), which is usually sufficient for forming by pressing, but is still an order of magnitude too low for fusion or slot drawing processes. Accordingly, the threshold liquidus viscosity for such processes is believed to about more than 20 kPa*s.

As high strength, scratch resistance and low loss in the radio and microwave portion of the spectrum were also desirable. Suitable glass-ceramics should be capable of being chemically strengthened, for example, by ion exchange processes.

To provide black, opaque materials, glass-ceramics exhibiting a crystalline phase with high absorption and low scattering across the visible are desired. Opacity is believed to be most efficiently achieved with a multiphase material so that both scattering and absorption work together to provide an intense color and the least transmission. Proper selection of the composition (i.e., of the precursor composition, crystallizable glasses and/or glass-ceramics) and oxidation states of the precipitated (or crystalline) phases in formed glass-ceramics can provide the most intense color and opacity. Moreover, to reduce scattering within the glass ceramics, which results in loss and/or change of color, the maximum allowable area fraction of the crystalline phase should be tailored. As used herein, the phrase "area fraction" means the percentage of an area of the glass-ceramic that includes crystallites. The area may be the surface area or an interior area having two-dimensions. The area size may be a minimum of about 1 inch by 1 inch.

In known materials, desirable color and opacity is often achieved empirically by changing the starting composition of the precursor composition and crystallizable glass, nucleating at 630° C. and ceramming at different temperatures in the range from about 675° C. to 850° C., without the exact knowledge regarding the composition of the crystallites in the crystalline phase, or the size and area fraction of such crystallites. It is known that if a glass is saturated in a particular phase, it can spontaneously precipitate that phase when cooled below the saturation temperature resulting in crystallization of that phase. As will be described herein, the crystallizable glasses and glass-ceramics described herein include crystallites having specific compositional limits and/or area fraction and thus exhibit desirable color and opacity. The compositions of the crystallizable glasses and glass-ceramics described herein are tailored to provide such color and opacity, as well as lower liquidus temperatures which enables a larger variety of forming options to be utilized (e.g., fusion and slot drawing).

The combination of opacity, color and high liquidus viscosity is difficult to be achieved. For black, opaque materials often include highly absorbing crystalline phases, whereas the opposite is desired for white, opaque materials. For white, opaque materials, the ideal crystalline phase exhibits minimal absorption and very high scattering. To achieve a deep rich black color, the chromophoric crystals should be as small as possible or index matched to the glass or glass phase in the glass-ceramics to prevent optical scattering, which would turn an otherwise black glass-ceramic to grey. The color intensity of the glass-ceramics can scale with the volume fraction of crystals; however, at high crystal concentrations when the crystalline components become the liquidus phase of the glass, the liquidus temperature will climb sharply causing the liquidus viscosity to plummet. Accordingly, simply increasing the area or volume fraction to achieve opacity or color can come at the expense of liquidus viscosity.

The crystallizable glasses described herein exhibit high liquidus viscosities and can be heat-treated to yield opaque, saturated black glass-ceramics with high strength. Accordingly, embodiments of the glass-ceramics described herein exhibit at least one of the following attributes: opacity, intense black color, high indentation threshold, and the capability of being formed and specifically cerammed at a high viscosity, and embodiments of the crystallizable glasses described herein exhibit at least one of the following attributes: high liquidus viscosity (e.g., greater than about 20 kPa*s) and transparency (sufficient to permit visual inspection for defects before ceramming).

Various aspects and/or embodiments of this disclosure relate to crystallizable glasses and glass-ceramics, which may be ion-exchangeable (hereinafter "IXable") or ion-exchanged (herein after "IX"). An IXable glass or glass-ceramic refers to a glass or glass-ceramic that can be subjected to an ion exchange surface treatment. The resulting glass or glass-ceramic may be referred to as an IX glass or glass-ceramic.

In one or more embodiments, crystallizable glasses having a composition, calculated on an oxide basis in percent by mole (mol %), including:
about 50-76 $SiO_2$;
about 4-25 $Al_2O_3$;
about 0-14 $P_2O_5+B_2O_3$;
about 0-33 $R_2O$;
about 0-5 of one or more nucleating agents; and
optionally, about 0-20 RO,
may be used to form the glass-ceramics described herein. Such composition may be used in a fusion forming process to form the glass-ceramics and any intermediate glass article.

In one or more embodiments, the amount of $SiO_2$ in the compositions of the crystallizable glasses and/or glass-ceramics may be, in mol %, in the range from about 50 to about 76, from about 50 to about 74, from about 50 to about 72, from about 50 to about 70, from about 50 to about 68, from about 50 to about 67, from about 53 to about 76, from about 53 to about 74, from about 53 to about 72, from about 53 to about 70, from about 53 to about 68, from about 53 to about 67, from about 56 to about 76, from about 56 to about 74, from about 56 to about 72, from about 56 to about 70, from about 56 to about 68, from about 56 to about 67, from about 58 to about 76, from about 58 to about 74, from about 58 to about 72, from about 58 to about 70, from about 58 to about 68, from about 58 to about 67, from about 62 to about 76, from about 62 to about 74, from about 62 to about 72, from about 62 to about 70, from about 62 to about 68, and all ranges and sub-ranges therebetween. $SiO_2$ can be the main constituent of the composition and, as such, can constitute a matrix of the glass in the crystallizable glass and/or the glass-ceramic. Also, $SiO_2$ can serve as a viscosity enhancer for aiding in a glass's formability while at the same time imparting chemical durability to the glass. Generally, $SiO_2$ can be present in amounts ranging from about 50 mol % up to about 76 mol %. When $SiO_2$ exceeds about 76 mol %, a glass's melting temperature can be impractically high for commercial melting technologies and/or forming technologies.

In some embodiments, the amount of $Al_2O_3$ in the compositions of the crystallizable glasses and/or glass-ceramics may be, in mol %, in the range from about 4 to about 25, from about 4 to about 20, from about 4 to about 15, from about 4 to about 10, from about 5 to about 25, from about 5 to about 20, from about 5 to about 15, from about 5 to about 10, from about 10 to about 25, from about 10 to about 20, from about 10 to about 18, from about 10 to about 15, from about 10 to about 14 or from about 8 to about 20, and all ranges and sub-ranges therebetween. In some aspects, $Al_2O_3$ can be present in amounts so as to impart a resistant to devitrification to crystallizable glasses while cooling from a liquid such as, for example, from about 4 mol % to about 25 mol %. When $Al_2O_3$ exceeds about 25 mol %, the resultant mullite liquidus makes it difficult to melt and form crystallizable glasses while $Al_2O_3$ below about 4 mol % can impart an insufficient level of resistant to devitrification to crystallizable glasses while cooling from a liquid.

The embodiments described herein may include $B_2O_3$, which may be present, in mol %, in the range from about 0 to about 12, from about 0 to about 10, from about 0 to about 8, from about 0 to about 6, from about 0.1 to about 12, from about 0.1 to about 10, from about 0.1 to about 8, from about 0.1 to about 6, from about 1 to about 12, from about 1 to about 10, from about 1 to about 8, from about 1 to about 6, from about 3 to about 12, from about 3 to about 10, from about 3 to about 8, or from about 3 to about 6, and all ranges and sub-ranges therebetween. In one or more embodiments, the compositions of the crystallizable glasses and/or glass-ceramics described herein may include a combined amount of $P_2O_5$ and $B_2O_3$ ($P_2O_5+B_2O_3$), in mol %, in the range from about 0 to about 14, 0 to about 12, from about 0 to about 10, from about 0 to about 8, from about 0 to about 6, from about 3 to about 14, from about 3 to about 12, from about 3 to about 10 and all ranges and sub-ranges therebetween. $P_2O_5$ and $B_2O_3$ may be included in the compositions because, at least in part, of their capability of forming charged species in a network of such composition. The charged species can interact with other cations in a manner so as to modify one or more properties of the resultant crystallizable glasses and/or glass-ceramics. When $P_2O_5+B_2O_3$ exceeds about 14 mol %, any benefits resulting from their additions might not increase.

In some embodiments the total amount of $R_2O$ in the compositions of the crystallizable glasses and/or glass-ceramics may be, in mol %, in the range from about 0 to about 33, from about 0 to about 25, from about 0 to about 20, from about 0.1 to about 33, from about 0.1 to about 25, from about 0.1 to about 20, from about 1 to about 33, from about 1 to about 25, from about 1 to about 20, from about 1, from about 4 to about 24 or from about 7 to about 20, and all ranges and sub-ranges therebetween. RO may be present in the compositions of the crystallizable glasses and/or glass-ceramics in an amount, in mol %, in the range from about 0 to about 20, from about 0 to about 15, from about 0 to about 10, from about 0 to about 8, from about 0 to about 5, from about 0.1 to about 20, from about 0.1 to about 15, from about 0.1 to about 10, from about 0.1 to about 8, or from about 0.1 to about 5 and all ranges and sub-ranges therebetween. $R_2O$ can modify the viscosity of the composition such that a crystallizable glass exhibiting a high liquidus viscosity can be provided, while at the same time reduce the melting temperature of the crystallizable glasses and/or enable shorter thermal treatments. Also, $R_2O$ can be used to modify viscosity of the resultant glass-ceramics. When $R_2O$ exceeds about 33 mol %, liquidus viscosity be impractically low for commercial melting technologies and/or forming technologies.

In some embodiments, the compositions of the crystallizable glasses and/or glass-ceramics may include the following compositional criteria: $R_2O+RO-Al_2O_3$ in the range from about −4 to about 10, from about −2 to about 8, −2 to about 5, from about −1 to about 5, or from about 0 to about 2.5, and all ranges and sub-ranges therebetween. In other instances, the compositions of the crystallizable glasses and/or glass-ceramics may include the following composition criteria: $R_2O-Al_2O_3$ in the range from about −8 to about 8, from about −4 to about 4, from about −2 to about 3, from about −2 to about 2 or from about −1 to about 1.5.

In some embodiments, $R_2O$ may include one or more of $Li_2O$, $Na_2O$, $L_2O$, $Rb_2O$, $Cs_2O$, $Cu_2O$, and $Ag_2O$. In one or more embodiments, $Cu_2O$ is formed by including CuO in the batch for the crystallizable glass. In specific embodiments, $R_2O$ may include one or more of $Li_2O$, $Na_2O$, $K_2O$, $Rb_2O$, $Cs_2O$, and $Cu_2O$. In a more specific embodiment, $R_2O$ may include one or more of $Li_2O$, $Na_2O$, and $K_2O$. In an even more specific embodiment, $R_2O$ may include one or more of $Na_2O$, and $K_2O$. Where $Li_2O$ is utilize, it may be present in an amount, in mol %, in the range from about 0 to about 20 or from about 0 to about 5. Where $Na_2O$ is included, it may be present in an amount, in mol %, in the range from about 0 to about 20 or from about 5 to about 18. Where $K_2O$ is included, it may be present in an amount, in mol %, in the range from about 0 to about 10 or from about 0 to about 5.

In some embodiments, RO can include one or more of MgO, CaO, SrO, BaO, and ZnO. In one or more specific embodiments, RO can include one or more of MgO, CaO, SrO, and BaO. In even more specific embodiments, RO can include one or more of MgO, CaO, and SrO. In one or more embodiments, MgO is present in an amount, in mol %, in the range from about 0 to about 10 or from about 1 to about 3. In one or more embodiments, CaO is present in an amount, in mol %, in the range from about 0 to about 10 or from about 0 to about 2.

In one or more embodiments, the compositions of the crystallizable glass and/or glass-ceramics may also include $Fe_2O_3$ in an amount, in mol %, in the range from about 0.25 to about 5 or from about 0.5 to about 2. The ratio of $Fe_2O_3/TiO_2$ and/or $Fe_2O_3/MgO$ may be specified. In some embodiments, the ratio may $Fe_2O_3/TiO_2$ may be about 2 or less, about 1.5 or less, or about 1.2 or less. In other embodiments, the ratio may $Fe_2O_3/MgO$ may be about 2 or less, about 1.8 or less, about 1.6 or less, about 1.5 or less, or about 1.2 or less.

The compositions of the crystallizable glass and/or glass-ceramics may also include one or more nucleating agents in an amount, in mol %, in the range from about 0 to about 5, from about 1 to about 4, or from about 1 to about 3, and all ranges and sub-ranges therebetween. In some embodiments, the one or more nucleating agents may include $TiO_2$ and/or $ZrO_2$. On an oxide basis in mol %, $TiO_2$ can be included in the compositions of the crystallizable glass and/or glass-ceramics in an amount up to about 5, up to about 4, up to about 3 and all ranges and sub-ranges therebetween. In specific embodiments, $TiO_2$ may be present, in mol %, in an amount in the range from about 0.25 to about 5 or from about 0.5 to about 2. Alternatively, calculated on an oxide basis in mol %, $ZrO_2$ can included in the compositions of the crystallizable glass and/or glass ceramics in an amount up to about 3, or up to about 2 and all ranges and sub-ranges therebetween. When the one or more nucleating agents include $TiO_2$ and $ZrO_2$, the combined amount thereof ($TiO_2+ZrO_2$) can include up to about 5 mol %, up to about 4 mol %, and in some cases, the amount of $ZrO_2$ in the combination can be up to about 3 mol % or up to about 2 mol %, all calculated on an oxide basis. The one or more nucleation agents are incorporated to facilitate nucleation and/or growth of at least crystalline phase and any desired one or more minor crystalline phases during thermal treatment (e.g., nucleation and/or crystallization) of the crystallizable glasses described herein. When an amount of one or more nucleation agents exceeds about 5 mol %, there can be a diminishing return on the benefit of adding more. In some embodiments, the inclusion of $TiO_2$ as a nucleation agent is desirable when the formation of one or more Ti-containing crystalline phases is desired. In other embodiments, the inclusion of $ZrO_2$ as a nucleation agent can increase nucleation efficiency. In some specific embodiments, a minimum mol % sum $[TiO_2+SnO_2]$ is in excess of 1 mole %. In some cases, effective amounts of this mol % sum $[TiO_2+SnO_2]$ are formulated as an ingredient of crystallizable glasses so that nucleation in an effective manner occurs and growth is achieved to a preselected and appropriate crystal phase assemblage. The amount of $TiO_2$ above 5 mole % can be undesirable as the resultant high rutile liquidus has the potential of increasing difficulties during shape forming of crystallizable glasses and/or glass-ceramics. In some embodiments, $SnO_2$ may be present in an amount, in mol %, in the range from about 0 to about 0.5 or from about 0 to about 0.2.

The glass-ceramics of one or more embodiments exhibit low crystallinity. For example, the glass-ceramics may include one or more crystalline phases, which can comprise about 20 wt % or less of the glass-ceramic. In some embodiments, the crystalline phase can be about 15 wt % or less, about 10 wt % or less, or about 5 wt % or less of the glass-ceramic. In one or more embodiments, the area fraction of the crystallites may be about 20% or less, 15% or less, 10% or less or even 8% or less. In some embodiments, the area fraction may be in the range from about 0.1% to about 20%, from about 0.1% to about 18%, from about 0.1% to about 16%, from about 0.1% from about 15%, from about 0.1% to about 14%, from about 0.1% to about 13%, from about 0.1% to about 12%, from about 0.1% to about 11%, from about 0.1% to about 10%, from about 0.1% to about 9%, from about 0.1% to about 8%, from about 0.1% to about 7%, from about 0.1% to about 6%, from about 0.1% to about 5%, and all ranges and sub-ranges therebetween.

The glass-ceramics disclosed herein may include one or more oxide crystalline phases. In some embodiments, one or more silicates are substantially absent from the one or more oxide crystalline phases. Exemplary oxide crystalline phases that may be present in these glass-ceramics include one or more of $TiO_2$, $FeO$, $Fe_2O_3$, $Fe_3O_4$, $MgO$, $Fe_xTi_yO_z$, $Fe_xTi_yMg_zO_a$ and $ZnO$ and, optionally, one or more transition metal oxides selected from one or more of V, Cr, Mn, Co, Ni, and Cu.

The glass-ceramics of one or more embodiments include one or more crystalline phases such as highly absorbing compounds in the $Fe_2O_3$—$TiO_2$—$MgO$ system (e.g., magnetite, pseudobrookite, and/or $\epsilon$-$Fe_2O_3$). In some embodiments, the glass-ceramics have crystallites that include $MgO$, $Fe_2O_3$, $TiO_2$ and/or combination thereof. Specific embodiments may include crystallites including $Mg^{2+}$, $Fe^{2+}+Fe^{3+}$, $Ti^{4+}$ oxides and combinations thereof.

In some embodiments, the crystallites can include, in mole percent, $MgO$ in an amount in the range from about 0 to about 60, from about 1 to about 60, from about 5 to about 60, from about 10 to about 60, from about 15 to about 60, from about 20 to about 60, from about 1 to about 55, from about 1 to about 50, from about 1 to about 45, from about 1 to about 40, from about 5 to about 50, from about 5 to about 45, from about 10 to about 40, and all ranges and sub-ranges therebetween.

In some instances, the crystallites can include, in mole percent, $Fe_2O_3$ in an amount in the range from about 5 to about 75, from about 5 to about 70, from about 5 to about 65, from about 5 to about 60, from about 10 to about 75, from about 15 to about 65, from about 15 to about 60, from about 15 to about 75, from about 15 to about 70, from about 15 to about 65, from about 15 to about 60, and all ranges and sub-ranges therebetween. In some instances, the crystallites can include $Fe_2O_3$ in an amount up to about 100 mole percent (e.g., from about 40 to 100 mole percent, from 50 to 100 mole percent, or from 60 to 100 mole percent). In such embodiments, the phases can include ferrites such as magnetite ($Fe_3O_4$), $CoFe_2O_4$, $MnFe_2O_4$, $NiFe_2O_4$, and other magnetic and non-magnetic ferrites.

In other instances, the crystallites can include, in mole percent, $TiO_2$ in an amount in the range from about 0 to 75, 5 to 75, 10 to about 75, from about 10 to about 70, from about 10 to about 65, from about 10 to about 60, from about 10 to about 55, from about 15 to about 75, from about 15 to about 70, from about 15 to about 65, from about 15 to about 60, from about 15 to about 55, from about 20 to about 75, from about 20 to about 70, from about 20 to about 65, from about 20 to about 60, from about 20 to about 55, and all ranges and sub-ranges therebetween.

In one or more embodiments, the glass-ceramics include a $\epsilon$-$Fe_2O_3$ phase that exhibits extensive solid solution (ss) between $Fe_2O_3$ and $MgTiO_3$. The blackness and opacity of these $\epsilon$-$Fe_2O_3$ glass-ceramics peaked at a ceram temperature of 750° C. where the $Fe^{2+}$ in the crystallites was maximized, resulting in peak $Fe^{2+}$—$Ti^{4+}$ charge transfer absorption. The liquidus viscosity of the crystallizable glasses described herein was also increased to about 100 kPa*s or more, by optimizing the composition of the crystallizable glasses and minimizing the amount of crystallinity, thereby enabling fusion-formability. These fusion-formable crystallizable glasses and glass-ceramics also exhibited high strength properties, after being strengthened (e.g., by ion exchange processes).

In any of these embodiments, the one or more crystalline phases can include crystallites having a size of at least 5 nm and less that about 300 nm, less that about 200 nm, less that about 100 nm, or less than about 50 nm, and all ranges and sub-ranges therebetween The minimum size of the crystallites may be about 5 nm or about 10 nm. As used herein, the term "size" with reference to crystallites includes the length of the longest dimension of the crystallites. In some cases, the size of the crystallites may be about 80 nm or less, about 70 nm or less, about 60 nm or less, about 50 nm or less. In some cases, the crystallites may have a size in the range from about 5 nm to about 100 nm or from about 5 nm to about 50 nm.

As described herein, some glass-ceramics are formulated to be capable of being subjected to an ion exchange treatment to provide IX glass-ceramics, which include least one surface under a compressive stress ($\sigma s$) of at least about 200 MPa or at least about 700 MPa. In some embodiments, the compressively stressed surface can extend into the glass-ceramic and have a depth of layer (DOL) of at least about 1 µm, at least about 20 µm, or at least about 60 µm. For example, where the IX glass-ceramics have a total thickness in the range from about 0.7 millimeter (mm) up to 5 mm, the DOL may be in the range from about 20 µm to about 150 µm, from about 30 µm to about 120 µm, from about 40 µm to about 100 µm. In specific instances, the total thickness of the IX glass-ceramics may be in the range from about 0.7 mm to about 2 mm, or from about 0.7 mm to 1.3 mm. In some embodiments, the glass-ceramics disclosed herein are subjected to ion exchange treatment to impart antimicrobial properties to the glass-ceramics and/or IX glass-ceramics described herein. In such embodiments, the glass-ceramics and/or IX glass-ceramics are immersed in a bath including antimicrobial components such as $AgNO_3$, and/or a Cu-containing salt such as $CuCl/CuSO_4$ and/or aqueous CuCl. A mixture of CuCl and KCl, a mixture of CuCl and NaCl, and/or a mixture of all three of CuCl, KCl and NaCl may also be utilized for a Cu-containing salt bath.

The IX glass-ceramics according to one or more embodiments, which have been subjected to an ion exchange treatment, exhibit a Vickers median crack initiation threshold of at least 5 kilograms force (kgf), at least 10 kgf, at least 15 kgf, or at least 20 kgf, and all range and sub-ranges therebetween. In one or more embodiments, the crystallizable glasses and/or glass-ceramics described herein exhibit high strength. For example, in some embodiments, the crystallizable glasses and/or glass-ceramics exhibit a flexural strength, as measured by ring on ring (ROR), in the range from about 2000 N to about 4000 N, from about 2000 N to about 3800 N, from about 2000 N to about 3600 N, from about 2000 N to about 3400 N, from about 2000 N to about 3200 N, from about 2000 to about 3000 N, from about 2100 N to about 3000 N, from about 2200 N to about 3000 N, from about 2300 N to about 3000 N, from about 2400 N to about 3000N, from about 2500 N to about 3000 N, from about 2600 N to about 3000 N, from about 2700 N to about 3000 N, from about 2750 N to about 3000 N, from about 2800 N to about 3000 N, from about 2850 N to about 3000 N, from about 2900 N to about 3000 N, and all ranges and sub-ranges therebetween. In specific embodiments, the crystallizable glasses and/or glass-ceramics exhibit a flexural strength, as measured by ring on ring (ROR), in the range from about 200 kgf to about 400 kgf break load. In even more specific embodiments, the crystallizable glasses and/or glass-ceramics exhibit a flexural strength, as measured by ring on ring (ROR), in the range from about 200 kgf to about 380 kgf, from about 200 kgf to about 360 kgf, from about 200 kgf to about 340 kgf, from about 200 kgf to about 320 kgf, from about 200 kgf to about 300 kgf, from about 210 kgf to about 400 kgf, from about 220 kgf to about 400 kgf, from about 230 kgf to about 400 kgf, from about 240 kgf to about 400 kgf, from about 250 kgf to about 400 kgf, from about 260 kgf to about 400 kgf, or from about 270 kgf to about 400 kgf break load, and all ranges and sub-ranges therebetween.

In one or more embodiments, the crystallizable glasses and/or glass-ceramics exhibit a flexural strength, as measured by abraded ring on ring (aROR) and after being abraded with about 1 ml of SiC particles at 34 kPa pressure, in the range from about 700 N to about 1500 N, from about 750 N to about 1500 N, from about 800 N to about 1500 N, from about 850 N to about 1500 N, from about 900 N to about 1500 N, from about 950 N to about 1500 N, from about 1000 to about 1500 N, from about 900 N to about 1450 N, from about 900 N to about 1400 N, from about 900 N to about 1350 N, from about 900 N to about 1300 N, from about 900 N to about 1250 N, from about 900 N to about 1200 N, from about 900 N to about 1150 N, from about 900 N to about 1100, and all ranges and sub-ranges therebetween. In other embodiments, the crystallizable glasses and/or glass-ceramics exhibit a flexural strength, as measured by abraded ring on ring (aROR) and after being abraded with about 1 ml of SiC particles at 34 kPa pressure, in the range from about 100 kgf to about 200 kgf, from about 100 kgf to about 190 kgf, from about 100 kgf to about 180 kgf, from about 100 kgf to about 170 kgf, from about 100 kgf to about 160 kgf, from about 100 kgf to about 150 kgf, from about 110 kgf to about 200 kgf, from about 120 kgf to about 200 kgf, from about 130 kgf to about 200 kgf, from about 140 kgf to about 200 kgf, and all ranges and sub-ranges therebetween.

In one or more embodiments, the crystallizable glasses and/or glass-ceramics exhibit an edge strength, as measured by 4 point bend, in the range from about 600 MPa to about 1000 MPa, from about 600 MPa to about 950 MPa, from about 600 MPa to about 900 MPa, from about 600 MPa to about 850 MPa, from about 600 MPa to about 800 MPa, from about 600 MPa to about 750 MPa, from about 600 MPa to about 700 MPa, from about 650 MPa to about 1000 MPa, from about 700 MPa to about 1000 MPa, from about 750 MPa to about 1000 MPa, from about 800 MPa to about 1000 MPa, and all ranges and sub-ranges therebetween.

In one or more embodiments, the glass-ceramics, whether IX or not, exhibit a color presented in CIELAB color space coordinates for CIE illuminant D65 determined from reflectance spectra measurements using a spectrophotometer with SCE with an a* coordinate from about −2 to about +8 and a b* coordinate from about −7 to about +20. In some embodiments, the a* coordinate exhibited by the glass-ceramics may be from about −3 to about +3, from about −2 to about +3, from about −1 to about +3, from about −2 to about +2 or from about −1 to about +1. The b* coordinate exhibited by the glass-ceramics may be from about −10 to about +10, from about −8 to about +8, from about −7 to about +7, from about −6 to about +6, from about −5 to about +5, from about −4 to about +4, from about −3 to about +3, from about −2 to about +3, from about −2 to about +2, from about −1 to about +1 and all ranges and sub-ranges therebetween. In some embodiments, the glass-ceramics may exhibit a L* coordinate that can approach dark colors and/or black while in other of these aspects the L* coordinate can approach light colors and/or white. For example for dark colors and/or black, presented in CIELAB color space coordinates for CIE illuminant D65 determined from reflectance spectra measurements using a spectrophotometer with SCE, the glass-ceramics may exhibit a L* coordinate from about 0 to about 30, from about 5 to about 30, from about 10 to about 30, from about 12 to about 30, from about 14 to about 30, from about 16 to about 30, from about 0 to about 20, from about 0 to about 15, from about 0 to about 10, from about 0 to about 5, or from about 0 to about 3.

The glass-ceramics described herein may also exhibit an average % transmission of at least one wavelength, $\lambda_T$, in an interval of wavelengths from about 390 nm to about 1000 nm of less than about 50, less than about 40, less than about 30, less than about 20 or less than about 10. In some embodiments, the % transmission of at least one wavelength, 4, in an interval of wavelengths from about 390 nm-2000 nm or from about 390 nm-1000 nm, may be less than about 5, less than about 4, less than about 3, less than about 2, less than about 1 and about 0. Alternatively, various glass-ceramic embodiments can have an average value in percent (%) of transmission over a λ interval from about 390 nm to about 1000 nm $$\left[ \sum_{390 \text{ nm}}^{2500 \text{ nm}} T_{avg}(\%) = \frac{1}{(2500 - 390 \text{ nm})} \sum_{390 \text{ nm}}^{2500 \text{ nm}} T_\lambda \{\%\} \right]$$

of less than about 50, less than about 40, less than about 30, less than about 20 or less than about 10. Over wavelengths from about 200 nm to about 780 nm, the transmission of some embodiments may be less than about 10%, or less than about 5%. In some instances, over a 100 nm wavelength segment along the wavelength range from about 200 nm to about 780 nm, the average transmission may be less than about 5%, less than 1%, or less than 0.1%. Such average % transmissions recited herein may be exhibited by glass-ceramics having a thickness of about 0.8 mm.

The glass-ceramics disclosed herein may exhibit certain dielectric properties. That is, in addition to such glass-ceramics having one or more preselected colors, which additionally might be tunable or have been tuned, for example, to impart one or more aesthetic colors, such glass-ceramics can possess advantageous dielectric properties. In one or more embodiments, the glass-ceramics may exhibit a loss tangent over a frequency ranging from about 0.5-3.0 GHz at about 25° C. and/or a dielectric constant over a frequency ranging from about 0.5-3.0 GHz at about 25° C.

Exemplary glass-ceramics may be formulated to be capable of being formed from a molten state using one or more of a float method, a slot draw method, and/or a fusion method and, optionally, subsequently a redraw method and/or roll out method. To that end, in some embodiments, crystallizable glasses have compositions formulated to form the glass-ceramics exhibit a liquidus viscosity ($\eta_{lqds}$) of at least about 20 kP, at least about 50 kP, at least about 100 kP, or at least about 150 kP, and all ranges and sub-ranges therebetween. In some embodiments, the liquidus viscosity of the composition may be in the range from about 20 kP to about 100000 kP, from about 50 kP to about 100000 kP, or from about 1000 kP to about 100000 kP. In some other aspects, such compositions are formulated to exhibit a liquidus temperature ($T_{lqds}$) of less than about 1600° C., less than about 1400° C., less than about 1300° C., less than about 1200° C. or even less than about 1100° C., less than about 1000, less than about 900 C. In some embodiments, the compositions are formulated to exhibit a $T_{lqds}$ of about 650° C. or greater.

The crystallizable glass compositions described herein may be formulated for ease of processing (e.g., melting, processing, forming . . . etc.). In such embodiments, the crystallizable glasses may exhibit an average % transmission of at least one wavelength, $\lambda_T$, in an interval of wavelengths from about 390 nm-2000 nm or from about 390 nm-1000 nm, of least about 90, at least about 70 or at least about 50. The crystallizable glasses of some embodiments may exhibit an average value in percent (%) of transmission over a $\lambda$ interval from about 390 nm to about 1000 nm $$\left[ {}_{390\ nm}^{2500\ nm} T_{avg}(\%) = \frac{1}{(2500 - 390\ nm)} \sum_{390\ nm}^{2500\ nm} T\lambda\{\%\} \right]$$

of at least about 40, of at least about 50, at least about 70, or at least about 90. Such average % transmissions recited herein may be exhibited by crystallizable glasses having a thickness of about 0.8 mm. Over a wavelength range from about 390 nm to about 780 nm, the transmission of some embodiments is about 30% or greater, or up to 90%. In some instances, over a 100 nm wavelength segment along the wavelength range from about 200 nm to about 780 nm, the average transmission is greater than 30%, greater than 70%, or up to about 90%.

The crystallizable glasses of one or more embodiments, may be formulated to be crystallizable at one or more preselected temperatures for one or more preselected times to a glass-ceramic, such as those described herein. Accordingly, in some specific embodiments, the crystallizable glasses may exhibit a viscosity ($\eta$) at which crystals are grown, of at least about $10E^{10}P$, at least about $10E^{9}P$, or at least about $10E^{8}P$.

In one or more embodiments, the crystallizable glass may have specific optical properties. For example, the crystallizable glasses may be transparent or substantially transparent. In some cases, the crystallizable glasses may exhibit an average transmission of at least about 10% or at least about 50% in the visible-to-near-IR spectrum in the wavelength range from about 375 nm to about 2000 nm. In some cases, the average transmission can be as high as 60%, 70% or even 80%.

The crystallizable glasses described herein may optionally include one or more colorants. The amount of the colorants can vary and can include, up to about 5.2 mol %, up to about 4 mol %, up to about 2.8 mol %, or up to about 1.5 mol % of the crystallizable glass, calculated on an oxide basis.

The one or more colorants can be formulated to provide one or more $Fe^{2+}$ sources, one or more $Fe^{3+}$ sources and/or the combination of $Fe^{2+}$ and $Fe^{3+}$ sources to the crystallizable glasses and/or resulting glass-ceramics formed from the crystallizable glasses. In other embodiments, such one or more colorants can be formulated to provide one or more iron oxides and one or more other transition metal oxides to crystallizable glasses and/or resulting glass-ceramics formed therefrom. In still other embodiments, such one or more one or more colorants can be, for example, one or more of $TiO_2$, FeO, $Fe_2O_3$, $Fe_3O_4$, MgO, and ZnO and, optionally, one or more transition metal oxides selected from one or more of V, Cr, Mn, Co, Ni, and Cu. The one or more other transition metal oxides can be an oxide of one or more of Ti, Mn, Co, and Cu. In still other embodiments, the one or more one or more colorants can be formulated to provide one or more multivalent metal oxides and, optionally, one or more reducing agents to crystallizable glasses and/or progeny glass-ceramics. In such embodiments, the one or more multivalent metal oxides can include an oxide of one or more of Ti, Mn, Fe, Co, Cu. In each of these embodiments, one or more silicates may be substantially absent from the one or more oxide crystalline phases.

In some embodiments, Fe and/or Sn may be included as part of a fining package during glass formation. Where a Sn-free glass is desired, Fe may be used in the fining package.

Another aspect of this disclosure pertains to process(es) for making the crystallizable glasses and glass-ceramics described herein. The processes include providing such crystallizable glasses and glass-ceramics that exhibit one or more preselected colors. In some embodiments, raw materials for making crystallizable glasses and progeny glass-ceramics can be formulated to provide these preselected color(s)s that can be tunable or have been tuned.

In other embodiments, the processes for making the crystallizable glasses and/or glass-ceramics described herein including formulating the crystallizable glasses in such manner to facilitate processing using mechanized means, including continuous, semi-continuous, and/or batch-wise processing in a manufacture of shaped parts of the crystallizable glasses and glass-ceramics described herein. Non-limiting examples of shaped parts can range from sheets or fibers to one or more complex three dimensional (3D) shapes such as, for example, a concave shape, a convex shape, or any other desired predetermined geometry . . . etc. For example in the case of sheets, one or more crystallizable glass sheets can be formed from a molten state by any one of a float method or a down draw methods, such as a slot draw method or a fusion method. If desirable, such crystallizable glass sheets might be then subjected to one or more redraw methods and/or one or more roll out methods. Such one or more redraw methods and/or one or more roll out methods might be performed while the crystallizable glass sheets are in a viscous state between about $10E^{3.5}P$ to $10E^{7.6}P$.

In one or more embodiments, the crystallizable glasses and glass-ceramics described herein may be formed using any one of a float process, a fusion down-draw process, a slot-draw process, or any other suitable process typically used for forming crystallizable glasses substrates from a batch of glass raw materials. As a specific example, the crystallizable glasses described herein might be formed into glass substrates using a fusion down-draw process. Such fusion down-draw processes utilize a drawing tank that has a channel for accepting molten glass raw material. The channel has weirs that open at the top along the length of the channel on both sides of the channel. When the channel fills with molten glass, the molten glass overflows the weirs and, due to gravity, the molten glass flows down the outside surfaces of the drawing tank as two flowing glass surfaces. These outside surfaces extend downwardly and inwardly while joining at an edge below the drawing tank. The two flowing glass surfaces join at this edge and fuse to form a single flowing sheet of molten glass that may be further drawn to a desired thickness. The fusion down-draw process produces glass sheets with highly uniform, flat surfaces as neither surface of the resulting glass sheet is in contact with any part of the fusion apparatus.

In some embodiments, the liquidus viscosity of the crystallizable glass may be tuned to enable use of a fusion down-draw process in forming the glasses described herein. The liquidus viscosity may be modified to limit or minimize the crystal growth in the glass during formation.

As an alternative specific example, the one or more crystallizable glasses of this disclosure and described herein may be formed using a slot-draw process in which molten glass raw materials are supplied to a drawing tank. The bottom of the drawing tank has an open slot with a nozzle that extends the length of the slot. The molten glass flows through the slot/nozzle and is drawn downward as a continuous sheet and into an annealing region.

The molten glass raw materials are formulated to produce the crystallizable glasses described herein upon fining and homogenization of the molten glass compositions at a temperature between about 1400° C. and about 1650° C.

In one or more embodiments, the processes for making the glass-ceramics described herein includes heat treating the crystallizable glasses at one or more preselected temperatures for one or more preselected times to induce crystallization (i.e., nucleation and growth) of one or more crystalline phases (e.g., having one or more compositions, amounts, morphologies, sizes or size distributions, etc.). In one or more specific embodiments, the heat treatment can include (i) heating crystallizable glasses at a rate of 1-10° C./min to a nucleation temperature (Tn) in the range from about 600° C. to about 750° C. (e.g., 630° C.); (ii) maintaining the crystallizable glasses at the nucleation temperature for a time in the range from between about ¼ hr to about 4 hr to produce nucleated crystallizable glasses; (iii) heating the nucleated crystallizable glasses at a rate in the range from about 1° C./min to about 10° C./min to a crystallization temperature (Tc) in the range from about 575° C. to about 900° C. (e.g., from about 700° C. to about 775° C.); (iv) maintaining the nucleated crystallizable glasses at the crystallization temperature for a time in the range from about ¼ hr to about 4 hr to produce the glass-ceramics described herein; and (v) cooling the formed glass-ceramics to room temperature. As used herein, the term crystallization temperature may be used interchangeably with ceram or ceramming temperature. In addition, the terms "ceram" or "ceramming" may be used to refer to steps (iii), (iv) and optionally (v), collectively.

Temperature-temporal profile of heat treatment steps (iii) and (iv), in addition to crystallizable glass compositions, are judiciously prescribed so as to produce one or more of the following desired attributes: crystalline phase(s) of the glass-ceramics, proportions of one or more predominate crystalline phases and/or one or more minor crystalline phases and residual glass, crystal phase assemblages of one or more predominate crystalline phases and/or one or more minor crystalline phases and residual glass, and grain sizes or grain size distributions among one or more predominate crystalline phases and/or one or more minor crystalline phases, which in turn may influence the final integrity, quality, color, and/or opacity, of resultant formed glass-ceramics.

The resultant glass-ceramic sheets can then be reformed by pressing, blowing, bending, sagging, vacuum forming, or other means into curved or bent pieces of uniform thickness. Reforming can be done before thermally treating or the forming step can also serve as a thermal treatment step where both forming and thermally treating are performed substantially simultaneously. For example a crystallizable glass might be formed into a 3D shape by forming the crystallizable glass into tubing and thermally treating the 3D crystallizable glass to transforming it into black, 3D glass-ceramic tubing. In some embodiments, the forming might precede the transforming, or the transforming might precede the forming, or the transforming might occur substantially simultaneously with the forming.

In yet other embodiments, the compositions used to form the crystallizable glasses and/or glass-ceramics can be formulated, for example, so that the glass-ceramics described herein are capable of being transformed to IX glass-ceramics using one or more ion exchange techniques. In these embodiments, ion exchange can occur by subjecting one or more surfaces of such glass-ceramics to one or more ion exchange baths, having a specific composition and temperature, for a specified time period to impart to the one or more surfaces with compressive stress(es) (σs). The compressive stresses can include one or more average surface compressive stress (CS), and/or one or more depths of compressive stresses (which may be referred to as one or more depths of layer (DOL)).

The bath(s) used in the ion exchange process represent an ion source having one or more ions having an ionic radius larger than the ionic radius of one or more ions present in the glass-ceramic (and, more particularly, the ions present in at least one surface of the glass-ceramic). During immersion of the glass-ceramic into the bath, the ions in the glass-ceramic having smaller radii can replace or be exchanged with ions having larger radii. This exchange may be facilitated or achieved by controlling the bath and/or glass-ceramic temperature within a range of temperatures at which ion interdiffusion (e.g., the mobility of the ions from between bath and the glass-ceramic) is sufficiently rapid within a reasonable time (e.g., between about 1 hr. and 64 hrs. or from 4-16 hrs., ranging at between about 300° C. and 500° C. or from 400° C.-430° C.). Also, typically such temperature is below the glass transition temperature (Tg) of any glass of a glass-ceramic. Some exemplary ions that may be exchanged between the bath and the glass-ceramic include sodium ($Na^+$), lithium ($Li^+$), potassium ($K^+$), rubidium ($Rb^+$), and/or cesium ($Cs^+$) ions. In one scenario, the bath may include sodium ($Na^+$), potassium ($K^+$), rubidium ($Rb^+$), and/or cesium (Cs$^+$) ions, which may be exchanged for lithium (Li$^+$) ions in the glass-ceramic. Alternatively, ions of potassium (K$^+$), rubidium (Rb$^+$), and/or cesium (Cs$^+$) in the bath can be exchanged for sodium (Na$^+$) ions in the glass-ceramic. In another scenario, ions of rubidium (Rb$^+$) and/or cesium (Cs$^+$) in the bath may be exchanged for potassium (K$^+$) ions in the glass-ceramics.

Some examples of ion sources include one or more gaseous ion sources, one or more liquid ion sources, and/or one or more solid ion sources. Among one or more liquid ion sources are liquid and liquid solutions, such as, for example molten salts. For example for the above ion-exchange examples, such molten salts can be one or more alkali metal salts such as, but not limited to, one or more halides, carbonates, chlorates, nitrates, sulfites, sulfates, or combinations of two or more of the proceeding. In one example, suitable alkali metal salts can include potassium nitrate (KNO$_3$), sodium nitrate (NaNO$_3$) and the combination thereof. It should be noted that in addition to single step IX processes, multiple step IX processes can be utilized to provide a specific CS to the surface of the glass-ceramic and thus, enhance a glass-ceramic's performance. In some embodiments, single step IX processes can be accomplished by exchanging ion (particularly lithium-for-sodium ion exchange) into a surface of the glass-ceramic by placing a glass-ceramic article in NaNO$_3$ baths at between about 300° C. and 500° C. for between about 1hr and 64 hr. In other embodiments, single step IX processes can be accomplished by placing a glass-ceramic article in a mixed potassium/sodium baths at (e.g. a 80/20 KNO$_3$/NaNO$_3$ bath, a 60/40 KNO$_3$/NaNO$_3$ bath, or even a 50/50 KNO$_3$/NaNO$_3$ bath . . . etc.) at between about 300° C. and 500° C. for between about 1 hr and 64 hr. In still other embodiments, two-step IX process can be accomplished by first placing a glass-ceramic article in a Li-containing salt bath (e.g. the molten salt bath can be a high temperature sulfate salt bath composed of Li$_2$SO$_4$ as a major ingredient, but diluted with Na$_2$SO$_4$, K$_2$SO$_4$ or Cs$_2$SO$_4$ in sufficient concentration to create a molten bath) between about 300° C. and 500° C. for between about 1 hr and 64 hr followed by placing the IX, glass-ceramic in a Na-containing salt bath between about 300° C. and 500° C. for between about 1 hr and 64 hr. The first step of the two step IX process functions to replace the larger sodium ions in the in the glass-ceramic's at least one surface with the smaller lithium ions found in the Li-containing salt bath. The second step of the two step IX process functions to exchange Na into in the glass-ceramic's at least one surface.

In a more particular embodiment, the glass-ceramics may have to a thickness (e.g., in the range from about 0.7 mm up to about 5 mm, from about 0.7 mm to about 2 mm, or from about 0.7 mm to about 1.3 mm) and compressive layer having an average surface compressive stress of about 500 MPa or greater and a DOL of about 40 µm or greater.

Various articles may incorporate or utilize the crystallizable glasses and/or glass-ceramics described herein. For example, covers and/or housings used in electronic devices might be formed using the crystallizable glasses and/or glass-ceramics. In still yet other embodiments, the crystallizable glasses and glass-ceramics might be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD) . . . etc., plasma display panel (PDP) . . . and the like), game controllers, tablets, thumb drives, external drives, whiteboards . . . etc.; personal digital assistants (PDAs); portable navigation device (PNDs); portable inventory devices (PIDs); entertainment devices and/or centers, devices and/or center accessories such as, tuners, media players (e.g., record, cassette, disc, solid-state . . . etc.), cable and/or satellite receivers, keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers . . . etc.; electronic reader devices or e-readers; mobile or smart phones . . . etc. As alternative examples, the crystallizable glasses and glass-ceramics might be used in automotive applications (e.g., consoles, automotive body parts and panels), appliances, architectural applications (e.g., sinks, faucets, shower walls, bathtubs, outlet covers, countertops, backsplashes, elevator cabs etc.), and energy production applications (e.g., solar thermal parts).

In one or more embodiments, the glass-ceramics described herein may be incorporated into a display, and specifically as a cover for a display. In some embodiments, such glass-ceramics may be semi-opaque (i.e., have an average transmittance in the range from about 0.1% to about 25% over a wavelength range about 200 nm to about 780 nm). In such embodiments, the glass-ceramic provides a display cover that hides the light emitting devices in the display (such as TFT displays, and backlit LED buttons and icons) when they such light emitting devices are not in operation (i.e., the semi-opaque display cover appears completely opaque), thereby providing a surface that does not appear to be a display (i.e., forming a "dead front"). When the light emitting devices are in operation, the light emitting therefrom are transmitted through the semi-opaque display cover. In one or more embodiments, such displays may be incorporated into countertops, cabinet doors, refrigerator doors, appliance surfaces, automotive interiors, and the like. In one or more embodiments, the display cover can be touch-enabled, and thus be used to input information. Such embodiments may include projected capacitive (pCAP) TFT displays, button pCAP systems and the like.

The use of glass-ceramics described herein as display covers provides an improvement over neutral density filters, which typically use thick glass materials (which may not be not suitable for high sensitivity touch operation or for low parallax effects), or plastic (which does not provide a durable surface). The use of glass-ceramics described here as display covers also provides an improvement over semi-mirrored films that are typically metallic-based and thus interfere with the electric field of the projective capacitance touch panels resulting in little or no touch sensitivity. Moreover, the semi-mirrored films provide a reflective surface when the light emitting devices are not in operation, which may be undesirable. The use of glass-ceramics described herein as display covers also provides an improvement over electrochromic material such as tungsten oxide and viologens (which change color when a charge is applied and some materials can be made to transition from "clear" to some known, repeatable dark or light state) as such electrochromic materials can be costly and require the use of electrodes and electrical connections that may negatively influence the projective capacitive touch sensors. Finally, the use of glass-ceramics described herein as display covers provides an advantage over the use of micro-holes in a visually textured material, which can weaken the mechanical integrity of the surface, and requires a bright display to provide a sufficiently bright image to the viewer. Moreover, micro-holes are currently only believed to be feasible with stainless steel materials and thus, different colors may not be achievable using this method.

Identity of phase assemblages and/or crystalline sizes for the crystallizable glasses and glass-ceramics described herein was determined or could be determined by XRD analysis techniques known to those in the art, using such commercially available equipment as the model as a PW1830 (Cu Kα radiation) diffractometer manufactured by Philips, Netherlands. Spectra were typically acquired for 2θ from 5 to 80 degrees.

Elemental profiles measured for characterizing the surfaces of the crystallizable glasses and/or glass-ceramics described herein were determined or could be determined by analytical techniques know to those in the art, such as, electron microprobe (EMP); x-ray photoluminescence spectroscopy (XPS); secondary ion mass spectroscopy (SIMS) . . . etc.

Compressive stress ($\sigma_s$) in a surface layer, average surface compression (CS), and depth of layer (DOL) of the crystallizable glasses can be conveniently measured using conventional optical techniques and instrumentation such as commercially available surface stress meter models FSM-30, FSM-60, FSM-6000LE, FSM-7000H . . . etc. available from Luceo Co., Ltd. and/or Orihara Industrial Co., Ltd., both in Tokyo, Japan. Glass-ceramics can also be measured in a similar manner using infrared light sources.

Figure 5:
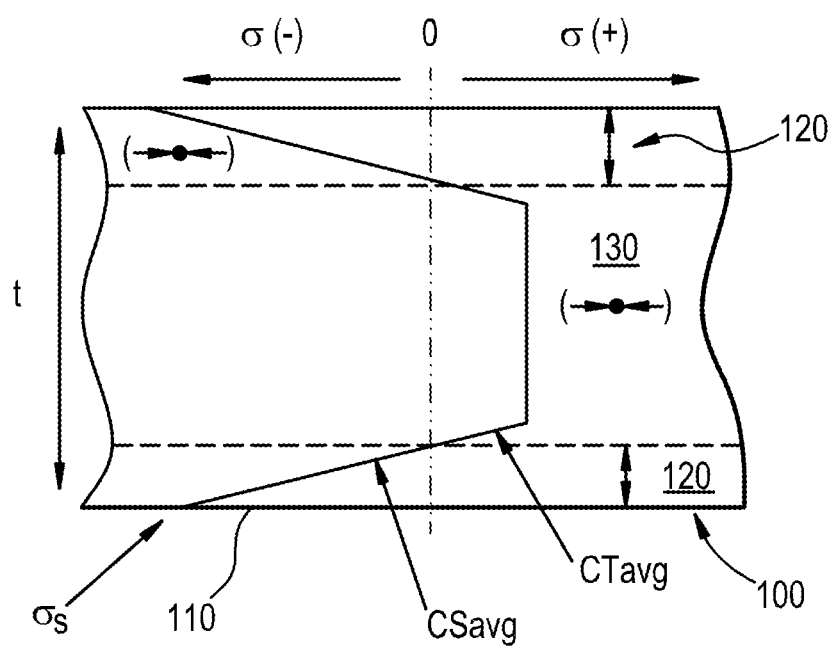
FIG. 5 shows a schematic illustration of a cross section of an IX, glass-ceramic and associated characterizing parameters: compressive stress ($\sigma_s$) in the IX, glass-ceramic's surface layer; surface compression (CS); central tension (CT); sample thickness (t); and depth of layer (DOL) which is the perpendicular distance from the surface of the sample to the location within the sample at which the stresses changes sign {i.e., zero} resulting from surface compression and central tension) that can be determined from, for example, the sodium (Na) and/or potassium (K) concentration.

During an IX processes as discussed above, ions having a smaller ionic radius present in the glass-ceramic surface and/or bulk can be exchanged with ions having a larger ionic radius. As schematically illustrated in FIG. 5, when this results in compressive stress ($\sigma_s$) in the surface 110 of a sample 100, balancing tensile stresses are induced in a central region 130 of the sample 100 to balance the forces throughout the sample 100. The CS is related to the central tension (CT) by the following relationship:

CS=CT×(t−2DOL)/DOL;

where t is the thickness of the glass-ceramic sample 100 and

DOL (depth of layer 120) is the distance from the surface 110 of the sample 100 along a normal to the surface 110 to the location at which the stresses within the sample 100 change sign (i.e., zero).

For a sample 100, the integrated central tension (ICT) is given by the integral of stress throughout the tensile portion of the stress profile (i.e., central region 130 of the sample 100). ICT is related to the full thickness (t) of the sample 100, the depth of layer (DOL) 120 of the compressive stress layer, the average central tension (CT), and the shape or profile of the compressive stress layer by the following relationship:

ICT=CT×(t−2DOL), where the thickness (t−2DOL) of the central region 130 is a direction perpendicular to the surface. To balance forces within the sample 100, the integrated surface compression (ICS) has the same magnitude as the ICT, but has an opposite (minus) sign, since the overall integrated stress of the sample must be zero: −ICS+ICT=0. ICS is related to the DOL 120 of the compressive stress layer, the CS, and the shape or profile of the compressive stress layer by the following relationship: ICS=CS×DOL, where the DOL of the compressive stress region has be defined above (i.e., the distance from the surface 110 of the sample 100 along a normal to the surface 110 to the location at which the stresses within the sample 100 change sign (i.e., zero)).

Vickers indentation cracking threshold measurements were performed or could be performed on the crystallizable glasses and/or glass-ceramics described herein to identify the threshold at which cracks initiate in a surface of such materials. The measurements were performed using known techniques such as, for example, in pages 130-132 of "Materials Science and Engineering (third edition)" by William D. Callister (John Wiley & Sons, New York, 1994), which are incorporated by reference herein. Unless otherwise specified, the Vickers indentation cracking threshold measurements described herein are performed by applying and then removing an indentation load using a Vickers indenter (a=68.00°) to a glass surface at 0.2 mm/min. The indentation maximum load is held for 10 seconds. The indentation cracking threshold is defined as the indentation load at which greater than 50% of 10 indents exhibit any number of radial/median cracks emanating from the corners of the indent impression. The maximum load is increased until such threshold is met for a given glass composition. Vickers indentation cracking threshold measurements are performed at room temperature in 50% relative humidity.

Flexural strength of the crystallizable glasses and/or glass-ceramics described herein was and/or can be characterized by methods know to those in the art, such as, those described in ASTM C1499. Young's Modulus, Shear Modulus, and Poisson's Ratio of the crystallizable glasses and/or glass-ceramics described herein were and can be characterized by methods know to those in the art, such as, those described in ASTM C1259. Knoop hardness and Vickers hardness of crystallizable glasses and/or glass-ceramics described herein was and/or can be characterized by methods know to those in the art, such as, those described in ASTM C1326 and ASTM C1327, respectively.

EXAMPLES

The following examples illustrate the various embodiments of this disclosure and in are no way intended to limit this disclosure thereto.

Inasmuch as the sum of the individual constituents totals or very closely approximates 100, for all practical purposes the reported values may be deemed to represent weight percent (wt %). The actual crystallizable glass batch ingredients may comprise any materials, either oxides, or other compounds, which, when melted together with the other batch components, will be converted into the desired oxide in the proper proportions.

Example Compositions 1-115: The Example Compositions listed in Tables I, Ia, Ib and Ic were used to form crystallizable glasses by introducing appropriately batched raw materials to a platinum crucible. The crucible was then placed in a furnace having a temperature up to about 1700° C. The materials were then refined and the molten glasses were then either poured onto a steel plate to make patties of glass, or they were formed into sheet by rolling or down draw.

In particular, crystallizable glasses formed from Example Compositions 1-7, 14-17 and 43-44 were melted by mixing 2500 g of batched raw materials in a 1.8 l platinum crucible, which was then placed in a SiC globar furnace having a temperature of about 1600° C. for 5 hours. The melted materials were then poured a thin stream into a bucket of flowing cold water to make cullet. The cullet was then remelted at 1650° C. for 5 hours to obtain a homogeneous melt and then poured onto a steel table and subsequently annealed for 2 hours at about 620° C.

Example Composition 1 was formulated to evaluate the effect of high $Fe_2O_3$ content in the composition on opacity and color. Example Compositions 2-6 were formulated to examine the effect of excess alkali relative to $Al_2O_3$ ($Na_2O$+ $K_2O$—$Al_2O_3$) at lower $Fe_2O_3$ level. This was done to address spontaneous crystallization and improve liquidus viscosity. Example Compositions 7, 14-17 and 43-44 incorporated different levels of $TiO_2$, $MgO$, and $Fe_2O_3$ to avoid magnetite, and improve the liquidus viscosity. The compositions from Example Compositions 1-7, 14-17 and 43-44 that exhibited acceptable liquidus viscosities and high opacity after ceramming, were then tuned to provide Example Compositions 53, 57, 60, 63 and 71, which were made into thin sheets (having a thickness in the range from about 1 mm to about 3 mm) on an electrically fired gas assisted continuous melting unit. The glass sheets made from Example Compositions 53, 57, 60, 63 and 71 were not annealed.

TABLE I

| | Glass Composition Mole Percent (Mol %) | | | | | | | | | | | | | | | | |
|---|---|---|---|---|---|---|---|---|---|---|---|---|---|---|---|---|---|
| Ex. | SiO$_2$ | Al$_2$O$_3$ | B$_2$O$_3$ | P$_2$O$_5$ | Na$_2$O | MgO | CaO | SnO$_2$ | TiO$_2$ | ZrO$_2$ | Fe$_2$O$_3$ | Co$_3$O$_4$ | MnO$_2$ | R$_2$O—Al$_2$O$_3$ | R$_2$O + RO—Al$_2$O$_3$ | $\frac{TiO_2}{Fe_2O_3}$ |
| 1 | 63.37 | 13.65 | 5.01 | 0 | 13.48 | 2.33 | 0 | 0 | 0 | 0 | 2.16 | 0 | 0 | −0.18 | 2.16 | 0 |
| 2 | 64.64 | 12.84 | 5.11 | 0 | 14.84 | 0.70 | 0 | 0.08 | 0 | 0 | 1.8 | 0 | 0 | 2.00 | 2.70 | 0 |
| 3 | 64.64 | 13.34 | 5.11 | 0 | 14.34 | 0.70 | 0 | 0.08 | 0 | 0 | 1.8 | 0 | 0 | 1.00 | 1.70 | 0 |
| 4 | 64.64 | 13.84 | 5.11 | 0 | 13.84 | 0.70 | 0 | 0.08 | 0 | 0 | 1.8 | 0 | 0 | 0.00 | 0.70 | 0 |
| 5 | 64.64 | 14.34 | 5.11 | 0 | 13.34 | 0.70 | 0 | 0.08 | 0 | 0 | 1.8 | 0 | 0 | −1.00 | −0.30 | 0 |
| 6 | 64.64 | 14.84 | 5.11 | 0 | 12.84 | 0.70 | 0 | 0.08 | 0 | 0 | 1.8 | 0 | 0 | −2.00 | −1.30 | 0 |
| 7 | 62.64 | 13.84 | 5.11 | 0 | 13.84 | 0.70 | 0 | 0.08 | 2 | 0 | 1.8 | 0 | 0 | 0.00 | 0.70 | 1.11 |
| 8 | 65.22 | 14.97 | 5.16 | 0 | 12.95 | 0.71 | 0 | 0.08 | 0 | 0 | 0.91 | 0 | 0 | −2.02 | −1.31 | 0 |
| 9 | 65.03 | 14.93 | 5.14 | 0 | 12.91 | 0.70 | 0 | 0.08 | 0 | 0 | 1.21 | 0 | 0 | −2.01 | −1.31 | 0 |
| 10 | 64.83 | 14.88 | 5.12 | 0 | 12.88 | 0.70 | 0 | 0.08 | 0 | 0 | 1.50 | 0 | 0 | −2.01 | −1.30 | 0 |
| 11 | 63.02 | 13.92 | 5.14 | 0 | 13.92 | 0.70 | 0 | 0.08 | 2.01 | 0 | 1.21 | 0 | 0 | 0.00 | 0.70 | 1.67 |
| 12 | 61.00 | 14.93 | 5.14 | 0 | 12.91 | 0.70 | 0 | 0.08 | 4.02 | 0 | 1.21 | 0 | 0 | −2.01 | −1.31 | 3.33 |
| 13 | 58.99 | 14.93 | 5.14 | 0 | 12.91 | 0.70 | 0 | 0.08 | 6.04 | 0 | 1.21 | 0 | 0 | −2.01 | −1.31 | 5 |
| 14 | 62.64 | 13.93 | 5.11 | 0 | 13.75 | 2 | 0 | 0.08 | 2 | 0 | 0.5 | 0 | 0 | −0.18 | 1.82 | 4 |
| 15 | 63.64 | 13.93 | 5.11 | 0 | 13.75 | 1.75 | 0 | 0.08 | 1 | 0 | 0.75 | 0 | 0 | −0.18 | 1.57 | 1.33 |
| 16 | 62.64 | 13.93 | 5.11 | 0 | 13.75 | 1.75 | 0 | 0.08 | 2 | 0 | 0.75 | 0 | 0 | −0.18 | 1.57 | 2.67 |
| 17 | 61.64 | 13.93 | 5.11 | 0 | 13.75 | 1.75 | 0 | 0.08 | 3 | 0 | 0.75 | 0 | 0 | −0.18 | 1.57 | 4 |
| 18 | 63.64 | 13.93 | 5.11 | 0 | 13.75 | 1.50 | 0 | 0.08 | 1 | 0 | 1 | 0 | 0 | −0.18 | 1.32 | 1 |
| 19 | 63.64 | 13.93 | 5.11 | 0 | 13.75 | 1.25 | 0 | 0.08 | 1 | 0 | 1.25 | 0 | 0 | −0.18 | 1.07 | 0.80 |
| 20 | 64.70 | 14.85 | 5.11 | 0 | 12.75 | 2 | 0 | 0.08 | 0 | 0 | 0.5 | 0 | 0 | −2.10 | −0.10 | 0 |
| 21 | 64.70 | 14.85 | 5.11 | 0 | 12.75 | 1.75 | 0 | 0.08 | 0 | 0 | 0.75 | 0 | 0 | −2.10 | −0.35 | 0 |
| 22 | 64.70 | 14.85 | 5.11 | 0 | 12.75 | 1.50 | 0 | 0.08 | 0 | 0 | 1.00 | 0 | 0 | −2.10 | −0.60 | 0 |
| 23 | 64.54 | 14.81 | 5.10 | 0 | 12.72 | 1.75 | 0 | 0.08 | 0 | 0 | 0.75 | 0.25 | 0 | −2.10 | −0.35 | 0 |
| 24 | 64.38 | 14.78 | 5.09 | 0 | 12.69 | 1.74 | 0 | 0.08 | 0 | 0 | 0.75 | 0.5 | 0 | −2.09 | −0.35 | 0 |
| 25 | 63.20 | 14.85 | 5.11 | 0 | 12.75 | 1.75 | 0 | 0.08 | 1.50 | 0 | 0.75 | 0 | 0 | −2.10 | −0.35 | 2 |
| 26 | 63.11 | 14.03 | 5.15 | 0 | 13.85 | 1.01 | 0 | 0.08 | 2.01 | 0 | 0.76 | 0 | 0 | −0.18 | 0.83 | 2.67 |
| 27 | 62.79 | 13.96 | 5.12 | 0 | 13.78 | 1.50 | 0 | 0.08 | 2.00 | 0 | 0.75 | 0 | 0 | −0.18 | 1.32 | 2.67 |
| 28 | 62.48 | 13.89 | 5.10 | 0 | 13.71 | 1.99 | 0 | 0.08 | 1.99 | 0 | 0.75 | 0 | 0 | −0.18 | 1.82 | 2.67 |
| 29 | 62.64 | 13.43 | 5.11 | 0 | 14.25 | 1.75 | 0 | 0.08 | 2 | 0 | 0.75 | 0 | 0 | 0.82 | 2.57 | 2.67 |
| 30 | 62.64 | 14.43 | 5.11 | 0 | 13.25 | 1.75 | 0 | 0.08 | 2 | 0 | 0.75 | 0 | 0 | −1.18 | 0.57 | 2.67 |
| 31 | 59.80 | 14.95 | 0.00 | 4.98 | 14.95 | 2.49 | 0 | 0.08 | 1.99 | 0 | 0.75 | 0 | 0 | 0.00 | 2.49 | 2.67 |
| 32 | 63.50 | 13.83 | 5.46 | 0 | 13.65 | 1.74 | 0 | 0.08 | 0.99 | 0 | 0.74 | 0 | 0 | −0.18 | 1.56 | 1.33 |
| 33 | 64.20 | 13.25 | 5.12 | 0 | 13.75 | 1.75 | 0 | 0.08 | 1.1 | 0 | 0.75 | 0 | 0 | 0.50 | 2.25 | 1.47 |
| 34 | 63.64 | 13.93 | 5.11 | 0 | 13.75 | 1.75 | 0 | 0.08 | 1 | 0 | 0.75 | 0 | 0 | −0.18 | 1.57 | 1.33 |
| 35 | 61.75 | 13.43 | 5.11 | 0 | 14.25 | 2.38 | 0 | 0.08 | 0 | 0 | 3 | 0 | 0 | 0.82 | 3.20 | 0 |
| 36 | 61.75 | 13.93 | 5.11 | 0 | 13.75 | 2.38 | 0 | 0.08 | 0 | 0 | 3 | 0 | 0 | −0.18 | 2.20 | 0 |
| 37 | 61.75 | 14.43 | 5.11 | 0 | 13.25 | 2.38 | 0 | 0.08 | 0 | 0 | 3 | 0 | 0 | −1.18 | 1.20 | 0 |
| 38 | 62.75 | 13.93 | 5.11 | 0 | 13.75 | 2.38 | 0 | 0.08 | 0 | 0 | 2 | 0 | 0 | −0.18 | 2.20 | 0 |
| 39 | 60.75 | 13.93 | 5.11 | 0 | 13.75 | 2.38 | 0 | 0.08 | 0 | 0 | 4 | 0 | 0 | −0.18 | 2.20 | 0 |
| 40 | 63.75 | 13.93 | 5.11 | 0 | 13.75 | 2.38 | 0 | 0.08 | 0 | 1 | 0 | 0 | 0 | −0.18 | 2.20 | — |
| 41 | 63.64 | 13.93 | 5.11 | 0 | 13.75 | 1.75 | 0 | 0.08 | 1 | 0 | 0.75 | 0 | 0 | −0.18 | 1.57 | 1.33 |
| 42 | 64.62 | 13.44 | 5.11 | 0 | 13.24 | 1.75 | 0 | 0.08 | 1 | 0 | 0.75 | 0 | 0 | −0.20 | 1.55 | 1.33 |
| 43 | 64.05 | 13.93 | 5.11 | 0 | 13.75 | 1.75 | 0 | 0.08 | 0.83 | 0 | 0.50 | 0 | 0 | −0.18 | 1.57 | 1.66 |
| 44 | 63.78 | 13.93 | 5.11 | 0 | 13.75 | 1.75 | 0 | 0.08 | 1 | 0 | 0.60 | 0 | 0 | −0.18 | 1.57 | 1.67 |
| 45 | 63.51 | 13.93 | 5.11 | 0 | 13.75 | 1.75 | 0 | 0.08 | 1.17 | 0 | 0.70 | 0 | 0 | −0.18 | 1.57 | 1.67 |
| 46 | 63.65 | 13.90 | 5.10 | 0 | 13.72 | 1.75 | 0 | 0.08 | 1 | 0 | 0.60 | 0 | 0.2 | −0.18 | 1.57 | 1.67 |
| 47 | 63.53 | 13.87 | 5.09 | 0 | 13.70 | 1.74 | 0 | 0.08 | 1 | 0 | 0.60 | 0 | 0.4 | −0.18 | 1.56 | 1.67 |
| 48 | 64.18 | 13.93 | 5.11 | 0 | 13.75 | 1.75 | 0 | 0.08 | 0 | 0 | 0.60 | 0 | 0.6 | −0.18 | 1.57 | 0 |

| Ex. | SiO$_2$ | Al$_2$O$_3$ | B$_2$O$_3$ | P$_2$O$_5$ | Na$_2$O | K$_2$O | MgO | CaO | SnO$_2$ | TiO$_2$ | ZrO$_2$ | Fe$_2$O$_3$ | Co$_3$O$_4$ | MnO$_2$ | R$_2$O—Al$_2$O$_3$ | R$_2$O + RO—Al$_2$O$_3$ | $\frac{TiO_2}{Fe_2O_3}$ |
|---|---|---|---|---|---|---|---|---|---|---|---|---|---|---|---|---|---|
| 49 | 63.77 | 13.92 | 5.12 | 0 | 13.71 | 0.01 | 1.92 | 0.04 | 0.09 | 0.98 | 0.02 | 0.42 | 0 | 0 | −0.19 | 1.78 | 2.34 |
| 51 | 63.74 | 13.96 | 5.12 | 0 | 13.69 | 0.01 | 1.75 | 0.03 | 0.12 | 1.00 | 0.03 | 0.55 | 0 | 0.01 | −0.25 | 1.53 | 1.8 |
| 52 | 63.79 | 13.92 | 5.12 | 0 | 13.66 | 0.01 | 1.74 | 0.04 | 0.12 | 0.98 | 0.03 | 0.56 | 0 | 0 | −0.25 | 1.53 | 1.74 |
| 53 | 63.82 | 13.89 | 5.10 | 0 | 13.76 | 0.01 | 1.74 | 0.03 | 0.06 | 0.98 | 0.03 | 0.56 | 0 | 0 | −0.11 | 1.67 | 1.73 |
| 54 | 53.71 | 13.83 | 5.08 | 0 | 13.76 | 0.02 | 1.75 | 0.03 | 0.05 | 0.98 | 0.03 | 0.56 | 0 | 0.19 | −0.06 | 1.91 | 1.73 |
| 55 | 63.77 | 13.96 | 5.08 | 0 | 13.56 | 0.02 | 1.75 | 0.04 | 0.06 | 0.99 | 0.03 | 0.57 | 0 | 0.19 | −0.39 | 1.4 | 1.74 |
| 56 | 63.81 | 13.83 | 5.08 | 0 | 13.61 | 0.01 | 1.75 | 0.03 | 0.05 | 1.2 | 0.03 | 0.57 | 0 | 0.02 | −0.21 | 1.59 | 2.12 |
| 57 | 63.81 | 13.69 | 5.11 | 0 | 13.60 | 0.02 | 1.74 | 0.03 | 0.05 | 1.35 | 0.03 | 0.56 | 0 | 0.01 | −0.07 | 1.71 | 2.41 |
| 58 | 63.83 | 13.66 | 5.13 | 0 | 13.62 | 0.02 | 1.76 | 0.03 | 0.05 | 1.24 | 0.03 | 0.63 | 0 | 0.01 | −0.03 | 1.77 | 1.98 |
| 59 | 63.96 | 13.61 | 5.17 | 0 | 13.63 | 0.01 | 1.75 | 0.03 | 0.06 | 1.00 | 0.06 | 0.71 | 0 | 0.01 | 0.03 | 1.82 | 1.42 |
| 60 | 63.94 | 13.60 | 5.18 | 0 | 13.66 | 0.01 | 1.75 | 0.03 | 0.06 | 0.99 | 0.06 | 0.71 | 0 | 0.01 | 0.08 | 1.87 | 1.40 |
| 61 | 64.05 | 13.6 | 5.17 | 0 | 13.77 | 0.01 | 1.43 | 0.03 | 0.05 | 0.98 | 0.06 | 0.74 | 0 | 0.11 | 0.18 | 1.64 | 1.33 |
| 62 | 64.23 | 13.58 | 5.19 | 0 | 13.70 | 0.02 | 1.22 | 0.03 | 0.05 | 0.98 | 0.07 | 0.75 | 0 | 0.19 | 0.14 | 1.58 | 1.30 |
| 63 | 65.08 | 13.19 | 4.97 | 0 | 13018 | 0.01 | 1.73 | 0.03 | 0.03 | 0.98 | 0.04 | 0.75 | 0 | 0.01 | 0 | 1.77 | 1.32 |
| 64 | 65.06 | 13.13 | 5.03 | 0 | 13.22 | 0.01 | 1.75 | 0.03 | 0.02 | 0.98 | 0.02 | 0.74 | 0 | 0.01 | 0.1 | 1.89 | 1.32 |
| 65 | 64.91 | 13.13 | 5.15 | 0 | 13.11 | 0.01 | 1.73 | 0.03 | 0.02 | 0.97 | 0.02 | 0.63 | 0.26 | 0.01 | 0 | 1.77 | 1.54 |
| 66 | 65.16 | 13.31 | 4.85 | 0 | 12.16 | 0.95 | 1.74 | 0.04 | 0.02 | 0.99 | 0.02 | 0.75 | 0.01 | 0.01 | −0.2 | 1.58 | 1.32 |
| 67 | 65.46 | 12.95 | 4.50 | 0 | 13.04 | 0.39 | 1.54 | 0.03 | 0.02 | 1.30 | 0.01 | 0.74 | 0.01 | 0.01 | 0.48 | 2.06 | 1.76 |
| 68 | 66.00 | 12.70 | 3.74 | 0 | 13.60 | 0.04 | 1.62 | 0.03 | 0.02 | 1.47 | 0.01 | 0.76 | 0.01 | 0.01 | 0.94 | 2.6 | 1.93 |
| 69 | 65.97 | 12.77 | 3.68 | 0 | 13.62 | 0.02 | 1.41 | 0.03 | 0.02 | 1.49 | 0.01 | 0.76 | 0.01 | 0.22 | 0.87 | 2.52 | 1.95 |
| 70 | 65.96 | 12.70 | 3.71 | 0 | 12.79 | 0.88 | 1.61 | 0.03 | 0.02 | 1.50 | 0.01 | 0.76 | 0.01 | 0.03 | 0.97 | 2.63 | 1.96 |
| 71 | 66.13 | 12.73 | 3.69 | 0 | 13.17 | 0.55 | 1.63 | 0.03 | 0.02 | 1.32 | 0.01 | 0.68 | 0.01 | 0.03 | 0.99 | 2.67 | 1.95 |

TABLE Ia

Glass Composition Mole Percent (Mol %)

| Ex. | SiO$_2$ | Al$_2$O$_3$ | P$_2$O$_5$ | Na$_2$O | K$_2$O | MgO | CaO | SrO | BaO | ZnO | La$_2$O$_3$ | Ta$_2$O$_5$ | SnO$_2$ | TiO$_2$ | Fe$_2$O$_3$ | R$_2$O—Al$_2$O$_3$ | R$_2$O + RO—Al$_2$O$_3$ | $\frac{TiO_2}{Fe_2O_3}$ |
|---|---|---|---|---|---|---|---|---|---|---|---|---|---|---|---|---|---|---|
| 72 | 60.15 | 14.98 | 5 | 14.98 | 0 | 2.49 | 0.06 | 0 | 0 | 0 | 0 | 0 | 0.08 | 1.50 | 0.75 | 0 | 2.56 | 2 |
| 74 | 60.89 | 14.99 | 4.99 | 14.98 | 0 | 2.51 | 0.06 | 0 | 0 | 0 | 0 | 0 | 0.08 | 0.75 | 0.75 | 0 | 2.57 | 1 |
| 75 | 61.14 | 14.98 | 5 | 14.98 | 0 | 2.51 | 0.06 | 0 | 0 | 0 | 0 | 0 | 0.08 | 0.5 | 0.75 | 0 | 2.57 | 0.67 |
| 76 | 60.42 | 14.98 | 4.99 | 14.98 | 0 | 2.49 | 0.06 | 0 | 0 | 0 | 0 | 0 | 0.08 | 2 | 0.00 | 0 | 2.55 | — |
| 78 | 60.30 | 15.02 | 5.01 | 15.01 | 0 | 2.50 | 0.06 | 0 | 0 | 0 | 0 | 0 | 0.08 | 1.50 | 0.50 | −0.01 | 2.56 | 2.99 |
| 79 | 60.23 | 15.01 | 5 | 15.00 | 0 | 2.51 | 0.06 | 0 | 0 | 0 | 0 | 0 | 0.08 | 1.51 | 0.60 | −0.01 | 2.56 | 2.50 |
| 80 | 60.00 | 14.95 | 4.98 | 14.95 | 0 | 2.48 | 0.06 | 0 | 0 | 0 | 0 | 0 | 0.08 | 1.50 | 1.00 | 0 | 2.55 | 1.50 |
| 81 | 60.30 | 15.02 | 5.01 | 15.03 | 0 | 2.01 | 0.05 | 0 | 0 | 0 | 0 | 0 | 0.08 | 1.50 | 1.00 | 0 | 2.07 | 1.50 |
| 82 | 60.91 | 15.18 | 5.06 | 15.18 | 0 | 1.02 | 0.05 | 0 | 0 | 0 | 0 | 0 | 0.08 | 1.51 | 1.01 | 0 | 1.08 | 1.50 |
| 83 | 60.37 | 14.99 | 5 | 14.99 | 0 | 2.49 | 0.06 | 0 | 0 | 0 | 0 | 0 | 0.08 | 0 | 2 | 0 | 2.56 | 0 |
| 84 | 57.08 | 15.56 | 7.55 | 15.09 | 0.47 | 0.38 | 3.78 | 0 | 0 | 0 | 0 | 0 | 0.08 | 0 | 0 | 0.01 | 4.16 | 0 |
| 86 | 55.01 | 15.00 | 10.91 | 14.55 | 0.46 | 0.36 | 3.64 | 0 | 0 | 0 | 0 | 0 | 0.08 | 0 | 0 | 0.01 | 4.00 | 0 |
| 87 | 56.02 | 15.28 | 11.11 | 14.81 | 0.46 | 0.38 | 1.85 | 0 | 0 | 0 | 0 | 0 | 0.08 | 0 | 0 | 0 | 2.23 | 0 |
| 90 | 57.07 | 15.57 | 8.49 | 15.11 | 0.47 | 0.38 | 2.83 | 0 | 0 | 0 | 0 | 0 | 0.07 | 0 | 0 | 0.01 | 3.23 | — |
| 91 | 57.08 | 15.57 | 8.49 | 15.11 | 0.47 | 0.37 | 0.00 | 0 | 0 | 2.83 | 0 | 0 | 0.07 | 0 | 0 | 0.01 | 3.21 | — |
| 92 | 57.09 | 15.57 | 8.49 | 15.10 | 0.47 | 0.37 | 0.00 | 2.83 | 0 | 0 | 0 | 0 | 0.07 | 0 | 0 | −0.01 | 3.19 | — |
| 93 | 57.08 | 15.57 | 8.49 | 15.10 | 0.47 | 0.38 | 0.00 | 0 | 2.83 | 0 | 0 | 0 | 0.08 | 0 | 0 | 0 | 3.22 | — |
| 94 | 57.07 | 15.57 | 8.49 | 15.10 | 0.48 | 0.38 | 0.00 | 0 | 0 | 0 | 2.83 | 0 | 0.08 | 0 | 0 | 0.01 | 0.39 | — |
| 95 | 57.10 | 15.57 | 8.49 | 15.09 | 0.47 | 0.38 | 0.00 | 0 | 0 | 0 | 0 | 2.83 | 0.07 | 0 | 0 | −0.01 | 0.37 | — |
| 96 | 56.02 | 15.27 | 5.56 | 14.83 | 0.47 | 0.38 | 3.70 | 0 | 0 | 0 | 0 | 0 | 0.08 | 3.71 | 0 | 0.02 | 4.09 | — |
| 97 | 55.02 | 15.00 | 7.28 | 14.54 | 0.45 | 0.36 | 3.63 | 0 | 0 | 0 | 0 | 0 | 0.07 | 3.63 | 0 | −0.01 | 3.99 | — |
| 98 | 54.03 | 14.74 | 8.93 | 14.29 | 0.44 | 0.35 | 3.57 | 0 | 0 | 0 | 0 | 0 | 0.07 | 3.57 | 0 | 0 | 3.92 | — |
| 99 | 56.04 | 15.28 | 7.41 | 14.81 | 0.46 | 0.37 | 1.85 | 0 | 0 | 0 | 0 | 0 | 0.07 | 3.70 | 0 | −0.01 | 2.21 | — |
| 100 | 55.00 | 14.55 | 7.27 | 15.00 | 0.46 | 0.36 | 3.64 | 0 | 0 | 0 | 0 | 0 | 0.07 | 3.63 | 0 | 0.91 | 4.91 | — |
| 101 | 55.01 | 15.46 | 7.27 | 14.09 | 0.45 | 0.36 | 3.64 | 0 | 0 | 0 | 0 | 0 | 0.07 | 3.63 | 0 | −0.92 | 3.09 | — |
| 102 | 59.91 | 16.34 | 5.94 | 15.84 | 0.50 | 0.39 | 0.99 | 0 | 0 | 0 | 0 | 0 | 0.08 | 0 | 0 | 0 | 1.38 | — |
| 103 | 59.33 | 16.18 | 5.88 | 15.69 | 0.49 | 0.39 | 1.97 | 0 | 0 | 0 | 0 | 0 | 0.08 | 0 | 0 | 0 | 2.36 | — |
| 104 | 58.17 | 15.87 | 5.77 | 15.39 | 0.48 | 0.39 | 3.85 | 0 | 0 | 0 | 0 | 0 | 0.08 | 0 | 0 | 0 | 4.24 | — |
| 105 | 58.18 | 15.87 | 7.69 | 15.39 | 0.48 | 0.38 | 1.92 | 0 | 0 | 0 | 0 | 0 | 0.08 | 0 | 0 | 0 | 2.31 | — |
| 106 | 59.32 | 15.69 | 5.89 | 16.18 | 0.49 | 0.39 | 1.96 | 0 | 0 | 0 | 0 | 0 | 0.08 | 0 | 0 | 0.98 | 3.33 | — |
| 107 | 59.32 | 16.67 | 5.88 | 15.21 | 0.49 | 0.39 | 1.96 | 0 | 0 | 0 | 0 | 0 | 0.08 | 0 | 0 | −0.97 | 1.38 | — |

TABLE Ib

Glass Composition Mole Percent (Mol %)

| Ex. | SiO$_2$ | Al$_2$O$_3$ | B$_2$O$_3$ | Na$_2$O | MgO | TiO$_2$ | Fe$_2$O$_3$ | CuO | Cu2O | R$_2$O—Al$_2$O$_3$ | R$_2$O + RO—Al$_2$O$_3$ | $\frac{TiO_2}{Fe_2O_3}$ |
|---|---|---|---|---|---|---|---|---|---|---|---|---|
| 108 | 65 | 13.2 | 5 | 13.3 | 1.75 | 1 | 0.75 | 0 | 0 | 0.1 | 1.85 | 1.33 |
| 109 | 65 | 13.2 | 5 | 13.2 | 1.75 | 1 | 0.75 | 0.2 | 0 | 0 | 1.95 | 1.33 |
| 110 | 65 | 13.2 | 5 | 12.3 | 1.75 | 1 | 0.75 | 2 | 0 | −0.9 | 2.85 | 1.33 |
| 111 | 65 | 13.2 | 5 | 8.3 | 1.75 | 1 | 0.75 | 10 | 0 | −4.9 | 6.85 | 1.33 |
| 112 | 65 | 13.2 | 5 | 8.3 | 1.75 | 1 | 0.75 | 0 | 5 | 0.1 | 1.85 | 1.33 |
| 113 | 65 | 13.2 | 5 | 13.3 | 1.75 | 0 | 0 | 0.2 | 0 | 0.1 | 2.8 | 0 |

TABLE Ic

Glass Composition Mole Percent (Mol %)

| Ex. | SiO$_2$ | Al$_2$O$_3$ | B$_2$O$_3$ | Na$_2$O | K$_2$O | MgO | CaO | SnO2 | ZrO2 | TiO2 | Fe2O3 | MnO | CoO | R$_2$O—Al$_2$O$_3$ | R$_2$O + RO—Al$_2$O$_3$ | $\frac{TiO_2}{Fe_2O_3}$ |
|---|---|---|---|---|---|---|---|---|---|---|---|---|---|---|---|---|
| 114 | 63.803 | 13.989 | 5.098 | 13.655 | 0.014 | 1.747 | 0.034 | 0.060 | 0.028 | 0.986 | 0.581 | 0.00 | 0.00 | −0.320 | 1.461 | 1.697 |
| 115 | 64.919 | 13.189 | 5.060 | 13.163 | 0.014 | 1.751 | 0.031 | 0.020 | 0.020 | 0.983 | 0.677 | 0.00 | 0.17 | −0.011 | 1.771 | 1.452 |

TABLE II

| | Glass Properties | | | | | | | | Heat Treated Glass | | | |
|---|---|---|---|---|---|---|---|---|---|---|---|---|
| Ex. | Strain Point (° C.) | Annealing Point (° C.) | Softening Point (° C.) | α (10⁻⁷/° C.) | ρ (g/cm³) | $T_{lgds}$ (° C.) | LiqVisc (kP) | Liquidus Phase(s) | As Made | 700° C.-4 hr | 750° C.-4 hr | 800° C.-4 hr | PB Crystal Size (nm) |
| 1 | 559 | 608 | 888 | 76.1 | 2.46 | 1235 | 12.2 | Mag | Mag | Mag | Mag | | |
| 2 | | | | | | | | Mag | Amorph | Amorph | Amorph | | |
| 3 | | | | | | 1050 | 402 | <1050° C. | Amorph | Mag | Mag | | |
| 4 | | | | | | | | Hem + Ma | Amorph | Mag | Mag | | |
| 5 | | | | | | | | Hem + Ma | Mag | Mag | Mag | | |
| 6 | | | | | | | | Hem + Ma | Mag + Hem | Mag + Hem | Mag + PB | | |
| 7 | | | | | | | | PB | Mag | Mag + PB | Amorph | | |
| 8 | | | | | | | | | Amorph | Amorph | Mag + Hem | | |
| 9 | | | | | | | | | Amorph | Mag + Hem | Mag | | |
| 10 | | | | | | | | | Amorph | Mag | Mag + PB | | |
| 11 | | | | | | | | | | Mag + possibly another phase | | | |
| 12 | | | | | | | | | | PB + possibly another phase | PB | | |
| 13 | | | | | | | | | | PB + Rutile | PB + Rutile | | |
| 14 | 566 | 617 | 900 | | 2.43 | 1110 | 116 | | Amorph | PB | PB | | |
| 15 | 560 | 612 | 883 | | 2.42 | 1050 | 493 | | Amorph | ε-Fe₂O₃ | ε-Fe₂O₃ | | |
| 16 | 563 | 613 | 891 | | 2.44 | 1140 | 60 | | Amorph | Mag + PB | PB | | |
| 17 | 566 | 619 | 904 | | 2.45 | 1155 | <45 | | Amorph | PB | PB | | |
| 18 | 556 | 607 | 880 | | 2.43 | | | | Amorph | Mag | Mag + PB | | |
| 19 | 559 | 609 | 893 | | 2.43 | | | | Amorph | Mag | Mag + possibly another phase | | |
| 20 | | | | | | | | | | | | | |
| 21 | | | | | | | | | | | | | |
| 22 | | | | | | | | | | | | | |
| 23 | | | | | | | | | | | | | |
| 24 | | | | | | | | | | | | | |
| 25 | | | | | | | | | | | | | |
| 26 | 574 | 626 | | | 2.43 | 1120 | | | | PB | PB | | 18 |
| 27 | 572 | 626 | | | 2.43 | 1110 | | | | trace Mag | PB | | 17 |
| 18 | 570 | 623 | | | 2.44 | 1105 | | | | PB | PB | | 17 |
| 29 | 559 | 608 | | | 2.44 | 1085 | | | | PB | PB | | 20 |
| 30 | 575 | 627 | | | 2.43 | 1135 | | | | PB | PB | | 15 |
| 31 | 625 | 680 | | | 2.45 | 1065 | 658 | | | | | | |
| 32 | | | | | | 1045 | 470 | | | | | | |
| 33 | | | | | | 1050 | | | | | | | |
| 34 | | | | | | 1065 | | | | | | | |
| 35 | | | | | | | | | | | | | |
| 36 | | | | | | | | | | | | | |
| 37 | | | | | | | | | | | | | |
| 38 | | | | | | | | | | | | | |
| 39 | | | | | | | | | | | | | |
| 40 | | | | | | | | | | | | | |
| 41 | | | | | 2.42 | 1095 | 216 | | | | | | |
| 42 | | | | | 2.42 | 1070 | 422 | | | | | | |

TABLE II-continued

| Ex. | T_lqds 24hrs Pt. | 72hrs |
|---|---|---|
| 43 | 1065 | Amorph |
| 44 | 1070 | Amorph |
| 45 | 1100 | ε-Fe₂O₃ |
| 46 | 1060 | ε-Fe₂O₃ |
| 47 | 1065 | ε-Fe₂O₃ |
| 48 | 1030 | ε-Fe₂O₃ |

Glass Properties

| Ex. | Strain Pt. (°C.) | Annealing Pt. (°C.) | Softening Pt. (°C.) | α (10⁻⁷/°C.) | ρ (g/cm³) | Beta-OH | T_lqds (°C.)-24 hrs Air | Int. | Pt. | T_lqds (°C.)-72 hrs Air | Int. | Pt. | LiqVisc (kP)-24 hr Air | Int. | Pt. | LiqVisc (kP)-72 hr Air | Int. | Pt. | HTV A | B | To |
|---|---|---|---|---|---|---|---|---|---|---|---|---|---|---|---|---|---|---|---|---|---|
| 49 | | | | | | | 1070 | 1065 | 1080 | | | | | | | | | | | | |
| 51 | 567 | 619 | | | 2.409 | 0.405 | | | | | | | | | | | | | −3.6 | 9581.7 | 30.1 |
| 52 | | | | | | | | | | | | | | | | | | | −3.5 | 9092.2 | 59.7 |
| 53 | | | | | | | 1075 | 1025 | 1040 | | 1010 | 1040 | 335 | 967 | 696 | 274 | 1358 | 696 | −3.5 | 9256.3 | 40.0 |
| 54 | | | | | 2.407 | | | | | | | | | | | | | | | | |
| 55 | | | | | | | 1075 | 1035 | 1055 | | 726 | 471 | 311 | | | | | | | | |
| 56 | 565 | 617 | 881.9 | 74.1 | 2.408 | 0.391 | 1095 | 1045 | 1085 | | 496 | 220 | 181 | | | | | | −3.4 | 8983.9 | 57.7 |
| 57 | | | | | | | | | | | | | | | | | | | −3.9 | 10198.7 | −32.1 |
| 58 | | | | | | | | | | | | | | | | | | | −3.5 | 9403.4 | 41.9 |
| 59 | | | | | | | | | | | | | | | | | | | −3.2 | 8610.6 | 86.9 |
| 60 | 562 | 613 | | | 2.353 | 0.373 | 1100 | 1035 | 1075 | | 637 | 277 | 170 | | | | | | −3.8 | 10189.2 | −12.7 |
| 61 | 559 | 611 | | 74.7 | 2.412 | 0.365 | | 1075 | 1040 | | 224 | 448 | 90 | | | 125 | 544 | 359 | −3.5 | 9439.9 | 31.6 |
| 62 | | | | | | | 1125 | 1050 | 1055 | | 604 | 544 | 150 | | | 136 | 950 | 549 | −3.3 | 9104.4 | 53.6 |
| 63 | | | | | | | 1120 | | | 1055 | | 1075 | | | | 208 | 1066 | 1191 | −3.4 | 9573.9 | 29.4 |
| 64 | | | | | | | | | | 1025 | | 1050 | | | | 132 | 692 | 190 | −3.3 | 9383.4 | 33.6 |
| 65 | | | | | | | | | | 1020 | | 1015 | | | | 159 | 702 | 280 | −3.3 | 9156.8 | 45.9 |
| 66 | | | | | | | | | | 1045 | | 1110 | | | | 62 | 161 | 103 | −3.9 | 10646.2 | −46.7 |
| 67 | | | | | | | | | | 1045 | | 1090 | | | | | | | | | |
| 68 | | | | | | | | | | 1125 | | 1150 | | | | | | | | | |
| 69 | | | | | | | | | | 1040 | | 1085 | | | | 183 | 811 | 323 | −3.3 | 8945.3 | 54.1 |
| 70 | 567 | 617 | | | 2.418 | 0.358 | | | | 1050 | | 1075 | | | | 138 | 650 | 391 | −3.9 | 10557.8 | −43.7 |
| 71 | | | | | | | 1015 | | | 1015 | | 1040 | | | | 1349 | 1349 | 793 | −3.6 | 9581.7 | 30.1 |

Glass Properties | Heat Treated Glass

| Ex. | T200 P | T16 kP | T35 kP | T160 kP | 700° C.-4 hr | 750° C.-4 hr | 800° C.-4 hr | PB Crystal Size (nm) |
|---|---|---|---|---|---|---|---|---|
| 49 | | | | | | | | |
| 51 | | | | | | | | |
| 52 | | | | | | | | |
| 53 | 1641 | 1251 | 1200 | 1113 | | | | |
| 54 | 1637 | 1246 | 1195 | 1109 | | | | |
| 55 | | | | | | | | |
| 56 | 1632 | 1239 | 1189 | 1102 | | | | |
| 57 | | | | | ε-Fe₂O₃ | ε-Fe₂O₃ | ε-Fe₂O₃ | |
| 58 | | | | | | | | |
| 59 | | | | | | PB | | |
| 60 | 1637 | 1241 | 1190 | 1103 | PB | | ε-Fe₂O₃ | |
| 61 | | | | | | | | |
| 62 | 1623 | 1232 | 1181 | 1093 | | | | |

TABLE II-continued

| | Glass Properties | | | | | | | Heat Treated Glass | | | |
|---|---|---|---|---|---|---|---|---|---|---|---|
| Ex. | Annealing Pt (° C.) | ρ (g/cm³) | $T_{liqts}$ (° C.) | Color (850° C.-4 hr) | | | XRD (750° C.-4 hr) | | XRD (780° C.-4 hr) | XRD (800° C.-4 hr) | XRD (850° C.-4 hr) |
| 63 | | | | Brown | 1650 | 1255 | 1204 | 1116 | ε-Fe₂O₃ | ε-Fe₂O₃ | Rutile, PB, Hematite |
| 64 | 700 | | | Amber translucent | 1652 | 1250 | 1199 | 1111 | | | Amorphous |
| 65 | 700 | | | Amber translucent | 1647 | 1254 | 1203 | 1114 | | | Amorphous |
| 66 | 700 | | | White GC | 1666 | 1261 | 1209 | 1119 | | | Anatase |
| 67 | 700 | | | | 1669 | 1261 | 1209 | 1120 | | | Rutile |
| 68 | 680 | | | Khaki Grey translucent | 1671 | 1267 | 1215 | 1125 | | Trace Rutile | Rutile |
| 69 | 680 | | | Khaki Grey translucent | 1675 | 1265 | 1213 | 1122 | Trace Berlinite, Magnetite | Rutile | PB, Rutile |
| 70 | 680 | | | Black Opaque | 1679 | 1265 | 1212 | 1122 | Trace Berlinite, Magnetite | PB, Rutile | PB, Rutile |
| 71 | 680 | | | Black Opaque | 1671 | 1267 | 1214 | 1123 | PB, Berlinite, Magnetite | PB, Rutile | PB, Rutile |
| 72 | 680 | | | Black Opaque | | | ε-Fe₂O₃ | ε-Fe₂O₃ | PB, Berlinite, Magnetite | PB, Rutile | PB, Rutile |
| 74 | 680 | | | | | | PB + ε-Fe₂O₃ | | Magnetite or Magnesioferrite | Magnetite or Magnesioferrite | Magnetite or Magnesioferrite |
| 75 | 680 | | | White Light Opal | | | | | | | |
| 76 | 680 | | | White Opal | | | | | | | |
| 78 | 680 | | | Clear Glass | | | Amorphous | | Amorphous | Amorphous | Amorphous |
| 79 | 680 | | | White Opal | | | | | | | |
| 80 | 680 | | 1080 | Clear Glass | | | | | | | |
| 81 | 680 | | 1090 | White Opal | | | | | | | |
| 82 | 680 | | | Clear Glass | | | | | | | |
| 83 | 680 | | | Spontaneous Ceramic | | | | | | | |
| 84 | 680 | | | Clear Glass | | | | | | | |
| 86 | 680 | | | Bluish White Light Opal | | | | | | | |
| 87 | 680 | | | White GC | | | | | | | |
| 90 | 680 | | | Cream Opal | | | | | | | |
| 91 | 680 | | | White GC | | | | | | | |
| 92 | 680 | | | White GC | | | | | | | |
| 93 | 680 | | | White GC | | | | | | | |
| 94 | 680 | | | White Opal | | | | | | | |
| 95 | 680 | | | | | | | | | | |
| 96 | 680 | | | | | | | | | | |
| 97 | 680 | | | | | | | | | | |
| 98 | 680 | | | | | | | | | | |
| 99 | 680 | | | | | | | | | | |
| 100 | 680 | | | | | | | | | | |
| 101 | 680 | | | | | | | | | | |
| 102 | 680 | | | | | | | | | | |
| 103 | 680 | | | | | | | | | | |
| 104 | 680 | | | | | | | | | | |
| 105 | 680 | | | | | | | | | | |
| 106 | 680 | | | | | | | | | | |
| 107 | 680 | | | | | | | | | | |

TABLE III

| Example-> | 49 | 51 | 52 | 53 |
|---|---|---|---|---|
| XRD Results | | | | |
| As Made Glass | | | | amorphous |
| Heat Treated Glasses | | | | |
| Nucleation Temperature-time ($T_n$-$t_n$) / Growth Temperature-time ($T_c$-$t_c$) | | | | |
| 630° C.-2 hrs / 675° C.-4 hrs | | | | |
| 630° C.-2 hrs / 700° C.-4 hrs | | | | |
| 630° C.-2 hrs / 725° C.-4 hrs | | | | Amorphous |
| 630° C.-2 hrs / 750° C.-4 hrs | | | | ε-$Fe_2O_3$ |
| 630° C.-2 hrs / 775° C.-4 hrs | | | | ε-$Fe_2O_3$ |
| 630° C.-2 hrs / 800° C.-4 hrs | | | | ε-$Fe_2O_3$ |
| Indentation Threshold (kg) | | | | |
| As Made Glass-> | | | 37.5 | |
| Heat Treated Glasses Tn-tn / Tc-tc | | | | |
| 630° C.-2 hrs / 675° C.-4 hrs | | | 50 | |
| 630° C.-2 hrs / 700° C.-4 hrs | | | 22.5 | |
| 630° C.-2 hrs / 725° C.-4 hrs | | | | |
| 630° C.-2 hrs / 750° C.-4 hrs | | | | |
| Transmission Percent (%) | | | | |
| As Made Glass-> | | | | |
| Heat Treated Glasses Tn-$t_n$ / Tc-$t_c$ | | | | |
| 630° C.-2 hrs / 675° C.-4 hrs | | | 13.22 | 27.98 |
| 630° C.-2 hrs / 700° C.-4 hrs | 83.49 | | 0.98 | 0.97 |
| 630° C.-2 hrs / 725° C.-4 hrs | | | 0.07 | na |
| 630° C.-2 hrs / 750° C.-4 hrs | | | 0.08 | 0.05 |
| 630° C.-2 hrs / 775° C.-4 hrs | 4 | | | |
| 630° C.-2 hrs / 800° C.-4 hrs | na | | | |

| Example-> | 54 | 55 | 56 | 57 | 58 |
|---|---|---|---|---|---|
| XRD Results | | | | | |
| As Made Glass | | | | | |
| Heat Treated Glasses | | | | | |
| Nucleation Temperature-time ($T_n$-$t_n$) / Growth Temperature-time ($T_c$-$t_c$) | | | | | |
| 630° C.-2 hrs / 675° C.-4 hrs | | | | | |
| 630° C.-2 hrs / 700° C.-4 hrs | | | | | |
| 630° C.-2 hrs / 725° C.-4 hrs | | | | | ε-$Fe_2O_3$ |
| 630° C.-2 hrs / 750° C.-4 hrs | | ε-$Fe_2O_3$ | | PB | ε-$Fe_2O_3$ |
| 630° C.-2 hrs / 775° C.-4 hrs | | ε-$Fe_2O_3$ | | PB | |
| 630° C.-2 hrs / 800° C.-4 hrs | | | | | ε-$Fe_2O_3$ |
| Indentation Threshold (kg) | | | | | |
| As Made Glass-> | | | | 37.5 | |
| Heat Treated Glasses Tn-tn / Tc-tc | | | | | |
| 630° C.-2 hrs / 675° C.-4 hrs | | | | 22.5 | |
| 630° C.-2 hrs / 700° C.-4 hrs | | | | | |
| 630° C.-2 hrs / 725° C.-4 hrs | | | | | |
| 630° C.-2 hrs / 750° C.-4 hrs | | | | | |
| Transmission Percent (%) | | | | | |
| As Made Glass-> | | | | | |
| Heat Treated Glasses Tn-$t_n$ / Tc-$t_c$ | | | | | |
| 630° C.-2 hrs / 675° C.-4 hrs | 3.71 | | 0.06 | 0.07 | 0.08 |
| 630° C.-2 hrs / 700° C.-4 hrs | 0.08 | 0.16 | 0.06 | 0.08 | 0.06 |
| 630° C.-2 hrs / 725° C.-4 hrs | 0.09 | | 0.08 | 0.11 | 0.09 |
| 630° C.-2 hrs / 750° C.-4 hrs | 0.04 | 0.04 | 0.15 | 0.63 | 0.08 |
| 630° C.-2 hrs / 775° C.-4 hrs | | 0.13 | | 0.95 | |
| 630° C.-2 hrs / 800° C.-4 hrs | | | | | |

TABLE III-continued

| Example-> | 59 | 60 | 61 | 62 | 63 |
|---|---|---|---|---|---|
| XRD Results | | | | | |
| As Made Glass | | Amorphous | | | Amorphous |

Heat Treated Glasses

| Nucleation Temperature-time $(T_n\text{-}t_n)$ | Growth Temperature-time $(T_c\text{-}t_c)$ | | | | |
|---|---|---|---|---|---|
| 630° C.-2 hrs | 675° C.-4 hrs | | | | |
| 630° C.-2 hrs | 700° C.-4 hrs | | | $\varepsilon\text{-}Fe_2O_3$ | $\varepsilon\text{-}Fe_2O_3$ |
| 630° C.-2 hrs | 725° C.-4 hrs | $\varepsilon\text{-}Fe_2O_3$ | Trace Magnetite | | |
| 630° C.-2 hrs | 750° C.-4 hrs | $\varepsilon\text{-}Fe_2O_3$ | $\varepsilon\text{-}Fe_2O_3$ | $\varepsilon\text{-}Fe_2O_3$ | $\varepsilon\text{-}Fe_2O_3$ |
| 630° C.-2 hrs | 775° C.-4 hrs | $\varepsilon\text{-}Fe_2O_3$ | | $\varepsilon\text{-}Fe_2O_3$ | $\varepsilon\text{-}Fe_2O_3$ |
| 630° C.-2 hrs | 800° C.-4 hrs | | | | |

Indentation Threshold (kg)

As Made Glass->
Heat Treated Glasses

| Tn-tn | Tc-tc | | | | |
|---|---|---|---|---|---|
| 630° C.-2 hrs | 675° C.-4 hrs | | | | |
| 630° C.-2 hrs | 700° C.-4 hrs | | | | |
| 630° C.-2 hrs | 725° C.-4 hrs | | | | |
| 630° C.-2 hrs | 750° C.-4 hrs | | | | |

Transmission Percent (%)

As Made Glass->
Heat Treated Glasses

| $Tn\text{-}t_n$ | $Tc\text{-}T_c$ | | | | |
|---|---|---|---|---|---|
| 630° C.-2 hrs | 675° C.-4 hrs | 0.06 | | | |
| 630° C.-2 hrs | 700° C.-4 hrs | 0.07 | 0.86 | 0.08 | 0.03 |
| 630° C.-2 hrs | 725° C.-4 hrs | 0.05 | 0.03 | 0.07 | 0.04 | 0.03 |
| 630° C.-2 hrs | 750° C.-4 hrs | 0.07 | 0.02 | 0.07 | 0.03 | |
| 630° C.-2 hrs | 775° C.-4 hrs | | 0.03 | | 0.05 | |
| 630° C.-2 hrs | 800° C.-4 hrs | | | | | |

| Example-> | 64 | 65 | 66 | 67 | 68 |
|---|---|---|---|---|---|
| XRD Results | | | | | |

As Made Glass
Heat Treated Glasses

| Nucleation Temperature-time $(T_n\text{-}t_n)$ | Growth Temperature-time $(T_c\text{-}t_c)$ | | | | |
|---|---|---|---|---|---|
| 630° C.-2 hrs | 675° C.-4 hrs | | | | |
| 630° C.-2 hrs | 700° C.-4 hrs | | | | |
| 630° C.-2 hrs | 725° C.-4 hrs | | | | |
| 630° C.-2 hrs | 750° C.-4 hrs | | | | PB |
| 630° C.-2 hrs | 775° C.-4 hrs | | | | PB |
| 630° C.-2 hrs | 800° C.-4 hrs | | | | |

Indentation Threshold (kg)

As Made Glass->
Heat Treated Glasses

| Tn-tn | Tc-tc | | | | |
|---|---|---|---|---|---|
| 630° C.-2 hrs | 675° C.-4 hrs | | | | |
| 630° C.-2 hrs | 700° C.-4 hrs | 17.5 | | | |
| 630° C.-2 hrs | 725° C.-4 hrs | | | | |
| 630° C.-2 hrs | 750° C.-4 hrs | | | | |

Transmission Percent (%)

As Made Glass->
Heat Treated Glasses

| $Tn\text{-}t_n$ | $Tc\text{-}t_c$ | | | | |
|---|---|---|---|---|---|
| 630° C.-2 hrs | 675° C.-4 hrs | 0.09 | 0.04 | | 0.02 | 0.05 |
| 630° C.-2 hrs | 700° C.-4 hrs | 0.09 | 0.03 | | 0.02 | 0.03 |
| 630° C.-2 hrs | 725° C.-4 hrs | 0.02 | 0.03 | 0.05 | 0.02 | 0.02 |
| 630° C.-2 hrs | 750° C.-4 hrs | 0.03 | 0.02 | 0.03 | 0.03 | 0.03 |
| 630° C.-2 hrs | 775° C.-4 hrs | 0.03 | 0.02 | 0.05 | 0.92 | 1.35 |
| 630° C.-2 hrs | 800° C.-4 hrs | | | | | |

TABLE III-continued

| Example-> | 69 | 70 | 71 |
|---|---|---|---|
| XRD Results | | | |
| As Made Glass | | | Amorphous |

Heat Treated Glasses

| Nucleation Temperature-time ($T_n$-$t_n$) | Growth Temperature-time ($T_c$-$t_c$) | | | |
|---|---|---|---|---|
| 630° C.-2 hrs | 675° C.-4 hrs | | | |
| 630° C.-2 hrs | 700° C.-4 hrs | | | |
| 630° C.-2 hrs | 725° C.-4 hrs | | | |
| 630° C.-2 hrs | 750° C.-4 hrs | | | |
| 630° C.-2 hrs | 775° C.-4 hrs | | | |
| 630° C.-2 hrs | 800° C.-4 hrs | | | |

Indentation Threshold (kg)

| As Made Glass-> | | | 35-40 | |

Heat Treated Glasses

| Tn-tn | Tc-tc | | | |
|---|---|---|---|---|
| 630° C.-2 hrs | 675° C.-4 hrs | | | |
| 630° C.-2 hrs | 700° C.-4 hrs | | 37.5 | |
| 630° C.-2 hrs | 725° C.-4 hrs | | | |
| 630° C.-2 hrs | 750° C.-4 hrs | | | |

Transmission Percent (%)

| As Made Glass-> | | | | |

Heat Treated Glasses

| Tn-$t_n$ | Tc-$t_c$ | | | |
|---|---|---|---|---|
| 630° C.-2 hrs | 675° C.-4 hrs | 0.02 | 0.03 | 0.02 |
| 630° C.-2 hrs | 700° C.-4 hrs | 0.02 | 0.03 | 0.02 |
| 630° C.-2 hrs | 725° C.-4 hrs | 0.02 | 0.03 | 0.03 |
| 630° C.-2 hrs | 750° C.-4 hrs | 0.04 | 0.04 | 0.04 |
| 630° C.-2 hrs | 775° C.-4 hrs | 0.4 | 0.97 | 0.25 |
| 630° C.-2 hrs | 800° C.-4 hrs | | | |

TABLE IV

| Example-> | 49 | 51 | 52 | 53 |
|---|---|---|---|---|
| CIE L* D65 SCE Results | | | | |

As Made Glass
Heat Treated Glasses

| Nucleation Temperature-time ($T_n$-$t_n$) | Growth Temperature-time ($T_c$-$t_c$) | | | | |
|---|---|---|---|---|---|
| 630° C.-2 hrs | 675° C.-4 hrs | | | 0.54 | 2.78 |
| 630° C.-2 hrs | 700° C.-4 hrs | 64.69 | | 0.28 | 0.25 |
| 630° C.-2 hrs | 725° C.-4 hrs | | | 0.93 | 0.6 |
| 630° C.-2 hrs | 750° C.-4 hrs | | | 3.2 | 5.67 |
| 630° C.-2 hrs | 775° C.-4 hrs | 17.085 | | | 10.21 |
| 630° C.-2 hrs | 800° C.-4 hrs | 26.76 | | | |

CIE a* D65 SCE Results

As Made Glass->
Heat Treated Glasses

| Tn-tn | Tc-tc | | | | |
|---|---|---|---|---|---|
| 630° C.-2 hrs | 675° C.-4 hrs | | | 0.62 | 7.09 |
| 630° C.-2 hrs | 700° C.-4 hrs | 2.6 | | 0.05 | 0.03 |
| 630° C.-2 hrs | 725° C.-4 hrs | | | -0.1 | 0.08 |
| 630° C.-2 hrs | 750° C.-4 hrs | | | -0.3 | -0.135 |
| 630° C.-2 hrs | 775° C.-4 hrs | -1.15 | | | -0.54 |
| 630° C.-2 hrs | 800° C.-4 hrs | -1.29 | | | |

CIE b* D65 SCE Results

As Made Glass->
Heat Treated Glasses

| Tn-$t_n$ | Tc-$t_c$ | | | | |
|---|---|---|---|---|---|
| 630° C.-2 hrs | 675° C.-4 hrs | | | -0.14 | 3.59 |
| 630° C.-2 hrs | 700° C.-4 hrs | 28.68 | | -0.31 | -0.35 |
| 630° C.-2 hrs | 725° C.-4 hrs | | | -1.46 | -0.95 |
| 630° C.-2 hrs | 750° C.-4 hrs | | | -3.75 | -4.89 |
| 630° C.-2 hrs | 775° C.-4 hrs | -6.265 | | | -6.06 |
| 630° C.-2 hrs | 800° C.-4 hrs | -2.82 | | | |

| Example-> | 54 | 55 | 56 | 57 | 58 |
|---|---|---|---|---|---|
| CIE L* D65 SCE Results | | | | | |

As Made Glass
Heat Treated Glasses

| Nucleation Temperature-time ($T_n$-$t_n$) | Growth Temperature-time ($T_c$-$t_c$) | | | | | |
|---|---|---|---|---|---|---|
| 630° C.-2 hrs | 675° C.-4 hrs | 0.39 | | 0.26 | 0.19 | 0.41 |
| 630° C.-2 hrs | 700° C.-4 hrs | 0.345 | | 0.27 | 0.27 | 0.2 |
| 630° C.-2 hrs | 725° C.-4 hrs | 1.14 | | 0.29 | 0.22 | 0.19 |
| 630° C.-2 hrs | 750° C.-4 hrs | 2.08 | | 0.29 | 0.34 | 0.35 |
| 630° C.-2 hrs | 775° C.-4 hrs | | | 0.99 | | 1.28 |
| 630° C.-2 hrs | 800° C.-4 hrs | | | | | |

CIE a* D65 SCE Results

As Made Glass->
Heat Treated Glasses

| Tn-tn | Tc-tc | | | | | |
|---|---|---|---|---|---|---|
| 630° C.-2 hrs | 675° C.-4 hrs | -0.03 | | 0.03 | 0.01 | 0.04 |
| 630° C.-2 hrs | 700° C.-4 hrs | 0.005 | | -0.08 | 0 | -0.01 |
| 630° C.-2 hrs | 725° C.-4his | -0.12 | | -0.15 | -0.04 | 0.04 |
| 630° C.-2 hrs | 750° C.-4 hrs | -0.21 | | 0.07 | -0.06 | -0.06 |
| 630° C.-2 hrs | 775° C.-4 hrs | | | -0.09 | | -0.09 |
| 630° C.-2 hrs | 800° C.-4 hrs | | | | | |

TABLE IV-continued

CIE b* D65 SCE Results

As Made Glass-> Heat Treated Glasses

| $T_t$-$t_n$ | $T_c$-$t_c$ | | | | |
|---|---|---|---|---|---|
| 630° C.-2 hrs | 675° C.-4 hrs | −0.48 | | −0.41 | −0.25 | −0.53 |
| 630° C.-2 hrs | 700° C.-4 hrs | −0.74 | | −0.34 | −0.36 | −0.26 |
| 630° C.-2 hrs | 725° C.-4 hrs | −1.62 | | −0.36 | −0.29 | −0.3 |
| 630° C.-2 hrs | 750° C.-4 hrs | −2.53 | | −0.41 | −0.55 | −0.44 |
| 630° C.-2 hrs | 775° C.-4 hrs | | −1.25 | | −1.89 | |
| 630° C.-2 hrs | 800° C.-4 hrs | | | | | |

| Example-> | 59 | 60 | 61 | 62 | 63 |
|---|---|---|---|---|---|

CIE L* D65 SCE Results

As Made Glass Heat Treated Glasses

| Nucleation Temperature-time ($T_n$-$t_n$) | Growth Temperature-time ($T_c$-$t_c$) | | | | | |
|---|---|---|---|---|---|---|
| 630° C.-2 hrs | 675° C.-4 hrs | 0.24 | | | | |
| 630° C.-2 hrs | 700° C.-4 hrs | 0.17 | 0.45 | 0.33 | 0.18 | |
| 630° C.-2 hrs | 725° C.-4 hrs | 0.5 | 0.23 | 0.26 | 0.2 | 0.12 |
| 630° C.-2 hrs | 750° C.-4 hrs | 0.7 | 1.37 | 0.77 | 0.45 | |
| 630° C.-2 hrs | 775° C.-4 hrs | | 1.09 | | 0.56 | |
| 630° C.-2 hrs | 800° C.-4 hrs | | | | | |

CIE a* D65 SCE Results

As Made Glass-> Heat Treated Glasses

| Tn-tn | Tc-tc | | | | | |
|---|---|---|---|---|---|---|
| 630° C.-2 hrs | 675° C.-4 hrs | −0.01 | | | | |
| 630° C.-2 hrs | 700° C.-4 hrs | 0.02 | 0.11 | 0.02 | −0.05 | |
| 630° C.-2 hrs | 725° C.-4 hrs | −0.01 | 0.03 | −0.01 | 0.065 | 0.03 |
| 630° C.-2 hrs | 750° C.-4 hrs | −0.05 | 0.15 | −0.07 | 0.02 | |
| 630° C.-2 hrs | 775° C.-4 hrs | | 0.07 | | −0.05 | |
| 630° C.-2 hrs | 800° C.-4 hrs | | | | | |

CIE b* D65 SCE Results

As Made Glass-> Heat Treated Glasses

| $T_t$-$t_n$ | $T_c$-$t_c$ | | | | | |
|---|---|---|---|---|---|---|
| 630° C.-2 hrs | 675° C.-4 hrs | −0.42 | | | | |
| 630° C.-2 hrs | 700° C.-4 hrs | −0.28 | −0.43 | −0.39 | −0.27 | |
| 630° C.-2 hrs | 725° C.-4 hrs | −0.91 | −0.33 | −0.4 | −0.295 | −0.19 |
| 630° C.-2 hrs | 750° C.-4 hrs | −1.06 | −0.25 | −0.9 | −0.26 | |
| 630° C.-2 hrs | 775° C.-4 hrs | | −1.29 | | −0.74 | |
| 630° C.-2 hrs | 800° C.-4 hrs | | | | | |

| Example-> | 64 | 65 | 66 | 67 | 68 |
|---|---|---|---|---|---|

CIE L* D65 SCE Results

As Made Glass Heat Treated Glasses

| Nucleation Temperature-time ($T_n$-$t_n$) | Growth Temperature-time ($T_c$-$t_c$) | | | | | |
|---|---|---|---|---|---|---|
| 630° C.-2 hrs | 675° C.-4 hrs | 0.29 | | | 0.16 | 0.19 |
| 630° C.-2 hrs | 700° C.-4 hrs | 0.5 | 0.19 | | 0.2 | 0.24 |
| 630° C.-2 hrs | 725° C.-4 hrs | 0.37 | 0.29 | 0.45 | 0.24 | 0.47 |
| 630° C.-2 hrs | 750° C.-4 hrs | 0.3 | 0.25 | 0.31 | 0.4 | 0.51 |
| 630° C.-2 hrs | 775° C.-4 hrs | 0.72 | 0.48 | 0.43 | 4.24 | 3.8 |
| 630° C.-2 hrs | 800° C.-4 hrs | | | | | |

CIE a* D65 SCE Results

As Made Glass-> Heat Treated Glasses

| Tn-tn | Tc-tc | | | | | |
|---|---|---|---|---|---|---|
| 630° C.-2 hrs | 675° C.-4 hrs | −0.08 | | | 0.08 | −0.02 |
| 630° C.-2 hrs | 700° C.-4 hrs | −0.11 | 0.04 | | −0.09 | 0 |
| 630° C.-2 hrs | 725° C.-4 hrs | −0.06 | 0.01 | 0.04 | −0.02 | 0.03 |
| 630° C.-2 hrs | 750° C.-4 hrs | −0.05 | −0.06 | −0.07 | 0.03 | 0.07 |
| 630° C.-2 hrs | 775° C.-4 hrs | −0.08 | −0.04 | −0.01 | −0.61 | −0.55 |
| 630° C.-2 hrs | 800° C.-4 hrs | | | | | |

CIE b* D65 SCE Results

As Made Glass-> Heat Treated Glasses

| $T_n$-$t_n$ | $T_c$-$t_c$ | | | | | |
|---|---|---|---|---|---|---|
| 630° C.-2 hrs | 675° C.-4 hrs | −0.37 | | | −0.41 | −0.29 |
| 630° C.-2 hrs | 700° C.-4 hrs | −0.45 | −0.4 | | −0.34 | −0.32 |
| 630° C.-2 hrs | 725° C.-4 hrs | −0.61 | −0.31 | −0.41 | −0.45 | −0.45 |
| 630° C.-2 hrs | 750° C.-4 hrs | −0.5 | −0.35 | −0.25 | −0.62 | −0.88 |
| 630° C.-2 hrs | 775° C.-4 hrs | −1.03 | −0.76 | −0.74 | −4.41 | −3.93 |
| 630° C.-2 hrs | 800° C.-4 hrs | | | | | |

| Example-> | 69 | 70 | 71 |
|---|---|---|---|

CIE L* D65 SCE Results

As Made Glass Heat Treated Glasses

| Nucleation Temperature-time ($T_n$-$t_n$) | Growth Temperature-time ($T_c$-$t_c$) | | | |
|---|---|---|---|---|
| 630° C.-2 hrs | 675° C.-4 hrs | 0.28 | 0.27 | 0.2 |
| 630° C.-2 hrs | 700° C.-4 hrs | 0.19 | 0.15 | 0.21 |
| 630° C.-2 hrs | 725° C.-4 hrs | 0.25 | 0.22 | 1.18 |
| 630° C.-2 hrs | 750° C.-4 hrs | 0.39 | 0.49 | 2.04 |
| 630° C.-2 hrs | 775° C.-4 hrs | 3.43 | 4.38 | 4.72 |
| 630° C.-2 hrs | 800° C.-4 hrs | | | |

CIE a* D65 SCE Results

As Made Glass-> Heat Treated Glasses

| Tn-tn | Tc-tc | | | |
|---|---|---|---|---|
| 630° C.-2 hrs | 675° C.-4 hrs | 0.03 | 0.11 | 0.12 |
| 630° C.-2 hrs | 700° C.-4 hrs | 0.04 | 0.07 | 0.09 |
| 630° C.-2 hrs | 725° C.-4 hrs | 0.1 | 0.09 | 0 |
| 630° C.-2 hrs | 750° C.-4 hrs | 0.12 | 0.05 | −0.01 |
| 630° C.-2 hrs | 775° C.-4 hrs | −0.43 | −0.7 | −0.13 |
| 630° C.-2 hrs | 800° C.-4 hrs | | | |

CIE b* D65 SCE Results

As Made Glass-> Heat Treated Glasses

| $T_n$-$t_n$ | $T_c$-$t_c$ | | | |
|---|---|---|---|---|
| 630° C.-2 hrs | 675° C.-4 hrs | −0.36 | −0.34 | −0.22 |
| 630° C.-2 hrs | 700° C.-4 hrs | −0.37 | −0.33 | −0.34 |
| 630° C.-2 hrs | 725° C.-4 hrs | −0.4 | −0.33 | −1.66 |
| 630° C.-2 hrs | 750° C.-4 hrs | −0.84 | −1.02 | −2.67 |
| 630° C.-2 hrs | 775° C.-4 hrs | −3.11 | −4.36 | −5.29 |
| 630° C.-2 hrs | 800° C.-4 hrs | | | |

TABLE V

| Ex | Heat treat | IOX Temp | IOX Time (hrs.) | thickness (mm) | CS (MPa) | DOL (um) |
|---|---|---|---|---|---|---|
| 53 | 630-2 | 430 | 14 | 0.75 | 949.3 | 50.9 |
| 57 | 630-2 | 430 | 14 | 0.76 | 957.9 | 49.8 |
| 59 | 630-2 | 430 | 14 | 0.76 | 941.3 | 49.8 |
| — | 630-1 | 430 | 14 | 0.77 | 952.6 | 48.9 |
| 61 | 630-2 | 430 | 14 | 0.74 | 915.1 | 48.5 |
| 66 | 630-2 | 430 | 14 | 0.78 | 859.8 | 37.8 |
| 68 | | | | | | |
| 71 | 630-2 | 430 | 14 | 0.76 | 938.3 | 56.2 |
| 53 | 630-2 | 410 | 8 | 0.75 | 1012.2 | 31.8 |
| 57 | 630-2 | 410 | 8 | 0.78 | 1024.7 | 28.4 |
| 59 | | | | | | |
| — | 630-2 | 410 | 8 | 0.79 | 1046.9 | 29.7 |
| 61 | 630-2 | 410 | 8 | 0.75 | 990.1 | 30.3 |
| 66 | | | | | | |

TABLE V-continued

| Ex | Heat treat | IOX Temp | IOX Time (hrs.) | thickness (mm) | CS (MPa) | DOL (um) |
|---|---|---|---|---|---|---|
| 68 | 630-1 | 410 | 8 | 0.79 | 1053.4 | 30.4 |
| 71 | 630-2 | 410 | 8 | | | |

Tables II-IV show various properties of the crystallizable glasses and glass-ceramics formed from the Example Compositions in Table I. In Table II, reference to "Amorph" refers to amorphous, "Fay" refers to Fayalite, "Hem" refers to Hematite, "PB" refers to pseudobrookite, and "Mag" refers to Magnetite. Also in Table II, reference to α ($10^{-7}/°$ C.) refers to the coefficient of thermal expansion. Table V includes some heat treatment conditions and IOX conditions, and CS/DOL measurements using FSM, for selected crystallizable glasses, just after nucleation. FSM measurements were used at this stage due to the transparency of the crystallizable glasses. Glass-ceramics exhibit an opacity that does not permit the visible light transmission required for FSM measurements.

The Example Compositions 1-7, 14-17, 43-44, 53, 57, 60, 63 and 71 melted to defect-free fluid homogeneous liquids. All of Example Compositions 1-7, 14-17, 43-44, 53, 57, 60, 63 and 71 formed dark amber colored glasses that were transparent, except for Example Compositions 1 and 5-7 which were black and opaque after annealing. All of the resulting glass-ceramics made from Example Compositions 1-7, 14-17, 43-44, 53, 57, 60, 63 and 71, except for the glass-ceramics made from Example Composition 2, were black and opaque or nearly opaque. The glass-ceramic made from Example Composition 2 exhibited no visual change after ceramming and remained transparent. FIG. 1 compares the transmission spectra for visible and IR wavelengths obtained for as-made and heat treated glasses of Example Composition 15 and indicates the as-made glass transmits sufficiently to enable efficient melting.

Figure 4:
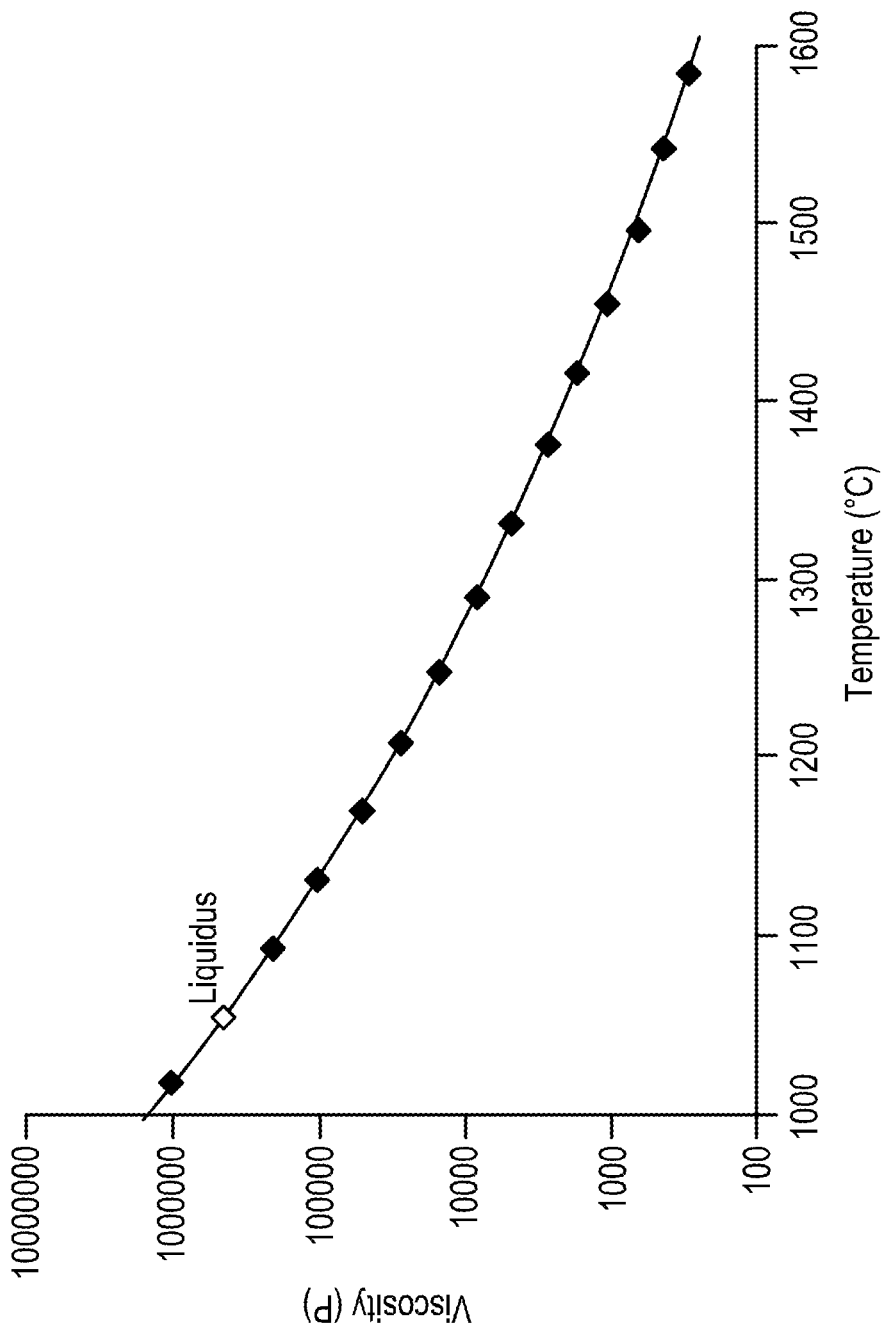
FIG. 4 shows the viscosity versus temperature curve denoting the liquidus temperature and viscosity for a crystallizable glass made from Example Composition 15.

The viscosity of selected Example Compositions from Table 1 was measured by beam bending, disk compression, and rotating cylinder methods according to ASTM standards C1350M-96, C1351M-96, and C965-96 respectively to cover the entire range from strain point to 10 Pa*s. The liquidus was measured by 72 hour gradient boat, density by Archimedes, and thermal expansion by dilatometer according to ASTM standards. FIG. 4 shows the viscosity versus temperature curve denoting the liquidus temperature and viscosity for the glass of Example 15.

Glasses made from selected Example Compositions were then cut into pieces for forming glass-ceramics. The glasses were heated at 5° C./min to 630° C. for 2 hours to nucleate the glass, and then heated to the final growth temperature, held for 4 hours, and cooled to room temperature at furnace rate, resulting in glass-ceramics. Since all samples were nucleated at 630° C. for 2 hours, it is to be assumed all glass-ceramics were first nucleated at 630° C. unless otherwise specified; hence the heat treatment nomenclature "750-4" corresponds to a sample nucleated at 630° C. for 2 hours with a final ceram hold at 750° C. for 4 hours and the heat treatment nomenclature "700-4" corresponds to a sample nucleated at 630° C. for 2 hours with a final ceram hold at 700° C. for 4 hours, etc.

Figure 7:
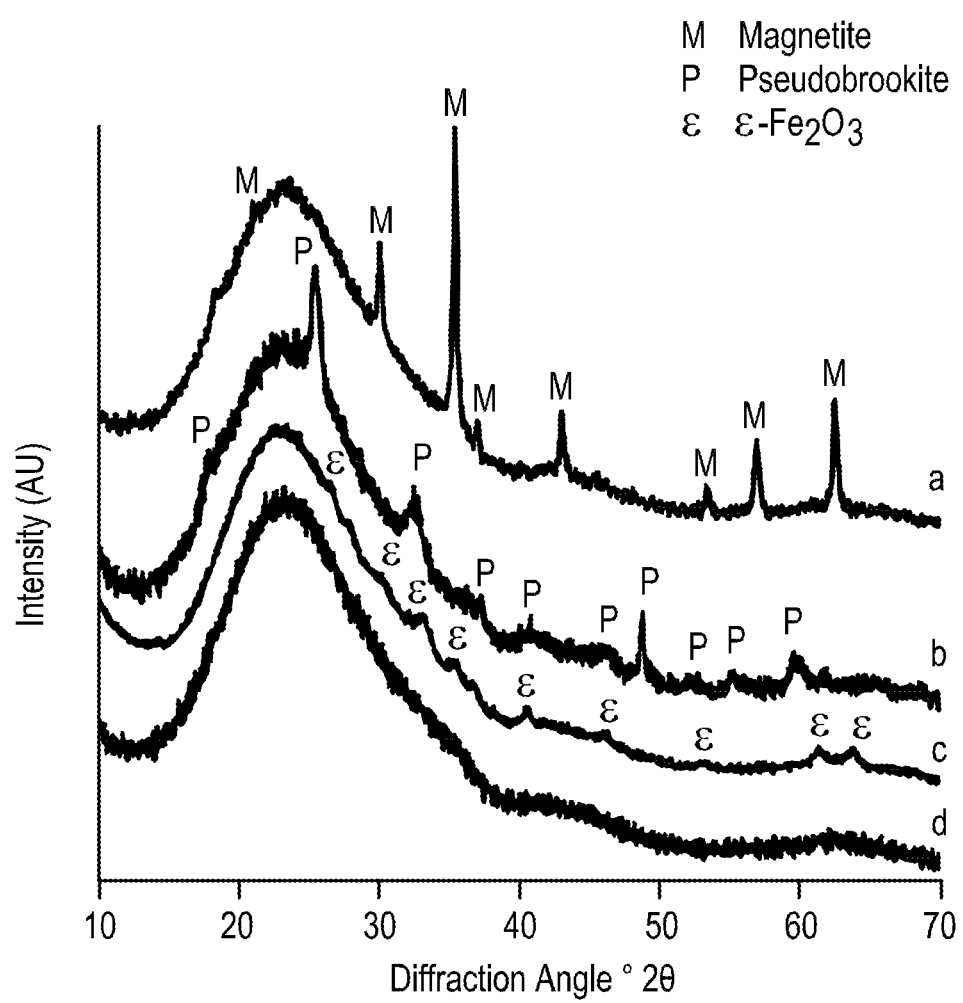
FIG. 7 shows an XRD pattern of a glass-ceramic made from Example Composition 3, after ceramming at 750° C. for 4 hours, an XRD pattern of a glass-ceramic made from Example Composition 10, after ceramming at 750° C. for 4 hours, an XRD pattern of a glass-ceramic made from Example Composition 17, after ceramming at 750° C. for 4 hours, and an XRD pattern of a crystallizable glass made from Example Composition 10 after annealing.

Glasses formed from Example Compositions 2-4, 14-17, 43-44, 53, 57, 60, 63 and 71 were amorphous after annealing. Glasses formed from Example Compositions 1 and 5-6 exhibited magnetite peaks and Glass 7 exhibited magnetite and ε-$Fe_2O_3$. FIG. 7 shows exemplary x-ray diffraction patterns for the 4 types of patterns observed: amorphous, ε-$Fe_2O_3$, (JCPDS 00-016-0653), pseudobrookite (JCPDS 00-041-1432), and magnetite (JCPDS 01-076-2948). Curve "a" in FIG. 7 shows the pattern for a glass-ceramic made from Example Composition 3 after being heat treated at 750-4, which exhibits peaks matching magnetite. Small pieces (<1 mm) of this could be picked up by a magnet as could all the compositions which exhibited a magnetite diffraction pattern. Curve "b" in FIG. 7 shows the pattern for a glass-ceramic made from Example Composition 16 after being heat treated at 750-4. Curve "c" in FIG. 7 shows the pattern for a glass-ceramic made from Example Composition 53 after being heat treated at 750-4. Curve "d" in FIG. 7 shows the pattern for a glass made from Example 16 after annealing. The intensity of the magnetite peaks in the glass-ceramics increased from Example Composition 3 to Example Composition 6, as did the size of the glass-ceramic particles that stuck to the magnet. The glasses/glass-ceramics exhibiting pseudobrookite and ε-$Fe_2O_3$ did not stick to a magnet even for pieces <0.1 mm. As shown in FIG. 7, the glass formed from Example Composition 16 was amorphous after annealing but exhibited peaks corresponding to pseudobrookite after ceramming, as shown by curve "b". Example Composition 53 expressed ε-$Fe_2O_3$ peaks when cerammed at 750° C. as shown by curve c in FIG. 7 and even fainter ε-$Fe_2O_3$ peaks when cerammed at 700° C.

Figure 2:
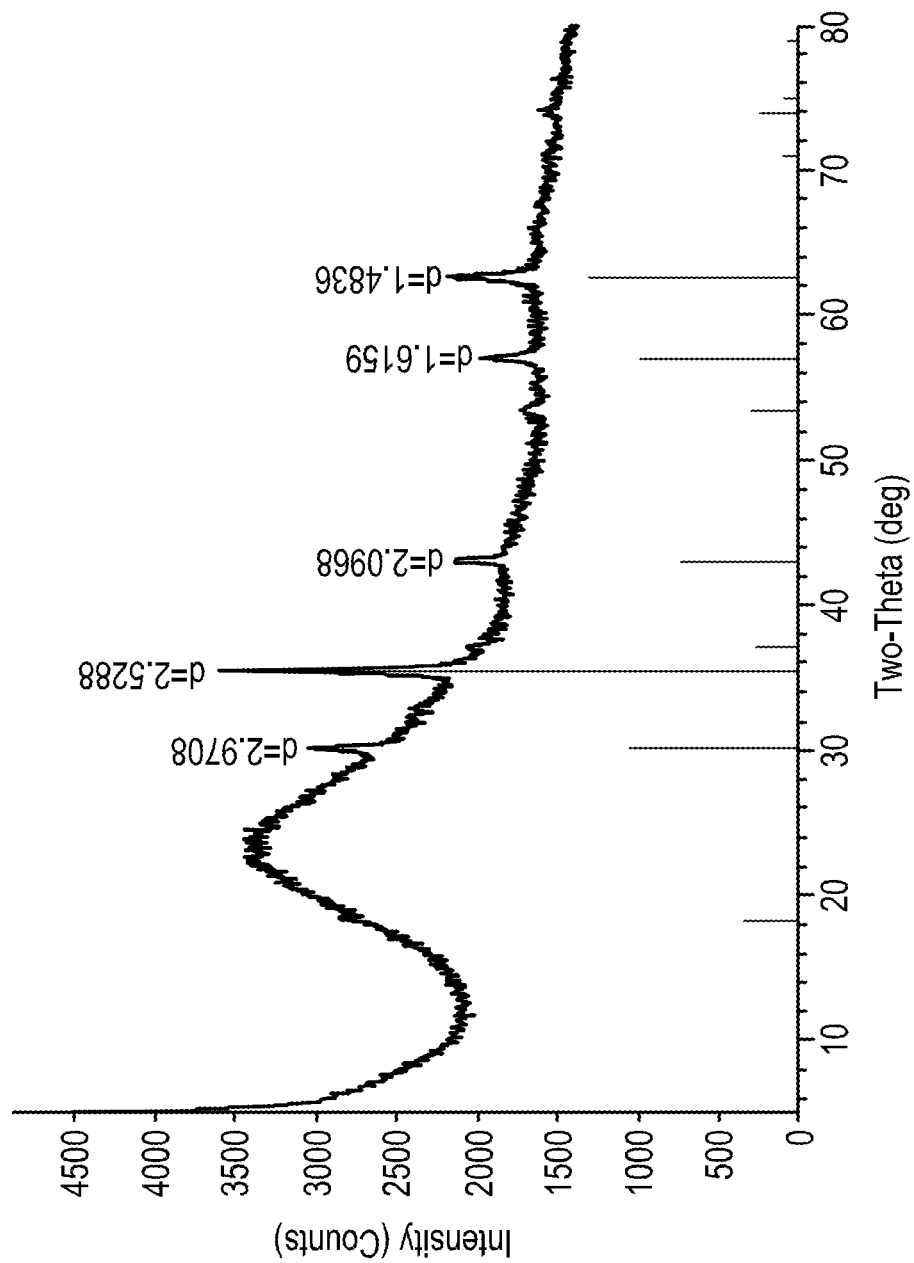
FIG. 2 shows the X-ray diffraction (XRD) pattern obtained for a glass-ceramic made from Example Composition 3 after heat treating at 700° C. for 4 hours.
Figure 3:
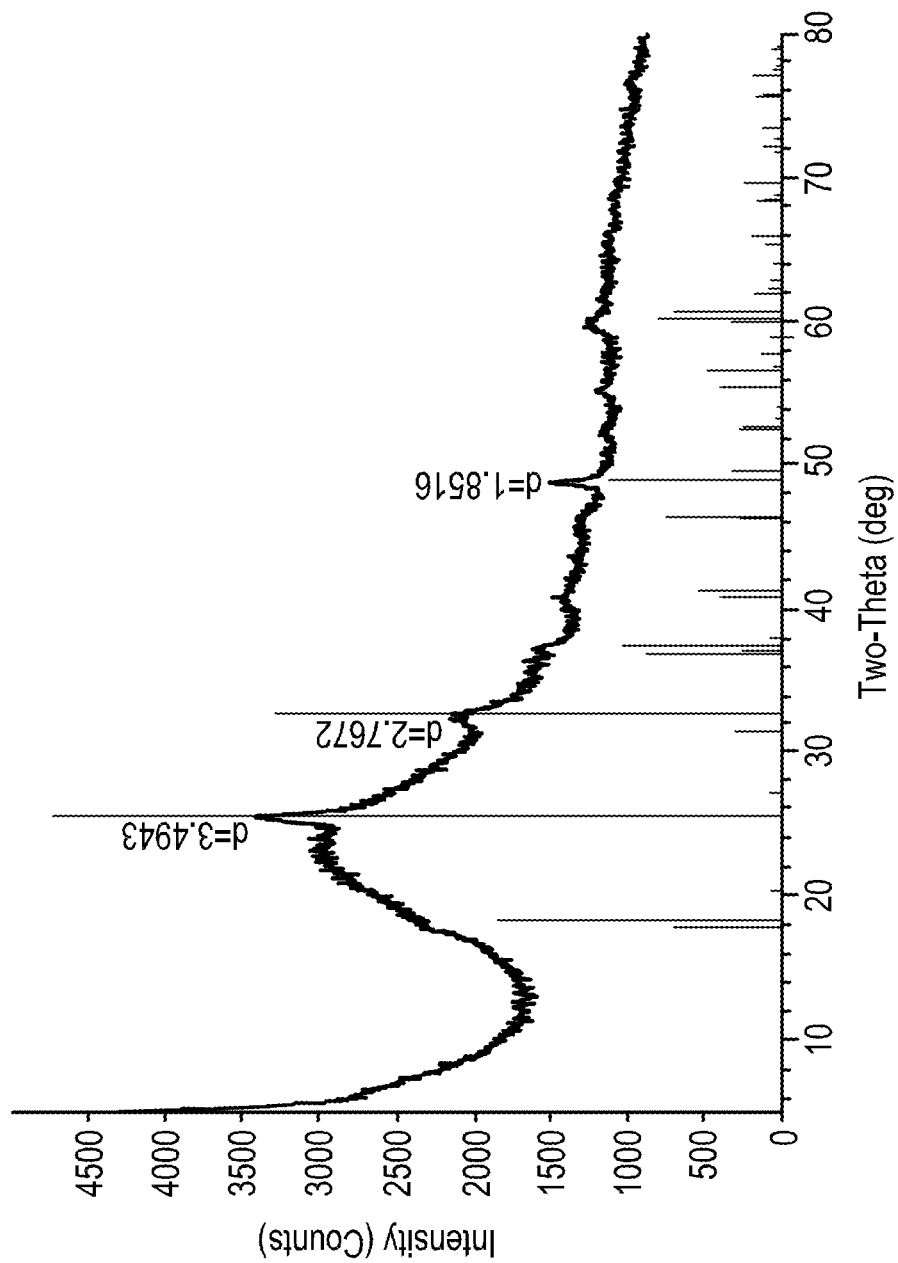
FIG. 3 shows the XRD pattern obtained for a glass-ceramic made from Example Composition 16 after heat treating at 750° C. for 4 hours, showing the presence of pseudobrookite for which line broadening analysis suggests crystallite sizes of roughly between 15-20 nm.

FIG. 2 shows the X-ray diffraction (XRD) pattern obtained for a glass-ceramic made from Example Composition 3, after heat treating at 700° C. for 4 hours, illustrating the presence of Magnetite ($Fe_3O_4$). FIG. 3 shows the XRD pattern obtained for a glass-ceramic made from Example Composition 16, after heat treating at 750° C. for 4 hours, illustrating the presence of pseudobrookite for which line broadening analysis suggests crystallite sizes of roughly between 15-20 nm.

The dielectric constant and loss tangent of selected glass-ceramics were measured from 400 to 3000 MHz on 12 mm long, 3.5 mm diameter rods at Microwave Properties North (325 Wylie Road, Deep River, Ontario, Canada K0J1P0) using the cavity perturbation technique. Optical spectra were measured on a PerkinElmer Lambda 950 UV-Vis-NIR Spectrophotometer from 2500 to 200 nm with 2 nm data interval using 0.8 mm thick samples. In situ high temperature measurements were made on the same instrument using a joule heated hot stage with 0.5 mm thick 13 mm diameter samples under a nitrogen atmosphere to prevent oxidation of the stainless steel sample holder and maintain good thermal contact with the small sample.

Figure 8:
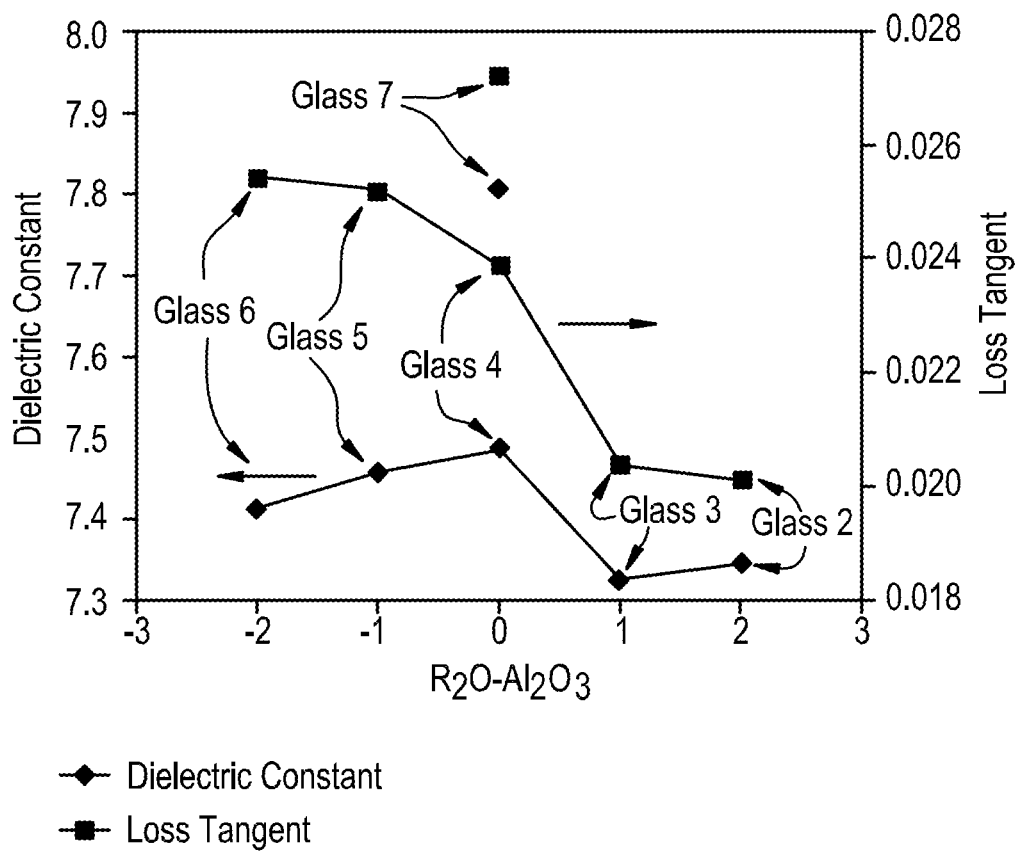
FIG. 8 shows the average dielectric constant and loss tangent as a function of $R_2O$—$Al_2O_3$ for glass-ceramics made from Example Compositions 2-7, after ceramming at 750° C. for 4 hours, over the frequency range of 400 to 3000 MHz.

FIG. 8 shows the average dielectric constant and loss tangent as a function of $R_2O$—$Al_2O_3$ for glass-ceramics made from Example Compositions 2-6, after ceramming at 750-4, over the frequency range of 400 to 3000 MHz. FIG. 8 also shows the dielectric constant and loss tangent as a function of $R_2O$—$Al_2O_3$ for glass-ceramics made from Example Composition 7, after ceramming at 750-4, over the frequency range of 400 to 3000 MHz (shown as individual points in FIG. 8). These data represent a composition set examining alkali to alumina contents at constant $Fe_2O_3$ level plus Example Composition 7, with 2 mole % $TiO_2$ at $R_2O$—$Al_2O_3$=0. Since the dielectric constant K for each glass-ceramic varied by less than 4% over the frequency range measured, an average was used to represent the featureless spectral data for simplicity. The loss tangent was a linearly increasing function of frequency and increased by 0.005+/−0.002 from 400 to 3000 MHz. The dielectric constant shows a discontinuity versus excess alkali at the charge balanced composition where $R_2O$=$Al_2O_3$, while the loss tangent was a sigmoidally decreasing function of excess alkali ($R_2O$—$Al_2O_3$). When 2 mole % $SiO_2$ from the charge balanced composition of Example Composition 4 was replaced with 2 mole % $TiO_2$ to make Example Composition 7, the cerammed phase shifted from magnetite to pseudobrookite and the dielectric constant jumped to 7.8 while the loss tangent increased to 0.027.

The black, magnetite-containing glass-ceramics provide the opacity and other desirable, non-magentic properties for electronic device applications. In other applications, such as appliances, the glass-ceramics exhibit magnetic properties that are desirable. The amount of $TiO_2$ in Example Composition 7 started to shift the crystallite phase away from magnetite as pseudobrookite and $\varepsilon$-$Fe_2O_3$ also precipitated; however, the material spontaneously formed crystals in the annealed precursor glass and its loss tangent was the highest of all the glasses studied thus far. Consequently Example Compositions 14-17 and 43-44 were formulated to explore the newly found pseudobrookite and $\varepsilon$-$Fe_2O_3$ composition space and lower the total $Fe_2O_3$ content to decrease the loss tangent.

Figure 9:
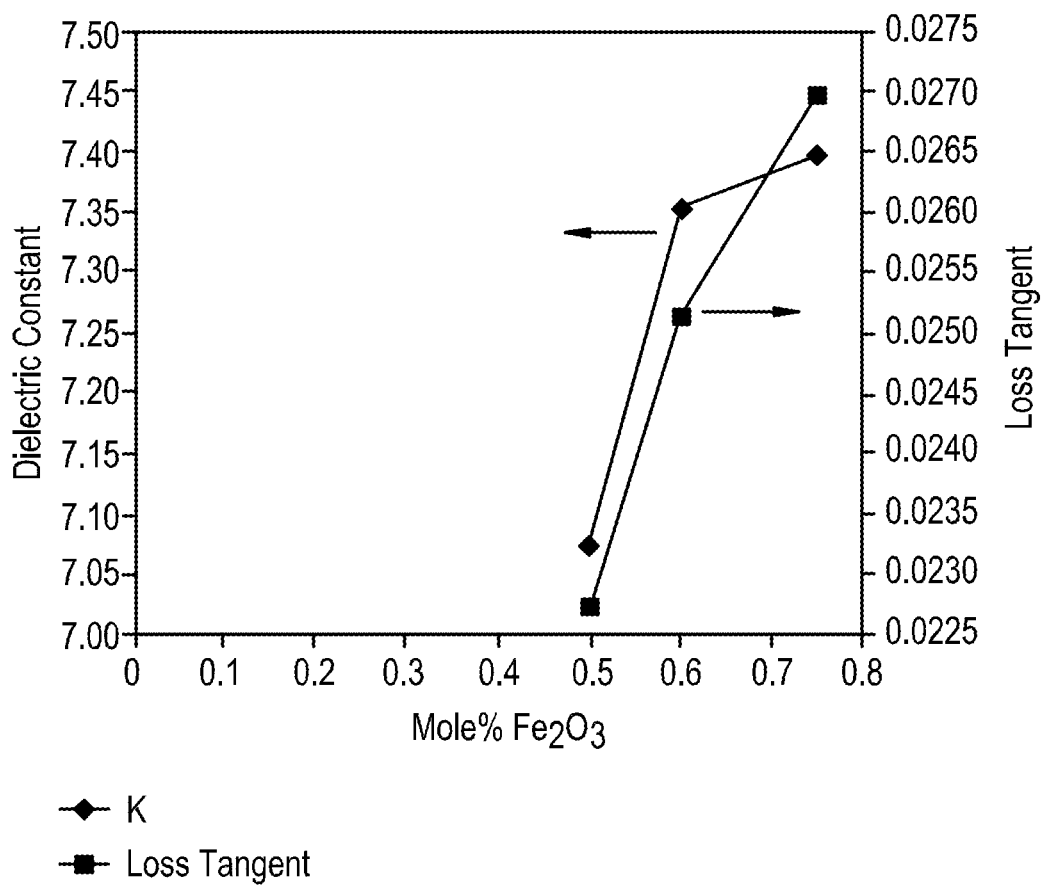
FIG. 9 shows the average dielectric constant and loss tangent as a function of $Fe_2O_3$ content over the frequency range of 400 to 3000 MHz for glass-ceramics made from Example Compositions 9, 12 and 13, after ceramming at 700° C. for 4 hours.

The dielectric constant and loss tangent for glass-ceramics with a lower $Fe_2O_3$ content (e.g., glass-ceramics formed from Example Compositions 15, 43 and 44, which are plotted in FIG. 9), show the large decrease in dielectric constant and loss tangent with decreasing $Fe_2O_3$ content. It should be noted that Example Composition 43 also has a lower $TiO_2$ content and a greater $SiO_2$ content than Example Compositions 15 and 44, which could also contribute to the more rapidly decreasing loss tangent and dielectric constant between 0.6 and 0.5 mole % $Fe_2O_3$.

Figure 10:
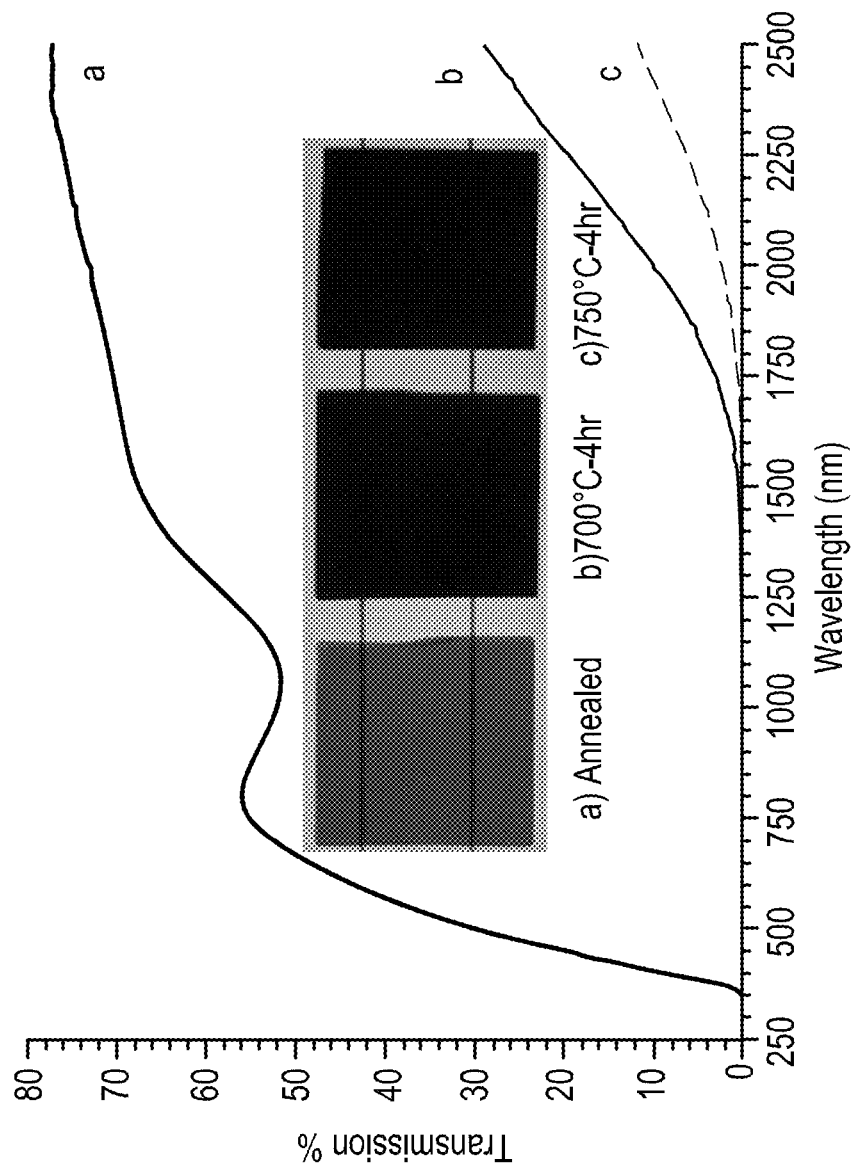
FIG. 10 shows the transmission spectra of a crystallizable glass or glass-ceramic, made from Example Composition 9, having thickness of about 0.8 mm, after being subjected to various heat treatments.

FIG. 10 shows the transmission spectra of crystallizable glasses made from Example Composition 15 as a function of heat treatment. The samples of crystallizable glass were placed on lined paper and had dimensions of 25 mm×25 mm×0.8 mm. The samples were amber, yet transparent, after annealing. After the samples were nucleated at 630° C. and cerammed at 700° C. and 750° C., respectively, for 4 hours, they were pitch black and opaque, even at a thickness of about 0.8 mm. The transmission increases at wavelengths longer than 1500 nm, with samples heat-treated at lower temperature exhibiting higher IR transmission.

Figure 11:
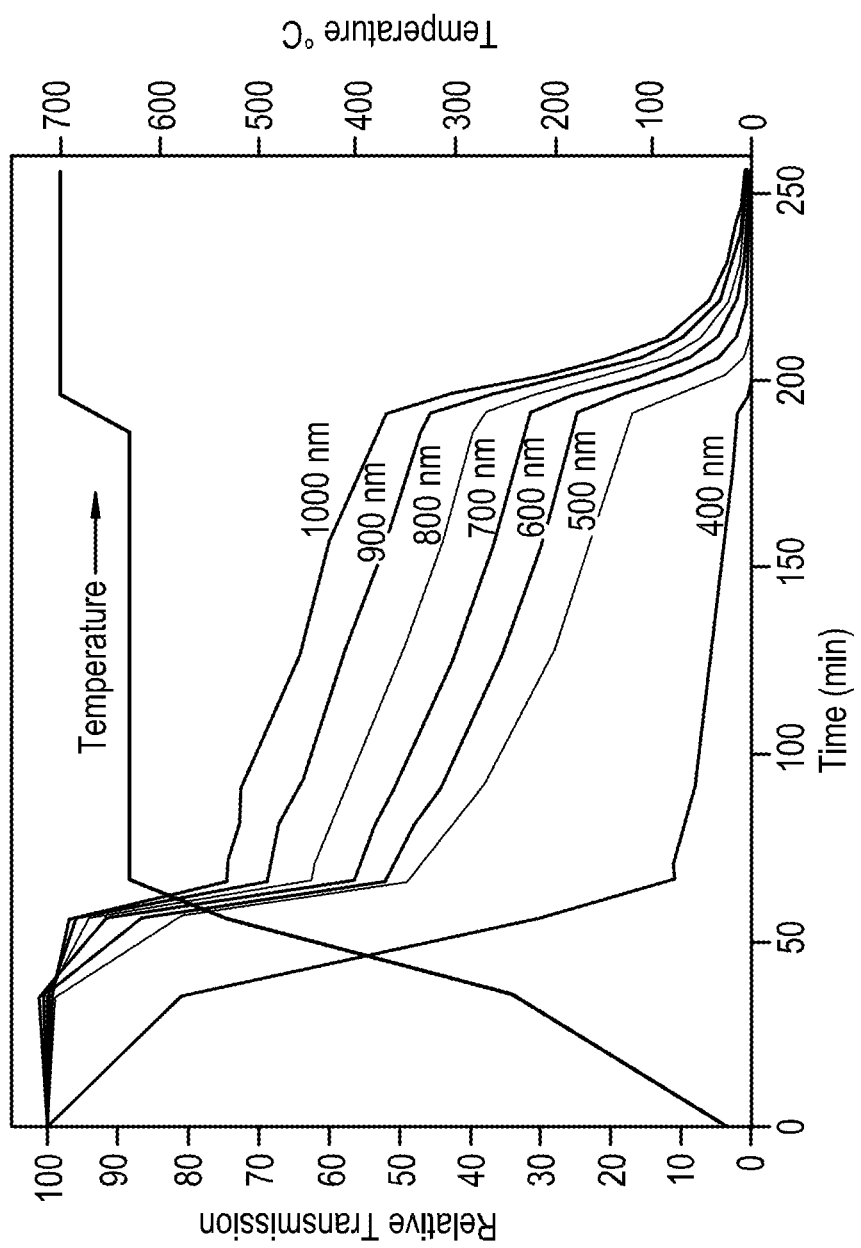
FIG. 11 shows in situ transmission at various wavelengths during the ceramming process of a glass-ceramic made from Example Composition 16 through 0.5 mm path length.

The kinetics of crystallization were investigated by measuring the transmission of sheets of selected glasses during the ceramming process. An un-annealed sheet of glass was prepared from Example Composition 60 and had a thickness of about 0.5 mm. The glass sheet was heated in a hot cell in a spectrophotometer. FIG. 11 shows the temperature of the sample and the transmission as a function of time during heat up, nucleation, and crystal growth. The transmission at 400 nm diminished rapidly as the sample was heated to the 630° C. nucleation temperature. The transmission across the visible portion of the spectrum then followed suit and slowly declined during the nucleation hold. Then the temperature was raised to 700° C. near 200 min where the remaining transmission plummeted to 0 over the next 60 minutes. The nucleation step is significant and omitting the nucleation step and thus hold at 630° C. results in samples with greater than 75% of the transmission of annealed samples even with 4 hour holds at 700 or 750° C. The extinction spectra of glass-ceramics made from Example Composition 53 after various heat-treatments are plotted in FIG. 12. The UV edge shifts to longer wavelengths and the absorption band at 1100 nm increases up until a ceram temperature of 750° C. At higher ceram temperatures, the 1100 nm absorption band begins to diminish and the UV edge shifts back to shorter wavelength. This trend continues to 850° C. where the glass begins to noticeably soften. The absorption at 650, 700, 1100, 1500, 2000, and 2500 nm are plotted as a function of ceram temperature in the insert in FIG. 12 to illustrate this behavior, clearly showing the peak in opacity at 750° C. An XRD confirmed that the phase remains $\varepsilon$-$Fe_2O_3$ at 800° C. Decreasing opacity with increasing ceram temperatures above 750° C. was also observed visually with intense backlighting of the sample and confirmed spectroscopically in glass-ceramics made from Example Compositions 15 and 43-44, 53, 57, 60, 63 and 71. The color of these samples was blackest for ceram temperatures between 700 to 750° C. and then began to turn noticeably grey with increasing ceram temperatures at or above 775° C. Ceram temperatures below 700° C. resulted in amber samples with visibly noticeable transmission.

The electron energy loss spectra (EELS) of the Fe and Ti in the nanocrystals of selected glass-ceramics made from the Example Compositions of Table 1 were measured to see if the opacity maximum was the result of an oxidation state change. At least 5 nanocrystals from each heat treatment were measured, curve fit to standard $Fe^{2+}$ and $Fe^{3+}$ spectra and then plotted as a function of ceram temperature in FIG. 13. Glass-ceramics made from Example Compositions 53, 60, and 71 were measured and all showed a minimum in the $Fe^{3+}$/Total Fe ratio at a heat treatment temperature of 775° C., indicating that $Fe^{2+}$ in the nanocrystals is maximized with this heat treatment. Larger nanocrystals in the sample were chosen from the thinnest section of the TEM sample to avoid signal from the glass and obliteration of smaller nanocrystals from beam damage. Thus only a small fraction of nanocrystals were suitable for analysis and each had significantly different compositions, so the ensemble average of analyzed crystals for each ceram temperature is plotted in the FIG. 13 inset. The nanocrystallites in the 675 and 700° C. heat treated samples were too small for analysis.

To obtain the EELS data, electron thin samples (<100 nm) of selected glass-ceramics were prepared with a FEI Quanta focused ion beam (FIB) system using the very gentle sample preparation technique as described below. The main pit was milled at 30 KeV 5 nA (20 um×10 um×2 um). The first facing was done using 30 KeV at 1 nA to a thickness of 1 um. To reduce damage to the sample during the preparation the final polishing was done at 5 KeV at 150 nA to less than 100 nm. To remove the leftover Ga during the FIB-ing process the final cleaning was done at 2 KeV and 0.083 nA. It has been hypothesized before that for every KeV increase in the FIB voltage there is ~1 nm thick damaged layer. Thus using the final 2 KeV for cleaning, the damage layer is only ~2 nm. To reduce damage during imaging, the TEM was done at 80 KeV at a low extraction. This reduced the electron dose on the sample during imaging. The composition of the particles was calculated. EELS spectra for Fe and Ti were collected using a Gatan Quantum® GIF with high dispersion of 0.05 eV/channel. As the zero loss peak (ZLP) had 0.8 eV resolution, it was possible to capture all the salient features of the Fe and Ti $L_{23}$ edges.

Figure 14A:
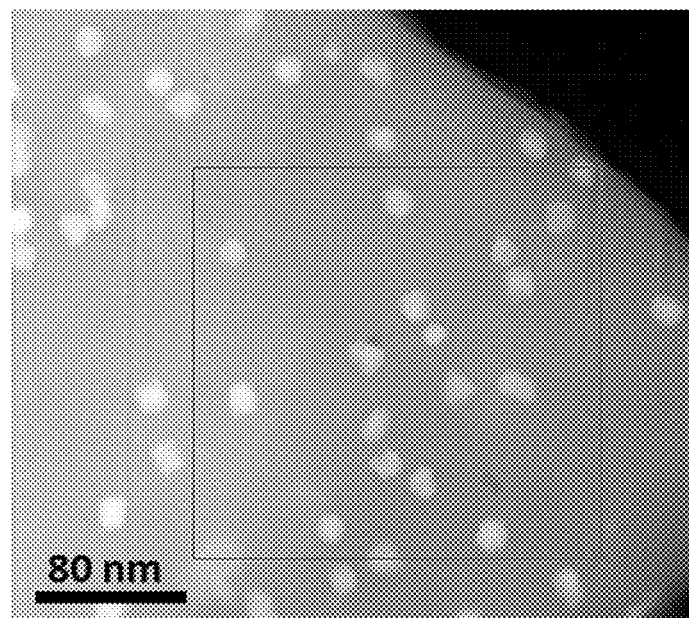
FIG. 14A shows a TEM micrograph of a glass-ceramic made from Example Composition 16, after ceramming at 750° C. for 4 hours.
Figure 14B:
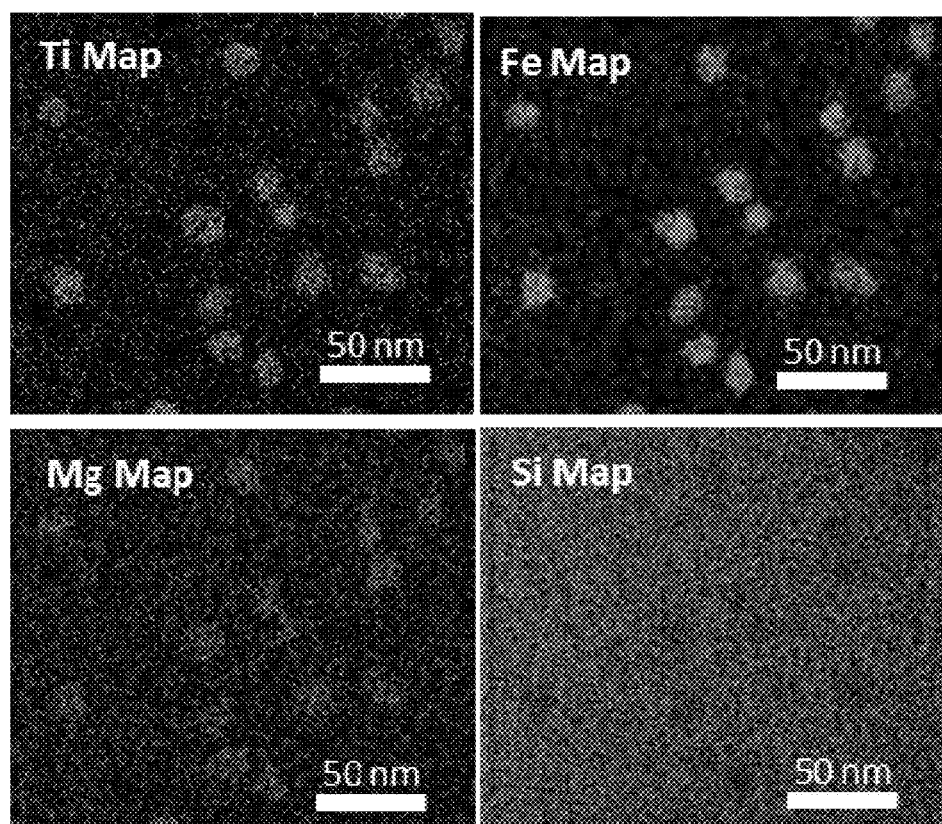
FIG. 14B shows elemental intensity maps showing Fe, Ti and Mg enrichment and Si depletion in the crystallites of the glass-ceramic shown in FIG. 14A.

FIG. 14A shows the TEM micrograph of a glass-ceramic made from Example Composition 60, after being cerammed at 750° C., for 4 hours. The image of FIG. 14A shows the ~20 nm crystallites, while the elemental maps of FIG. 14B show that the crystallites are enriched in Fe, Ti, and Mg and depleted in Si, Al, and Na. The compositions of at least 5 crystallites from the glass-ceramics made from Example Compositions 53 and 71 were measured and averaged for each heat treatment by EELS and superimposed on the 1000° C. MgO—$TiO_2$—$Fe_2O_3$ phase diagram shown in FIG. 15. The $Fe_2O_3$, MgO, and $TiO_2$ contents of the Example Compositions 53 and 71, excluding other components, were also plotted for comparison. The crystallites in Example Composition 53 were almost spherical at all temperatures similar to those in FIGS. 14A and 14B, while Example Composition 71 had additional elongated crystallites, so the compositions of both morphologies were measured and plotted separately in FIG. 15. The crystallites formed at 675° C. and 700° C. were too small to analyze by TEM, but the 725° C. samples had ε-$Fe_2O_3$ crystallites on the α'-$Fe_2O_3$ (hematite) α-$MgTiO_3$ (geikielite) tie line for both glasses. As the ceram temperature was increased to 750° C., the composition of the crystallites shifted along the tie line towards $MgTiO_3$. When cerammed at 775° C., the composition of the crystallites in the glass-ceramic made from Example Composition 53 continued to enrich in $MgTiO_3$ at the expense of $Fe_2O_3$, while the crystallites of both morphologies in the glass-ceramic made from Example Composition 71 began to shift to the $TiO_2$ rich side of the tie line at 775° C. At the 800° C. ceram temperature the elongated crystallites in Example Composition Glass 71 were on the pseudobrookite tie line, the spherical crystals on the α'-$Fe_2O_3$ (hematite) α-$MgTiO_3$ (geikielite) tie line, and the samples expressed both pseudobrookite and ε-$Fe_2O_3$ in XRD. X-ray diffraction data suggests these correspond to the elongated and spherical crystallites respectively. The crystallites in both compositions became richer in $Fe_2O_3$ as the ceram temperature was increased from 775 to 800° C. The compositions of the elongated crystallites in the glass-ceramics made from Example Compositions 53 and 71, after being cerammed at 850° C. were both on the pseudobrookite tie line with those of Example Composition 53 (i.e., close to pure $Fe_2TiO_5$).

Glass-ceramics samples were formed from Example Compositions 53 and 71. The crystallizable glasses were formed and nucleated at 630° C. for 2 hours and then cerammed for 4 hours each at the temperatures shown below in Table VI. Table VI also shows the elemental compositions of the crystallites present in the resulting glass-ceramics formed from Example Compositions 53 and 71.

TABLE VI

Elemental composition of crystallites.

| Ceramming Temperature (° C.) | Spherical Crystals (mol %) | | | Elongated Crystals (mol %) | | |
|---|---|---|---|---|---|---|
| | $Fe_2O_3$ | MgO | $TiO_2$ | $Fe_2O_3$ | MgO | $TiO_2$ |
| Example Composition 53 | | | | | | |
| 725 | 39.7 | 29.8 | 30.5 | 44.1 | 23.4 | 32.5 |
| 750 | 23.4 | 39.3 | 37.3 | 21.1 | 43.1 | 35.9 |
| 775 | 22.8 | 36.7 | 40.5 | 18.9 | 40.1 | 41.0 |
| 800 | 55.5 | 16.1 | 28.4 | 61.0 | 14.1 | 24.9 |
| Example Composition 71 | | | | | | |
| 725 | 24.7 | 31.6 | 43.7 | 24.3 | 32.7 | 42.9 |
| 750 | 17.3 | 31.3 | 51.4 | 11.1 | 42.5 | 46.4 |
| 775 | 18.8 | 28.6 | 52.6 | 10.6 | 37.0 | 52.4 |
| 800 | 27.8 | 29.6 | 42.5 | 21.2 | 19.1 | 59.6 |

Figure 16:
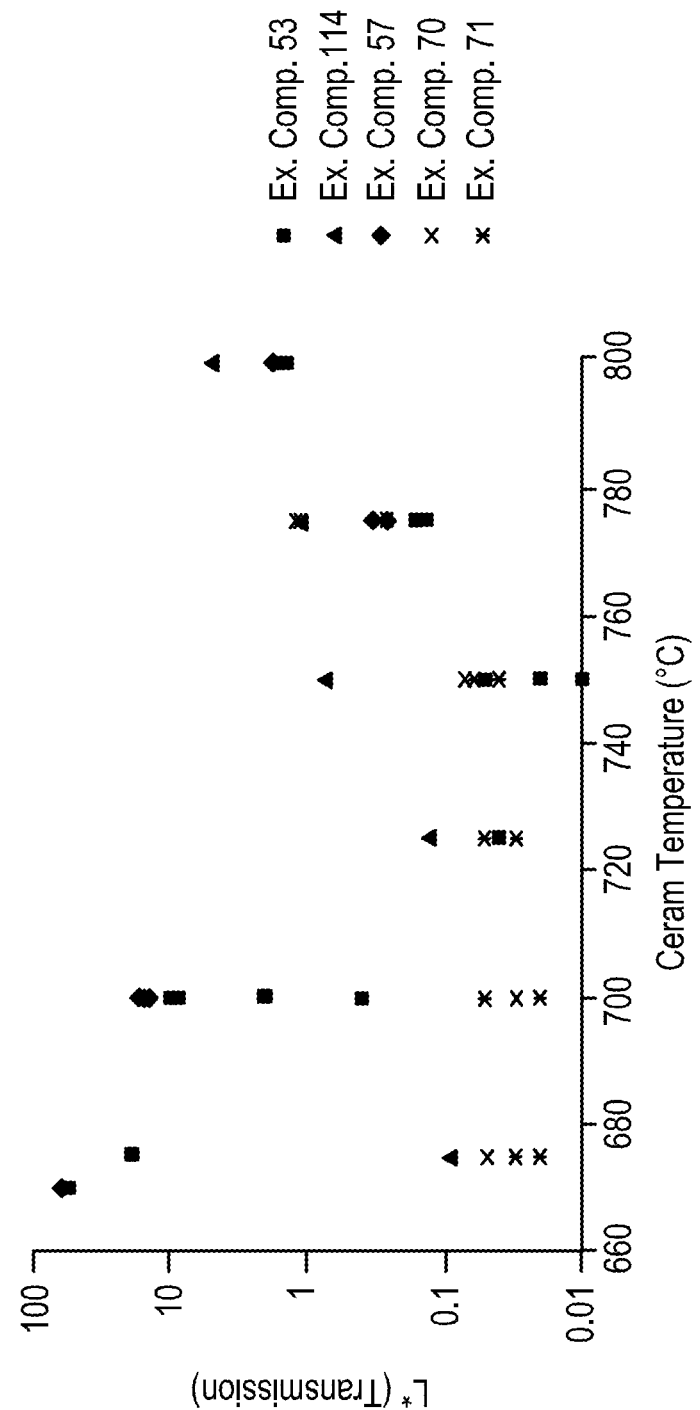
FIG. 16 is a graph illustrating the change in transmission with different compositions and ceramming temperatures.

Glass-ceramic samples were formed from Example Compositions 57, 70, 71, 114 and 53. The Example Compositions were nucleated for 2 hours at 630° C. and cerammed at the temperatures shown in FIG. 16. The resulting glass-ceramics had a thickness of about 0.8 mm. It was observed that glass-ceramics formed from these Example Compositions having about 1-2 wt % $Fe_2O_3$, about 1-2 wt % $TiO_2$, about 0-0.5 wt % $MnO_2$ and 0-0.5 wt % $SnO_2$ all exhibited a dark black color. Increasing the ceramming temperature, however, changed the opaque glass-ceramics from exhibiting a black color to a gray color, which can increase the transmission. It was observed that at peak ceramming temperatures of about 775° C. or greater, the color of the glass-ceramics turned from black to gray. FIG. 16 shows a drastic increase in transmission through the samples as the ceramming temperature was increased above 725° C. The glass-ceramics exhibiting a greater L* value exhibited higher transmission and, in some cases, exhibited an amber color.

To understand the causes of the changes in optical properties (e.g., L), Example Compositions 52, 60 and 71 were evaluated in greater detail with respect to the change in Fe/Ti ratio. As shown in Table VII, Example Composition 60 had the highest Fe content (an greatest Fe/Ti ratio) and Example Composition 71 had the lowest Fe content (and lowest Fe/Ti ratio).

TABLE VII

Fe/Ti and Fe/Mg ratio of Example Compositions 53, 60 and 71.

| Example Composition | 71 | 53 | 60 |
|---|---|---|---|
| Fe/Ti | 1.02 | 1.16 | 1.43 |
| Fe/Mg | 1.65 | 1.28 | 1.6 |

Figure 17:
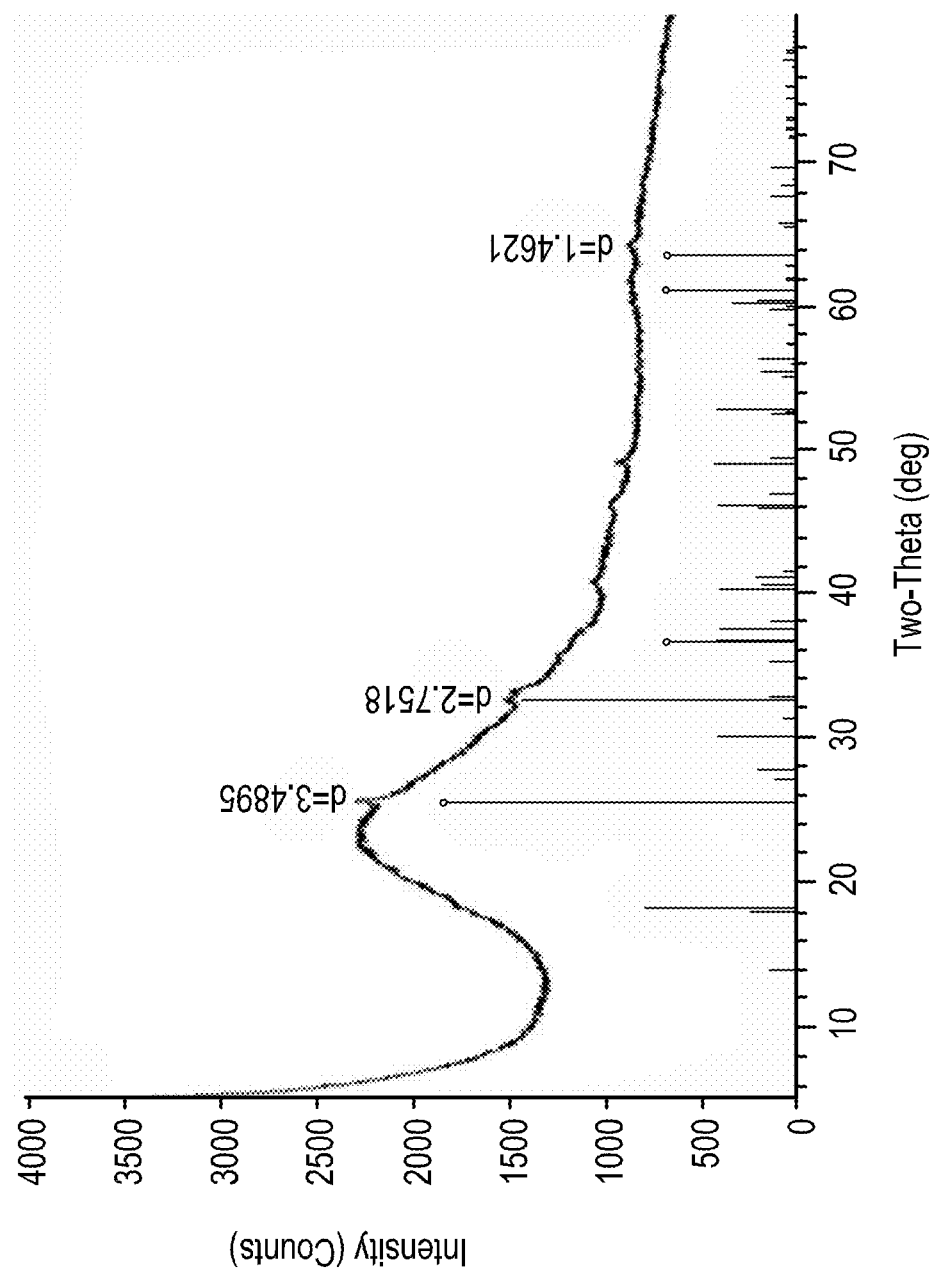
FIG. 17 is a graph showing an XRD trace of a glass-ceramic formed from Example Composition 71, after nucleating at 630° C. for 2 hours and cerammed at 800° C. for 4 hours.
Figure 18:
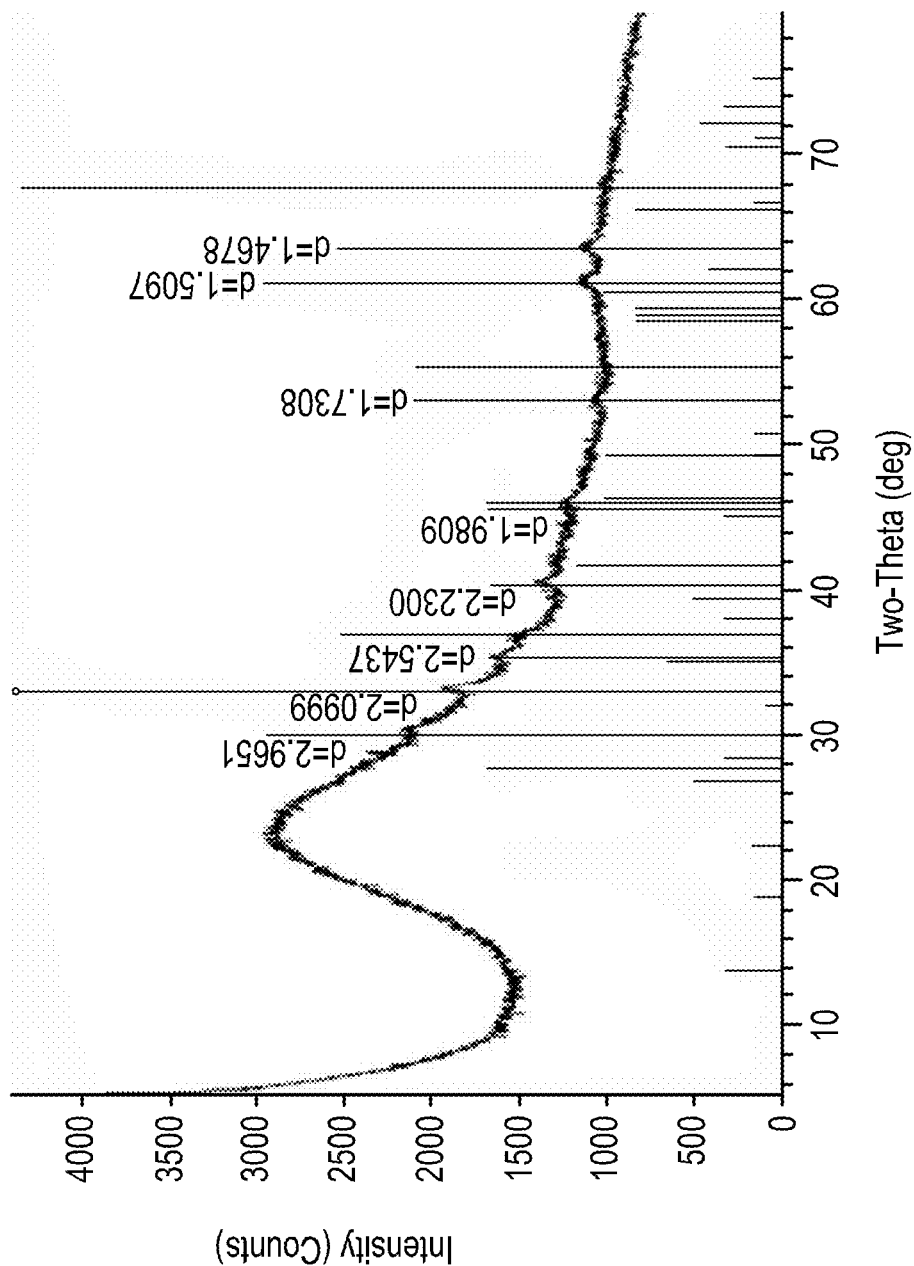
FIG. 18 is a graph showing an XRD trace of a glass-ceramic formed from Example Composition 53, after nucleating at 630° C. for 2 hours and cerammed at 775° C. for 4 hours.
Figure 19:
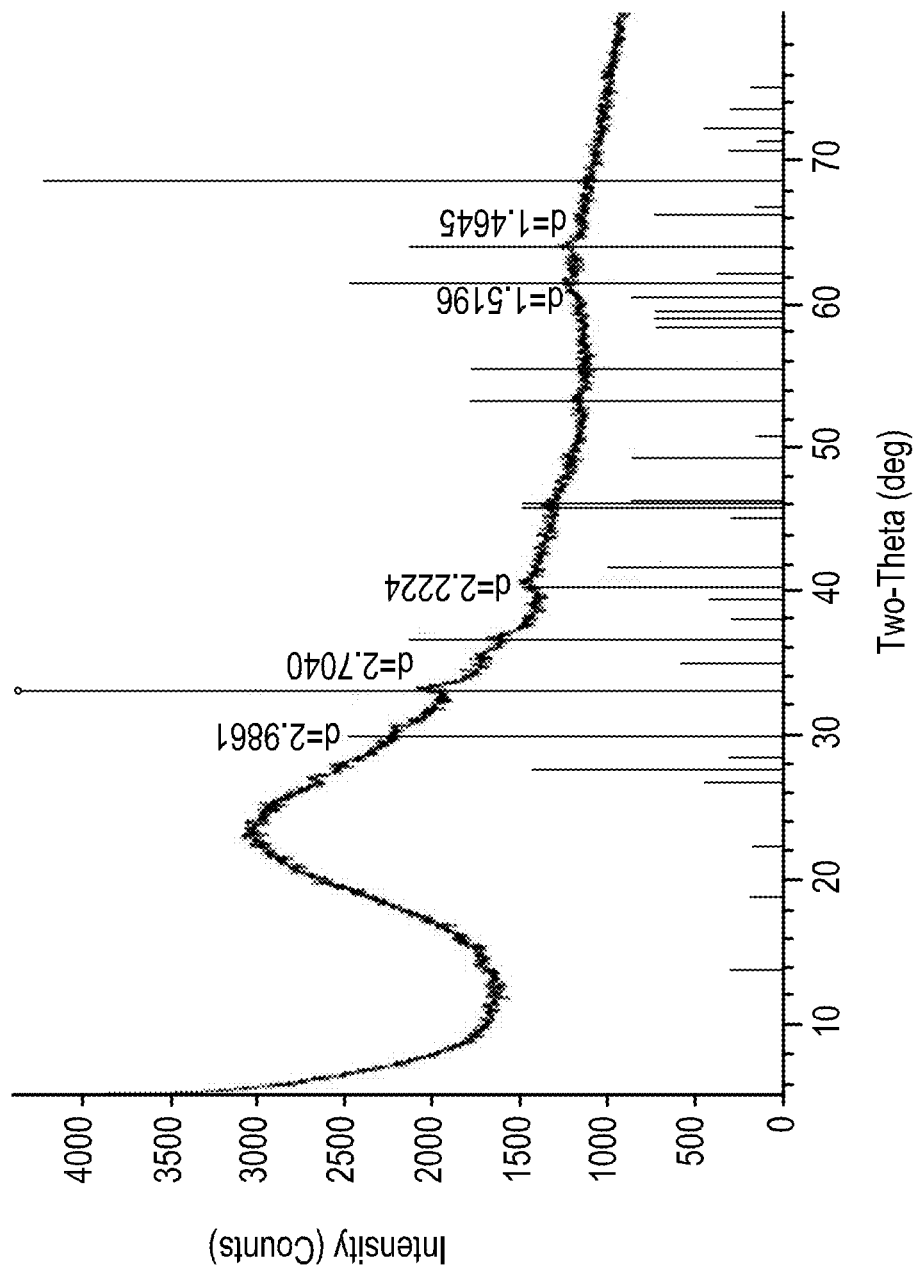
FIG. 19 is a graph shown an XRD trace of a glass-ceramic formed from Example Composition 60, after nucleating at 630° C. for 2 hours and cerammed at 775° C. for 4 hours.
Figure 20:
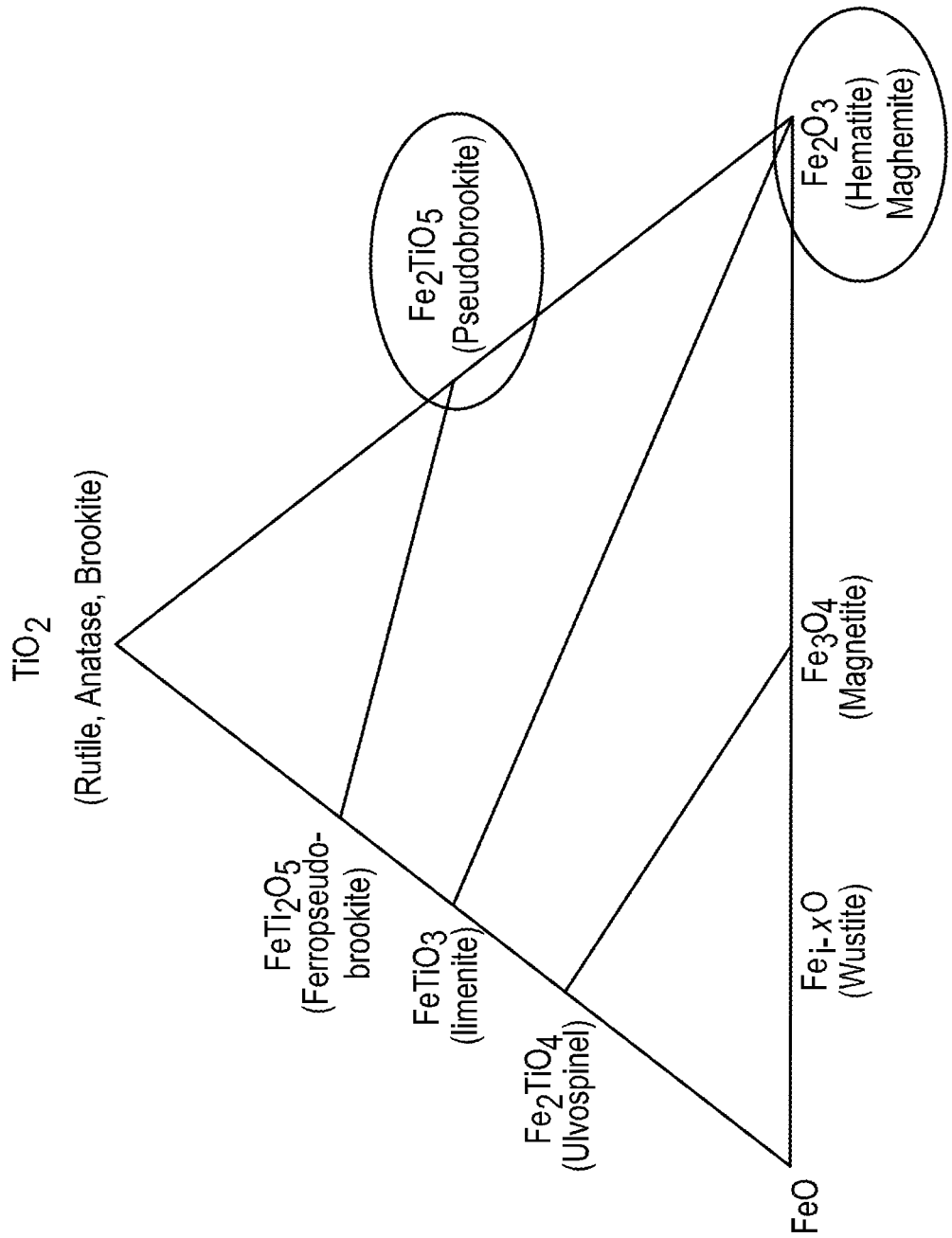
FIG. 20 is a $FeO$—$Fe_2O_3$—$TiO_2$ phase diagram showing the major solid solutions.

Glass-ceramics were formed from Example Compositions 53, 60 and 71 by nucleating the crystallizable glasses at 630° C. and ceramming at 800° C. for 4 hours or 775° C. for 4 hours. FIGS. 17-19 show the XRD traces of the glass-ceramics formed from Examples 53, 60 and 71. As shown in FIG. 17, the glass-ceramics formed from Example Composition 71 show predominantly pseudobrookite and little ε-$Fe_2O_3$. As shown in FIGS. 18-19, the glass-ceramics formed from Example Composition 53 and 60 (which were cerammed at a lower temperature of about 775° C.) exhibited predominantly ε-$Fe_2O_3$ crystals. The data from FIGS. 17-19 indicates that above a certain Fe/Ti ratio, the final crystallites in the glass-ceramics include ε-$Fe_2O_3$. Where the content of Ti is higher, crystallites include pseudobrookite. This is represented in the phase diagram ($Fe_2O_3$—FeO—$TiO_2$) shown in FIG. 20. Pseudobrookite is a solid solution of $Fe^{III}_2TiO_5$ and $Fe^{II}Ti_2O_5$ and is black in color, but not magnetic.

Figure 21:
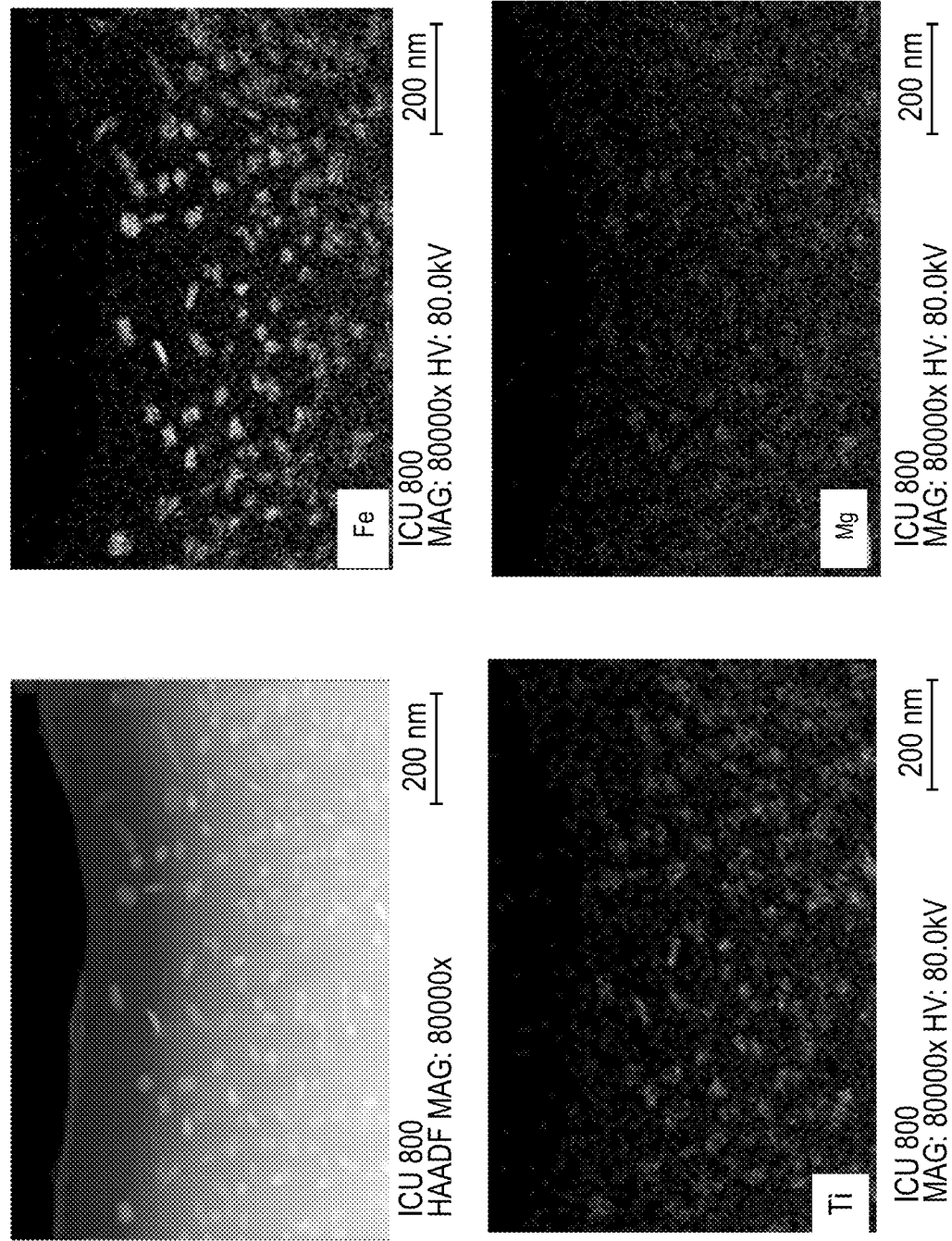
FIG. 21 is a HAADF STEM image and the corresponding EDS map of the different particles in a glass-ceramic formed from Example Composition 53, after nucleating at 630° C. for 2 hours and cerammed at 800° C. for 4 hours.

FIG. 21 shows high angle annular dark field ("HAADF") or Z-contrast images of a glass-ceramic formed from Example Composition 53, after nucleating at 630° C. for 2 hours and ceramming at 800° C. for 4 hours. The corresponding Energy Dispersive X-Ray Spectroscopy (EDS) maps of Fe, Ti and Mg elements are also shown in FIG. 21. The brighter or lighter colored areas indicate crystalline areas. The length scale at the bottom of each EDS map indicates 200 nm. The EDS maps show the presence of Mg in all the particles of the glass-ceramic. In the Example Compositions shown in FIG. 21, Mg was detected in the crystals for all the compositions, cerammed at different temperatures.

Figure 15:
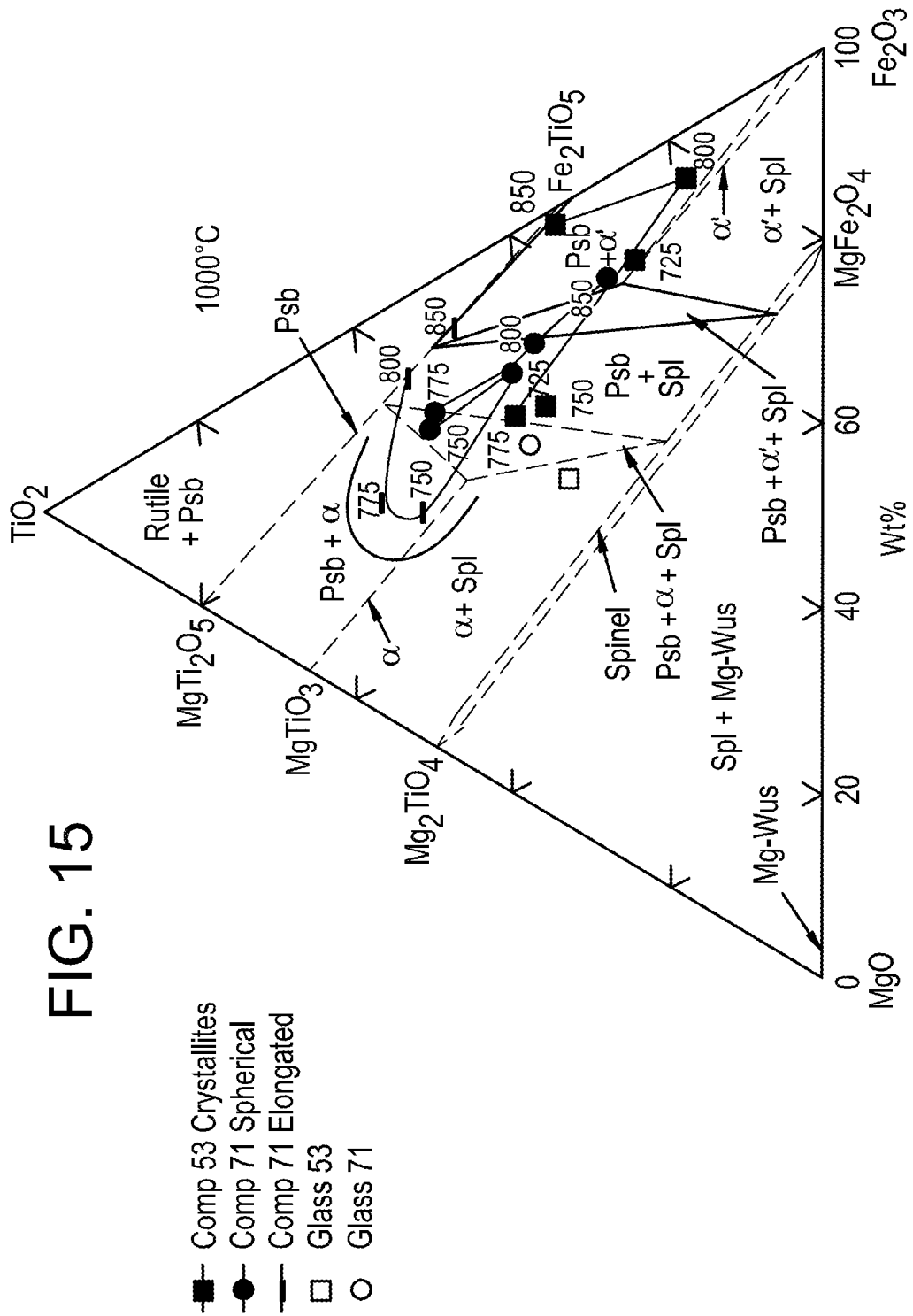
FIG. 15 shows the compositions of crystallites in Example Compositions 14 and 18 and in the glass-ceramics made from Example Compositions 14 and 18, at various ceram temperatures superimposed on the $MgO$—$TiO_2$—$Fe_2O_3$ 1000° C. phase diagram.

Various glass-ceramics were made from Example Compositions 53 and 71 and cerammed at different temperatures. FIGS. 22A and 22B shows the graphical representation of the quantitative data with ceramming temperature. The data indicates that for glass-ceramics made from Example Compositions 53 (and which include both spherical and elongated morphological particles), the Fe content in the crystallites decreases as the ceramming temperature increases from 725° C. to 750° C. and the amount of Mg and Ti increases. When the ceramming temperature is 750° C., the mol % of both Fe and Mg in the crystallites varied between 25 mol % to 35 mol %. When the ceramming temperature exceeded 750° C., Mg and Ti in starts to leave the crystallites and the crystallites become rich in Fe. This conclusion corresponds well with the transmission data of FIG. 16, which shows a minima at the ceramming temperature of 750° C. The data for glass-ceramics formed from Example Composition 71, which includes a higher $TiO_2$ content relative to Example Compositions 53 and 60, differs. The composition of the elongated crystallites in the glass-ceramics formed from Example Composition 71 shows a steady increase in Ti as ceramming temperature increases, but the amount of Fe and Mg in the crystallites follows the same trend as the glass-ceramics from Example Composition 53. On the other hand, the spherical crystallites follow the same trend as the glass-ceramics formed from Example Composition 53, but the composition of the individual elements (Fe, Ti and Mg mol/%) is different. In the glass-ceramics formed from Example Composition 71, both the spherical and elongated crystallites include Fe and Mg in the range from about 25 mol % to 35 mol % at 725° C. The spherical particles (which include the majority of the crystallites) maintains this composition even when the ceramming temperature is increased to 775° C.; however, the elongated particles (which include the minority of the crystallites) have an increased amount of Ti (in mol %). Transmission data from FIG. 16 supports this because transmission remains almost constant up a ceramming temperature of 750° C., after which transmission starts increasing. Thus, without being bound by theory, it appears that to achieve the lowest transmission, the Fe and Mg content in the majority of the crystallites should be maintained in the range from about 25 mol % to about 35 mol %. These values of the particles are plotted on the $MgO$—$Fe_2O_3$—$TiO_2$ phase diagram (in wt %) as shown in FIG. 15. The crystals from the glass-ceramics made from Example Composition 53 lay right on top of the $Fe_2O_3$—$MgTiO_3$ ($\varepsilon$-$Fe_2O_3$) tie line. The crystallites in the glass-ceramics made from Example Composition 71 are enriched in $TiO_2$ relative to the tie line. Glass-ceramics made from either composition and cerammed at the highest ceramming temperature (i.e., 800° C.) exhibited the highest Fe content crystallites and the glass-ceramics that exhibited the next highest Fe content crystallites were cerammed at the coolest ceramming temperature (i.e., 725° C.). The glass-ceramics that were cerammed at intermediate ceramming temperatures (e.g., 725° C. and 750° C.) exhibited the darkest color and the lowest amount of Fe. Thus the dark glass-ceramic formed from Example Composition 53 (nucleated at 630° C. for 2 hours and cerammed at 750° C. for 4 hours) have crystallites with about the same composition as the crystallites of fading glass-ceramics formed from Example Composition 71 (nucleated at 630° C. for 2 hours and cerammed at 800° C. for 4 hours).

Figure 23:
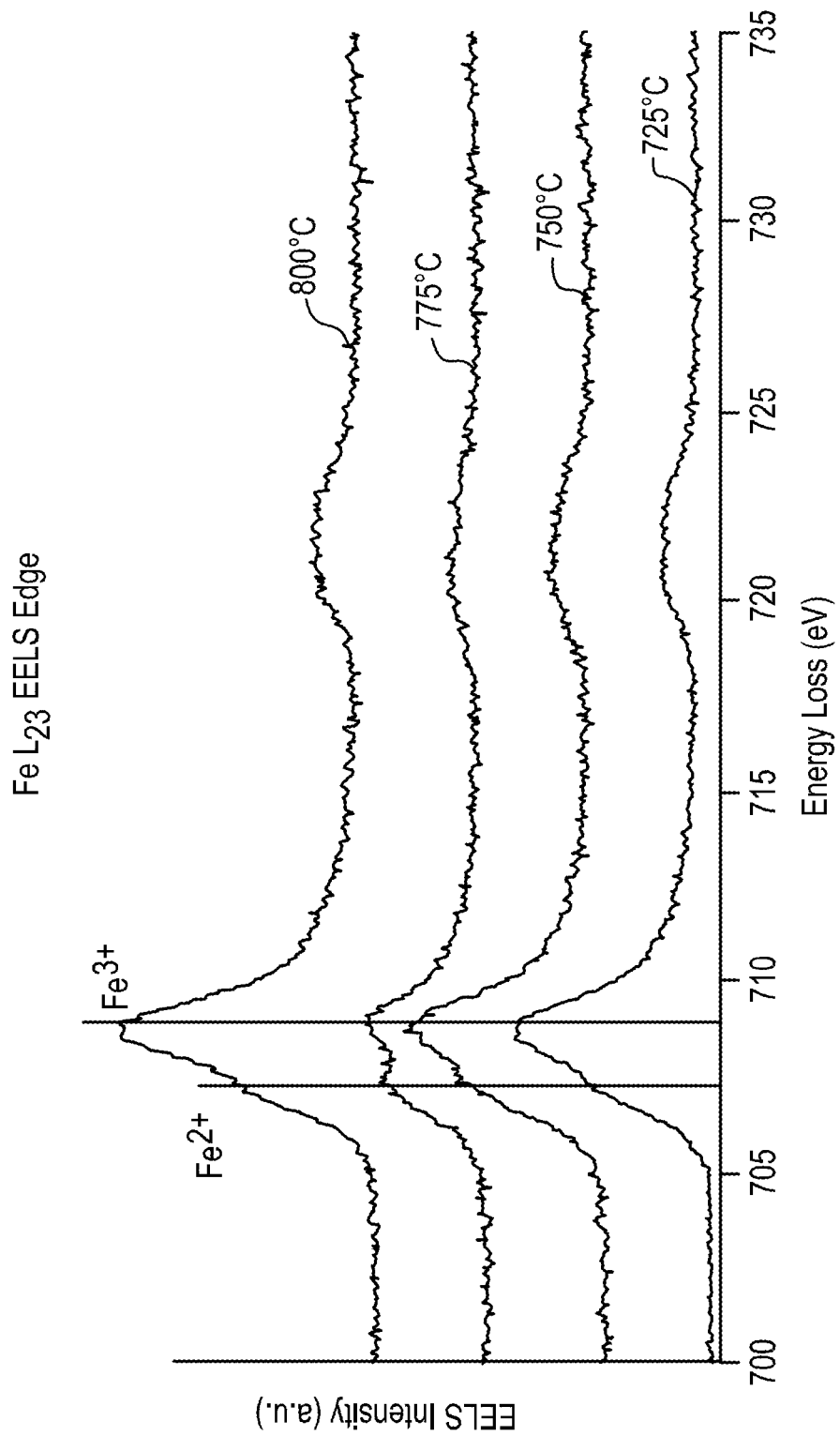
FIG. 23 is an electron energy-loss-near-edge-structure (ELNES) of Fe $L_{23}$ edge showing the change of Fe from $Fe^{3+}$ to $Fe^{2+}$ at different ceramming temperatures for glass-ceramics made from Example Composition 53.

FIG. 23 shows the Fe $L_{23}$ ELNES for crystallites from glass-ceramics made from Example Composition 53, with increasing ceramming temperatures. The $Fe^{3+}$ main edge is at 709.1 (±0.1) eV with a small shoulder at 707.7 eV. On the other hand the $Fe^{2+}$ edge is at a707.3 (±0.1)eV. The ELNES shows that the crystallites after ceramming at 725° C. are predominantly $Fe^{3+}$, but the amount of $Fe^{2+}$ in the particles increases with increasing ceramming temperature up to 775° C. The amount of $Fe^{2+}$ is then reduced and the crystallites go back to being predominantly $Fe^{3+}$, after this temperature. This change in $Fe^{3+}$ and $Fe^{2+}$ with ceramming temperature is supported by the compositional analysis in which the amount of $Mg^{2+}$ ions in the crystallites increases at ceramming temperatures greater than 725° C., to charge balance some of the $Fe^{3+}$ changes to $Fe^{2+}$. At ceramming temperatures above 775, the amount of $Mg^{2+}$ ions decreases and the Fe returns to its original oxidation state. This indicates that the presence of $Fe^{3+}$ and $Fe^{2+}$ within a crystal provides the desirable black color in glass-ceramics. The oxidation state of Fe is considered significant because, the presence of $Fe^{2+}$ ions are next to Ti ions provides a black color, whereas, the presence of $Fe^{3+}$ ions provides a blue or green color. The interaction of $Fe^{2+}$ and $Fe^{3+}$ ions may also provide some additional color, thus enhancing absorption.

Figure 24:
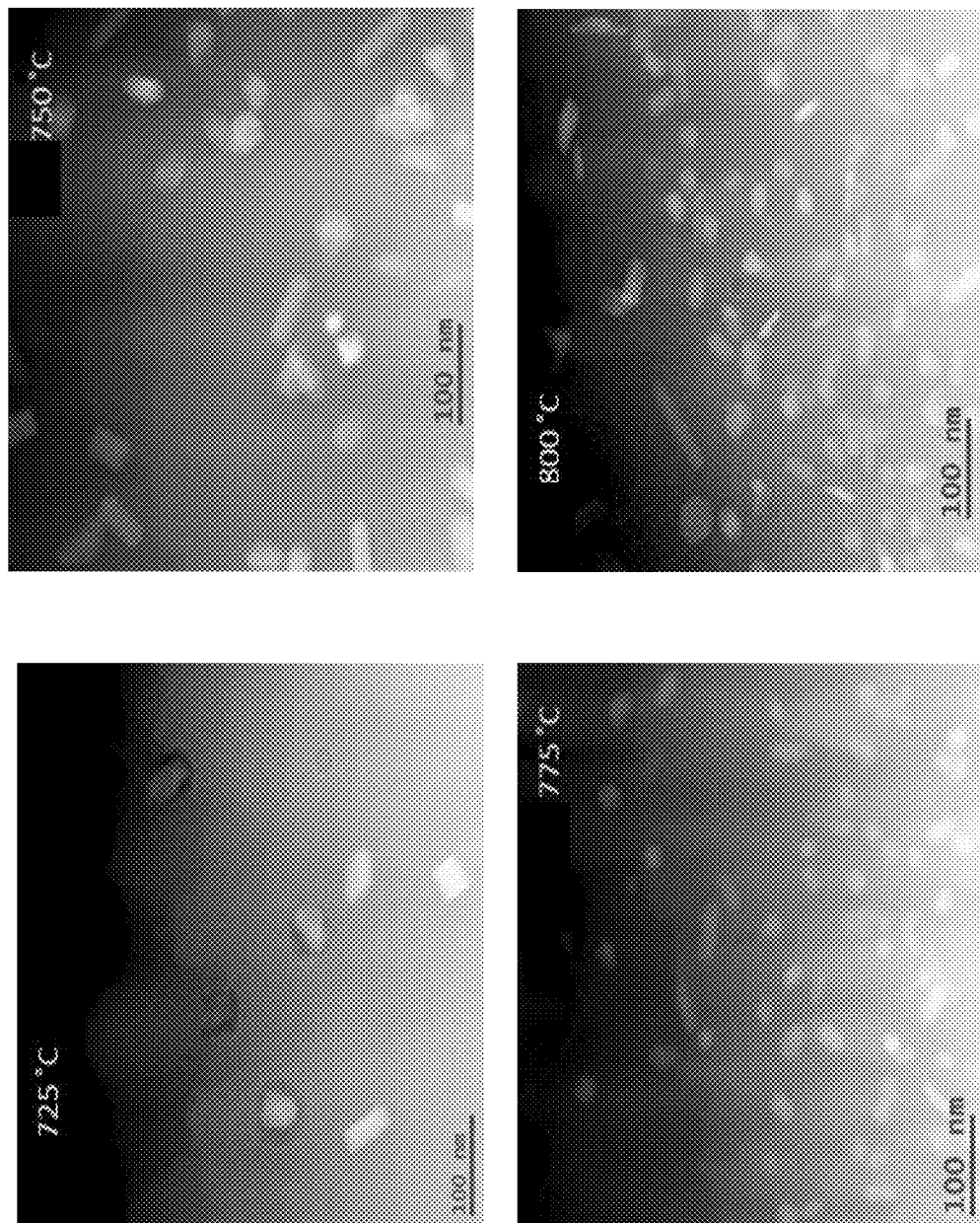
FIG. 24 show HAADF STEM images of a glass-ceramic made from Example Composition 53, after being cerammed at different temperatures.

The change in color in the glass-ceramics described herein at higher ceramming temperature could be due to mixture of two different phenomenon: effects due to composition and effects due to scattering. Scattering in these glass-ceramics is due to either an increase in particle size or an increase in the amount (area fraction) of the crystallites in the glass matrix. Without being bound by theory, it is believed that increased scattering is related to the gray coloration observed after ceramming at higher temperatures. FIG. 24 shows representative HAADF STEM images of glass-ceramics made from Example Composition 53, after being cerammed at 725° C., 750° C., 775° C. and 800° C. Qualitatively, the images of FIG. 24 show a progressive increase in the amount of crystallites as the ceramming temperature increases.

Figure 25A:
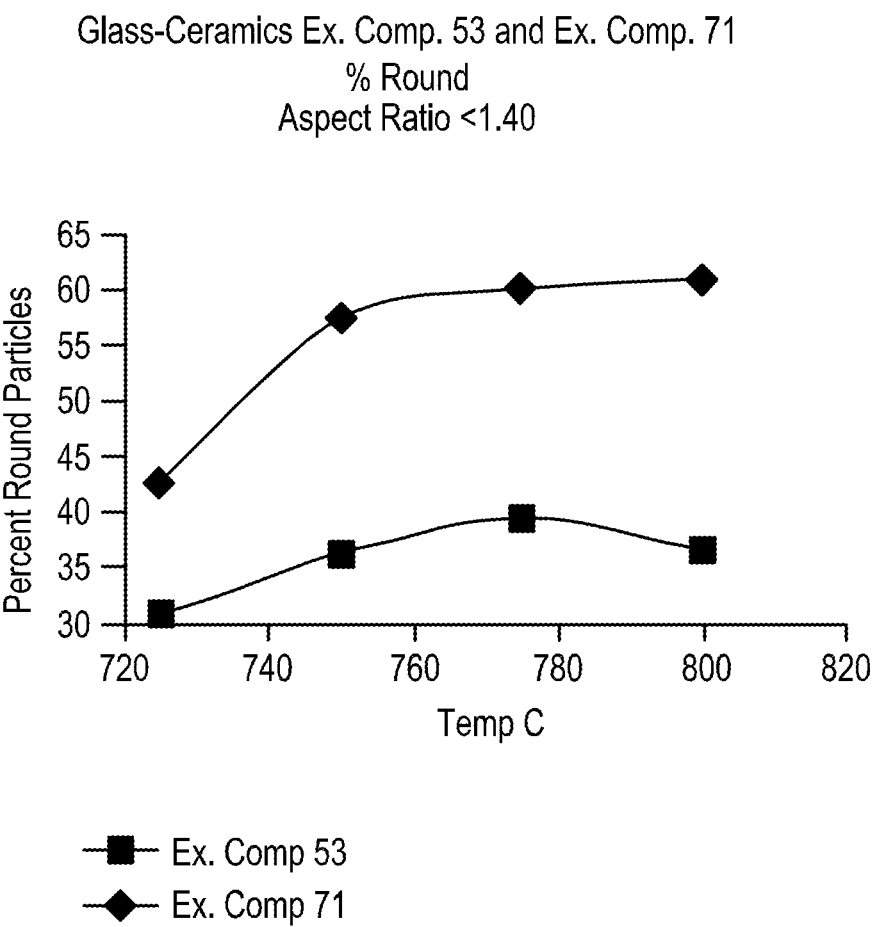
FIGS. 25A-C are graphs summarizing the image analysis of HAADF STEM images of glass-ceramics made from Example Compositions 53 and 71.
Figure 25B:
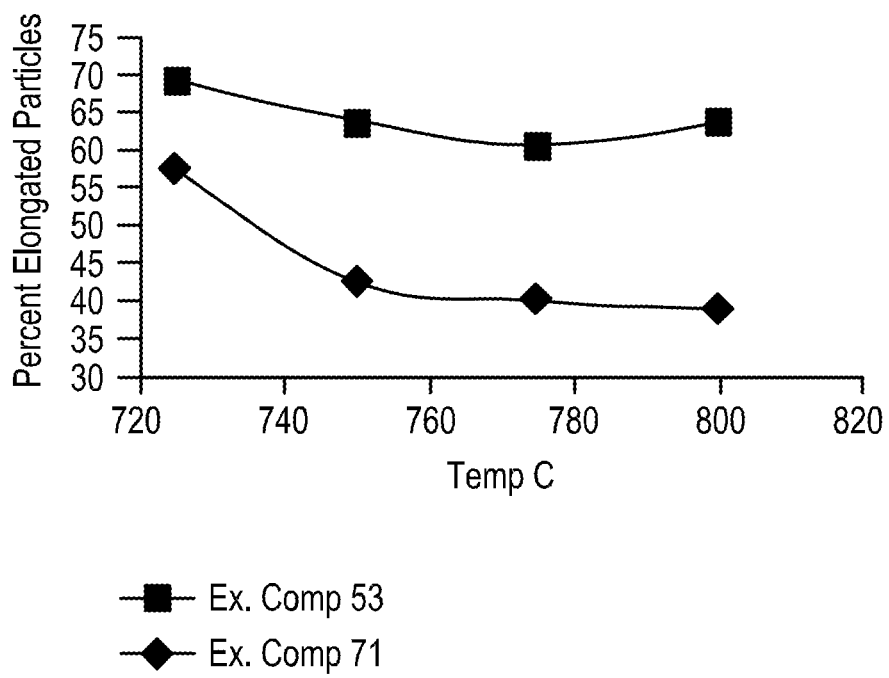
Figure 25C:
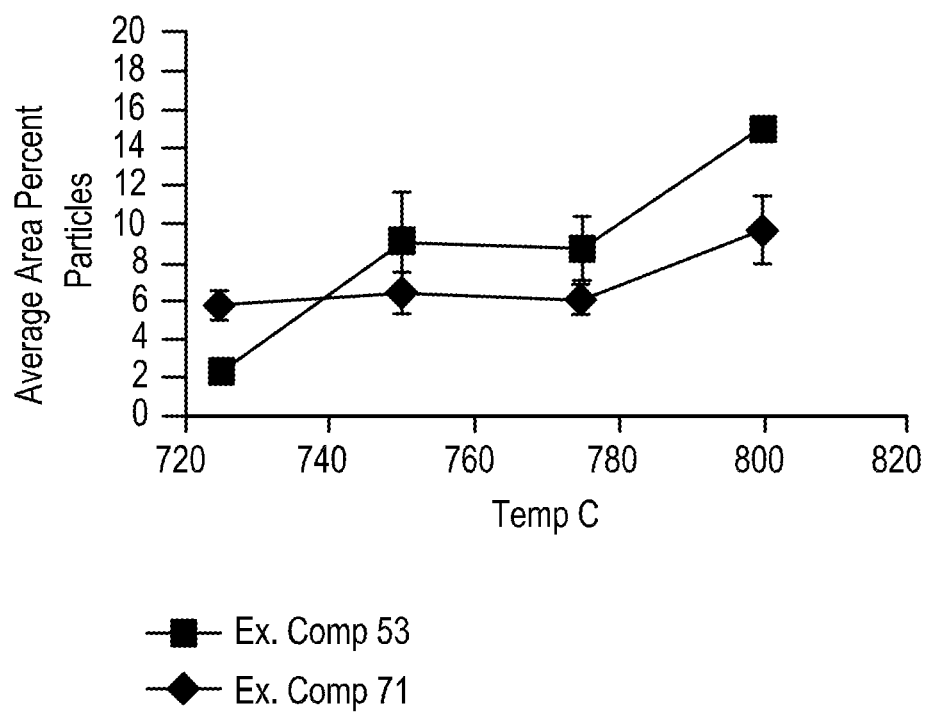

HAADF STEM images of glass-ceramics made from Example Composition 73 were also taken at different ceramming temperatures. Image analysis was performed on 4-5 of the images at each temperature to calculate the area fraction and percentage of different particle morphology within the glass matrix of the glass-ceramic. The averages of these values are shown in FIGS. 25A, 25B and 25C. Image analysis shows that in glass-ceramics made from Example Compositions 53 and 71, the area fraction of particles is below about 10% at ceramming temperatures up to about 775° C. As such, it is believed that to minimize the effect of scattering and to achieve a black color, the area fraction of the crystallites in a glass-ceramic may be below about 10%.

Image analysis also indicated that in glass-ceramics made from Example Composition 71, there is a significant increase in spherical particles and a reduction in elongated particles, which are also Ti-rich. This difference suggests that the color exhibited by these glass-ceramics is due to the presence of spherical particles and not the Ti-rich elongated particles.

Other analysis included the CIELAB color space coordinates determination and phase identification by x-ray diffraction.

Figure 6:
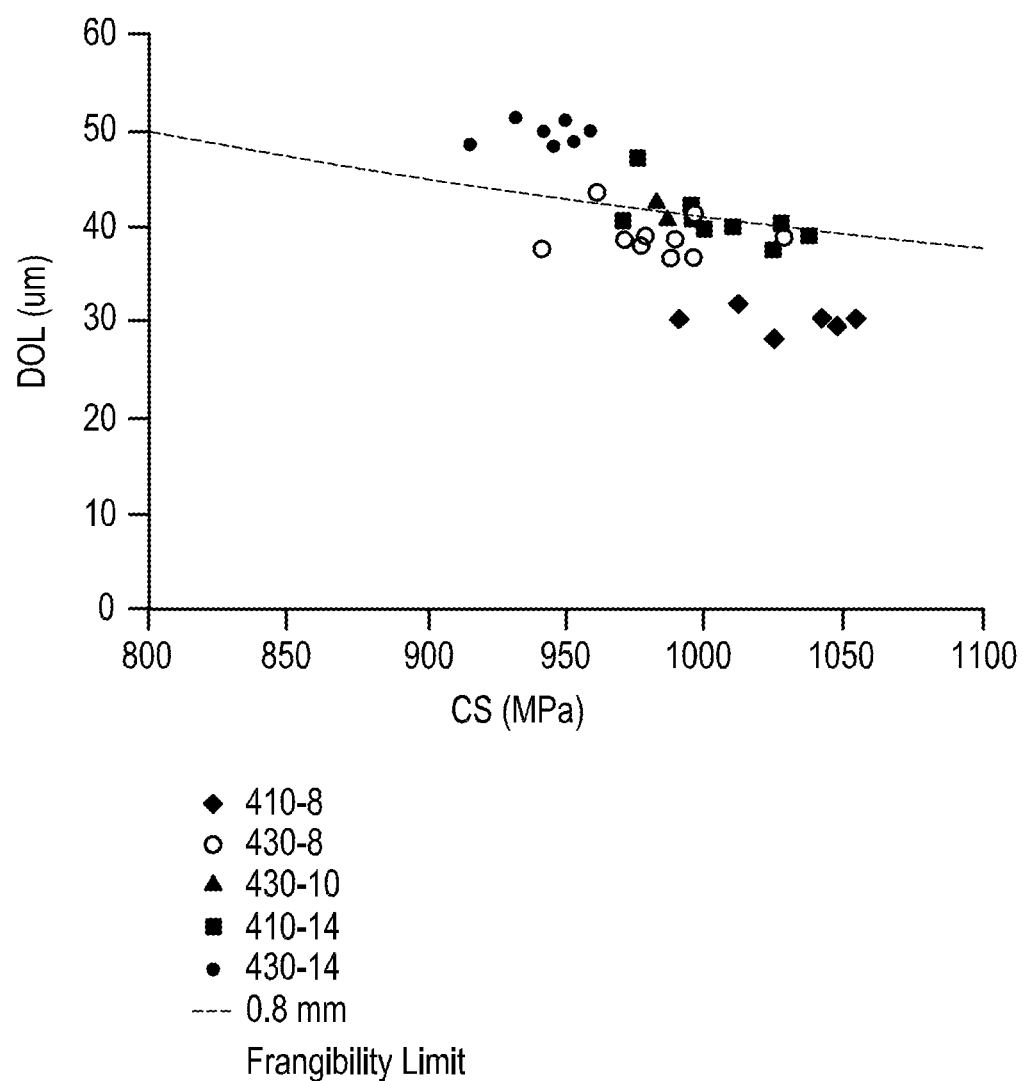
FIG. 6 shows DOL as a function of CS for glass-ceramics made according to one or more embodiments.

Among the further processing was an ion exchange treatment of the glass-ceramics. Each glass-ceramic sample was cut into shapes suitable for ion exchange evaluation. The samples are then cleaned to eliminate any residual organic contamination. Each cleaned sample is suspended in a bath of molten $KNO_3$ and held at between 370° C. and 450° C. After an appropriate number of hours in the bath (e.g., up to about 8 hr or more), the sample is removed, allowed to cool, and washed in deionized water to remove any residual salt. Glass-ceramics according to Example Composition 1-7, 14-17, 43-44, 53, 57, 60, 63 and 71 were immersed in a molten bath of potassium nitrate (with 0.5 wt % silicic acid to prevent etching) having a temperature of about 420° C. or 430° C. between 6.5 and 8 hours in 304 stainless steel containers and baskets. The glass-ceramic samples were then cooled to room temperature, and then washed in deionized water to remove the adhered salt. Following such treatment, the compressive stress and depth of layer were measured using polarized light on an Orihara surface stress meter model FSM-6000 for glasses and an instrument operating at 1550 nm in the NIR to measure the glass-ceramics, which were opaque in the visible spectrum. Stress optical coefficient and refractive index were measured by diametrical compression and critical angle methods respectively to convert FSM birefringence into stress and depth of layer. FIG. 6, shows DOL as a function of CS for selected glass-ceramics. FIG. 6 also shows the possible CS/DOL combinations that were achievable in the glass-ceramics described herein, using different ion exchange patterns. For example, it is possible to provide glass-ceramics having a CS 900-1100 MPa and DOL of between 25-55 microns.

The mechanical performance of the black glass-ceramics obtained from Example Compositions 53 and 60 were measured by three methods: flexural response by ring on ring (ROR) and abraded ring on ring (aROR), and 4 point bend. The ring on ring test evaluates the biaxial flexure strength of the substrate faces, while the 4 point bend test evaluates the strength and finish quality of the edges. Abraded ring-on-ring was used to quantify retained mechanical performance, after having imposed a given flaw population.

Ring on ring strength (biaxial flexure) was measured on 50 mm square samples having a thickness of about 0.8 mm using a 25.4 mm support ring and 12.7 mm load ring and crosshead speed of 1.2 mm/min according to ASTM C1499. To rank the relative strength of the materials after use, samples were abraded with SiC grit according to ASTM C158.

The strength attributes of a commercially available aluminosilicate glass substrate (shown as "Substrate X" in Table VIII and FIGS. 26-28) and the glass-ceramics formed from Example Compositions Glasses 53 and 60, after being heat treated at 700-4 were compared. Both the Substrate X and the glass-ceramic samples were ion-exchanged to the same depth of layer. The glass-ceramics were ion exchanged at a higher temperature than the Substrate X samples as shown in Table VIII, to better match the compressive stress of the Substrate X samples.

TABLE VIII

Heat treatment and ion exchange conditions and resulting strength properties.

| | Sample | Substrate X | Glass-ceramic formed from Ex. Comp. 53 | Glass-ceramic formed from Ex. Comp. 60 |
|---|---|---|---|---|
| Heat Treatment IX | Nucleation (° C.-hr) | None | 630-2 | 630-2 |
| | Growth (° C.-hr) | None | 700-4 | 700-4 |
| | Temperature (° C.) | 420 | 430 | 430 |
| | Time (hr) | 6.5 | 8 | 8 |
| | CS (MPa) | 848 | 998 | 1060 |
| | DOL (μm) | 43 | 41 | 41 |
| Strength | ROR (N) | 2350 | 2852 | 2974 |
| | aROR (N) | 961 | 1284 | 1321 |
| | 4 pt Bend (MPa) | 709 | 838 | 848 |

Figure 26:
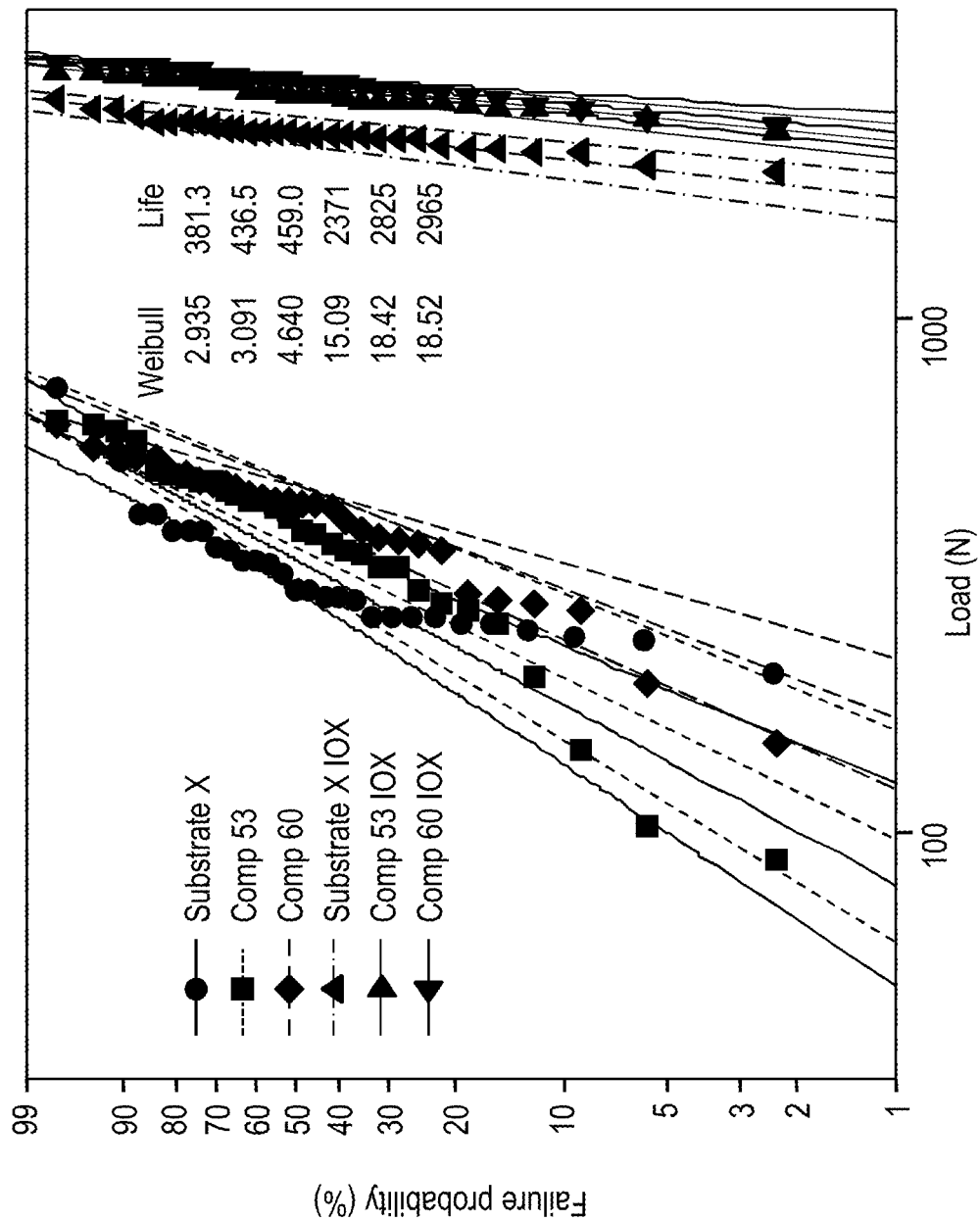
FIG. 26 illustrates the ring-on-ring (ROR) biaxial flexure load to failure of glass-ceramics made from Example Compositions 14 and 16, after ceramming at 700° C. for 4 hrs., compared to a known glass sample, before and after being ion exchanged.

FIG. 26 shows the ring on ring load to failure distribution of 30 samples of the glass-ceramics and Substrate X, both before and after ion exchange (all samples had a thickness of about 0.8 mm). Load to failure is reported because the strength of the ion exchanged samples was so high that bending displacement was large enough to make the membrane stresses non-negligible. Therefore, conventional failure stress calculations would overestimate the material stress at failure. While strain gauges would enable calculation of the true stress, they increase the stiffness of the sample and alter the very surface under test and create an additional source of error. Thus, rather than report an inflated strength value (stress at failure) Table VIII and FIG. 26 shows the load to failure which is directly measured without any assumptions or estimations for an unbiased ranking of relative strength for the biaxial flexure tests. The Weibull modulus and characteristic life, which is the 63.2 percentile (1-1/e) of the data, are reported in FIGS. 26-28 for comparison. Before ion exchange, comparative Substrate X had a characteristic life load of 381 N, while the glass-ceramics made from Example Compositions 53 and 60 exhibited similar characteristic life loads of 437 and 459 N, respectively. After ion exchange, the lifetime load to failure for Substrate X increased to 2371 N, the glass-ceramic formed form Example Composition 53 increased to 2825 N and the glass-ceramic formed from Example Composition 60 increased to 2965 N. The 95% confidence intervals (dashed lines) of both glass-ceramics in FIG. 16 were overlapping indicating no significant difference between them, but both were significantly higher than Substrate X. The slopes of the failure probability lines significantly steepened with ion exchange, increasing the Weibull modulus from between 2.9 and 4.6 for the non-ion exchanged glass-ceramic and Substrate X samples up to between 15 and 19 for the ion exchanged glass-ceramic and Substrate X samples.

Figure 27:
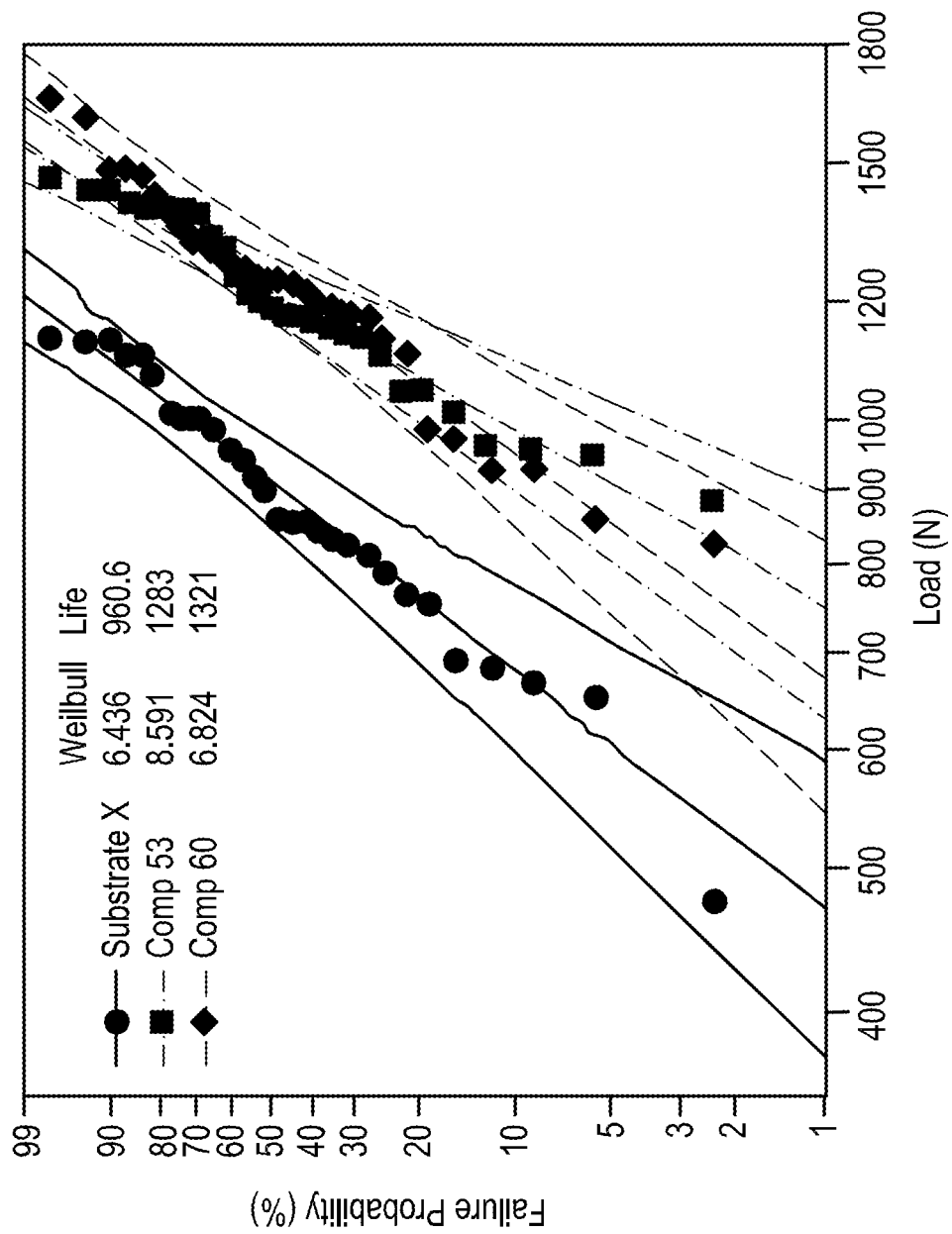
FIG. 27 shows the abraded ring on ring biaxial flexure load to failure of glass-ceramics made from Example Compositions 14 and 16, after ceramming at 700° C. for 4 hrs., compared to a known glass sample, after ion exchange.
Figure 28:
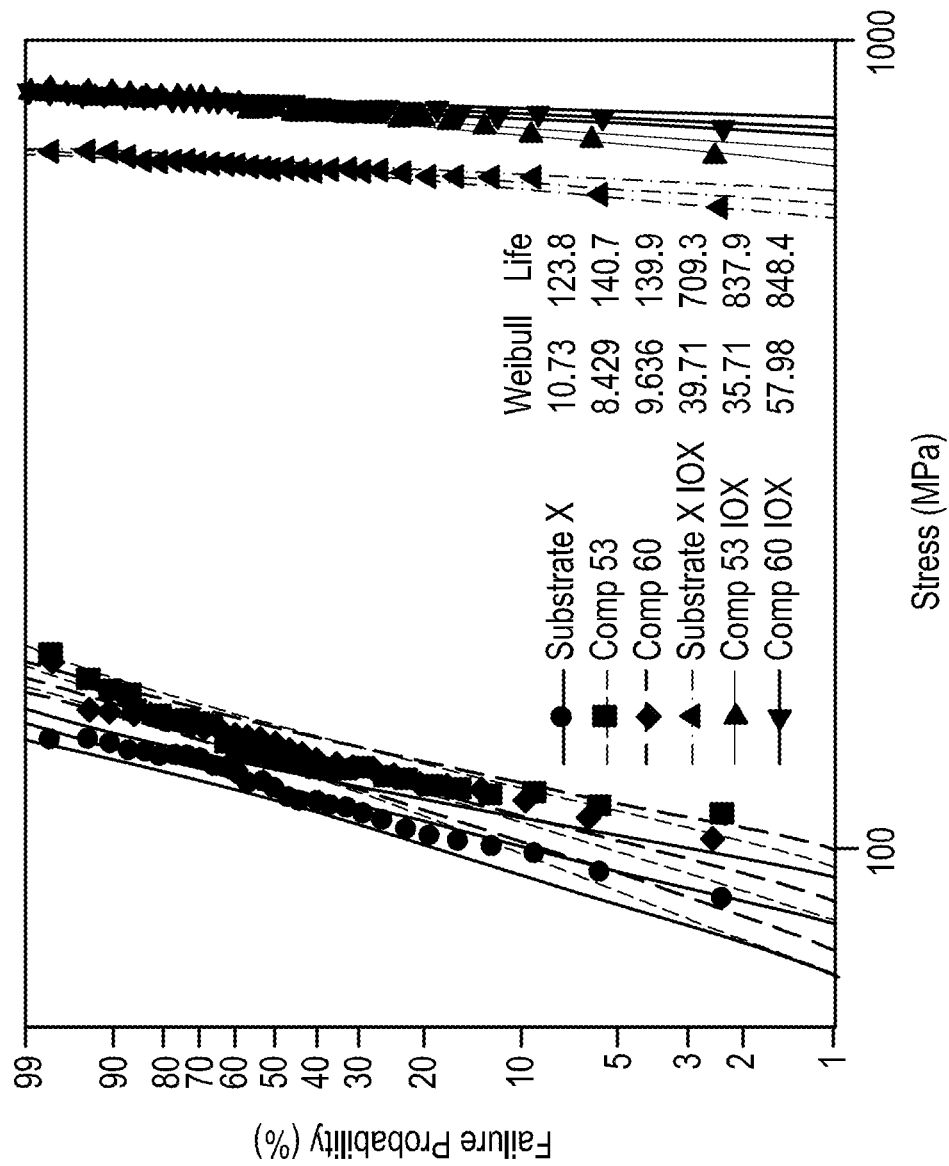
FIG. 28 shows a four point bend strength distribution of glass-ceramics made from Example Compositions 14 and 16, after ceramming at 700° C. for 4 hrs., compared to a known glass sample, before and after ion exchange.

To determine the biaxial performance after in-use conditions, the parts were abraded with 1 ml of SiC particles at 34 kPa pressure and then tested using the same ring-on-ring test configuration as used in FIG. 26. Abrasion in this way imposes flaws of roughly 20 μm in depth and serves as a surrogate for what the material being tested would encounter in the field. FIG. 27 shows that Substrate X samples, glass-ceramic samples made from Example Composition 53, and glass-ceramic samples made from Example Composition 60 had 961 N, 1283 N, and 1321 N characteristic life loads, respectively. Once again, the two glass-ceramics were indistinguishable, and significantly better than the glass. All had similar Weibull moduli between 6 and 9. The four point bend data shown in FIG. 28 shows that the non-ion exchanged samples all had characteristic strengths between 120 and 140 MPa. After ion exchange, the Substrate X samples strength increased to 709 MPa, while the strength of the glass-ceramic samples made from Glasses 53 and 60 increased to 838 and 848 MPa, respectively, all with Weibull moduli between 35 and 60. Both glass-ceramics were significantly stronger than Substrate X, but indistinguishable from each other.

While crystallizable glasses formed from Example Composition 1 exhibited a liquidus viscosity of about 1.2 kPa*s, crystallizable glasses formed from Example Compositions 53 and 71 exhibited liquidus viscosities that exceeded 100 kPa*s. All of the glasses measured had strain points near 560° C., anneal points close to 615° C., and softening points near 895° C. The spontaneous magnetite precipitation in the crystallizable glass made from Example Composition 1 indicates that 2.16 moles of $Fe_2O_3$ exceeds the solubility limit for this composition. This is also manifested as a high liquidus temperature of 1235° C. with magnetite as the liquidus phase. Example Composition 1 may be useful for a spontaneous black magnetic glass-ceramic, it would not be suitable for making precision glass sheets, due to its low liquidus viscosity of 1.2 kPa*s.

Example Compositions 2-6 showed the large impact of excess alkali ($R_2O$—$Al_2O_3$) on $Fe_2O_3$ solubility. Example Composition 2 with 2 moles of excess alkali is grossly under-saturated in $Fe_2O_3$ and remained amorphous even after ceramming. Decreasing the excess alkali to 1 mole % results in a stable glass, that cerams to a black magnetite glass-ceramic, with just over 40 kPa*s liquidus viscosity—more than adequate for any forming operation. Once the alumina content exceeds the alkali, spontaneous magnetite precipitation is now even observed at 1.8 mole % $Fe_2O_3$ demonstrated by Example Compositions 5 and 6.

The excess alkali also affected the dielectric properties of the glass-ceramics. The lower solubility of magnetite on the alumina rich side of FIG. 8 resulted in more magnetite precipitating and correspondingly, a higher loss tangent. This was verified with XRD that showed the glass-ceramics exhibited increased integrated magnetite peak intensity at negative $R_2O$—$Al_2O_3$ that decreased to 0 as the excess alkali was increased to 2. Magnetite nanocrystals are reported to have a high dielectric loss tangent around 1.2 at about 3 GHz and magnetic losses around 0.5 depending of the size and structure of the magnetite particles. Thus the magnetite loss in known materials is 50 times greater than glass-ceramics made from Example Compositions 2-6, which could contain at most 1.2 mole % $Fe_3O_4$ implying the minority magnetite phase in these glass-ceramics contributes 1.2 loss tangent*1.2%=0.014 to the loss tangent or the majority of the 0.025 loss tangent of glass-ceramics made from Example Composition 6. However, the $Fe_2O_3$ free glass of FIGS. 26-28 has a dielectric constant of 7.17 and an average loss tangent of 0.022, which is only 0.003 less than the glass-ceramic made from Example Composition 6 (which includes magnetite). It has also been demonstrated that the loss tangent of magnetite could be reduced by more than an order of magnitude by keeping the fine magnetite dispersed and free of large particles. This explains why the magnetite-containing glass-ceramics have a lower than expected loss tangent that is only 0.003 higher than the iron free glass.

Since magnetite raises the dielectric loss tangent and causes magnetic interference, $TiO_2$ was added to Example Compositions 7, 14-17, 43-44, 53, 57, 60, 63 and 71, to avoid the formation of magnetite and other magnetic phases. The presence of $TiO_2$ shifted the phase out of magnetite and into $\varepsilon$-$Fe_2O_3$ at $TiO_2/Fe_2O_3$ ratios between 1 and 2, and into pseudobrookite ($Fe_2TiO_5$—$MgTi_2O_5$ ss) as the $TiO_2/Fe_2O_3$ ratio approached or exceeded 2 in Table I. The formation of the $\varepsilon$-$Fe_2O_3$ phase is surprising since $\varepsilon$-$Fe_2O_3$ is very hard to make, requiring oxidation of atomized iron in an electric discharge or the transformation of nanoparticles of $\gamma$-$Fe_2O_3$ (maghemite) well dispersed in a silica gel, none of which even yield phase pure $\varepsilon$-$Fe_2O_3$. In one or more embodiments, the formation $\varepsilon$-$Fe_2O_3$ is enhanced by keep the particles well dispersed. If the particles are allowed to agglomerate, they convert to maghemite at elevated temperatures. $\varepsilon$-$Fe_2O_3$ is a non-collinear ferrimagnet with a Curie temperature near 200° C. and has a very large coercivity of 20 kOe and saturation magnetization of 25 emu/g; however the $\varepsilon$-$Fe_2O_3$ glass ceramics of the embodiments described herein did not stick to a magnet like the magnetite glass-ceramics.

The lack of obvious magnetism may be explained by the understanding that small $\varepsilon$-$Fe_2O_3$ particles synthesized at 700° C. were superparamagnetic exhibiting zero remnant magnetization and zero coercivity. It is also understood that $\varepsilon$-$Fe_2O_3$ particles must reach a threshold size before its magnetocrystalline anisotropies could cause high coercivities and that low magnetization is achieved with small $\varepsilon$-$Fe_2O_3$ particles as the TEM images depict. Furthermore, FIGS. 14A, 14B and 15 demonstrated that the nanocrystallites in the glass-ceramics with the $\varepsilon$-$Fe_2O_3$ structure are not pure $Fe_2O_3$, but a solid solution of MgO, $TiO_2$, and $Fe_2O_3$, which could disrupt the magnetic ordering of $\varepsilon$-$Fe_2O_3$ made up of $Fe_2O_3$ alone. The glass-ceramics described herein also have a large fraction of $Fe^{2+}$, unlike the pure $Fe_2O_3$ based $\varepsilon$-$Fe_2O_3$ which is nominally all $Fe^{3+}$. Finally, all of the glass-ceramic compositions that expressed $\varepsilon$-$Fe_2O_3$ had 2.4 times less total $Fe_2O_3$ than those expressing magnetite, so the total number of unpaired spins is lower in the $\varepsilon$-$Fe_2O_3$ glass-ceramics reducing the magnetization by more than half. Thus, the small size, compositional complexity, mixed valence state, and lower total Fe content all can contribute to the fortuitously low magnetization of the $\varepsilon$-$Fe_2O_3$ glass-ceramics.

Figure 29:
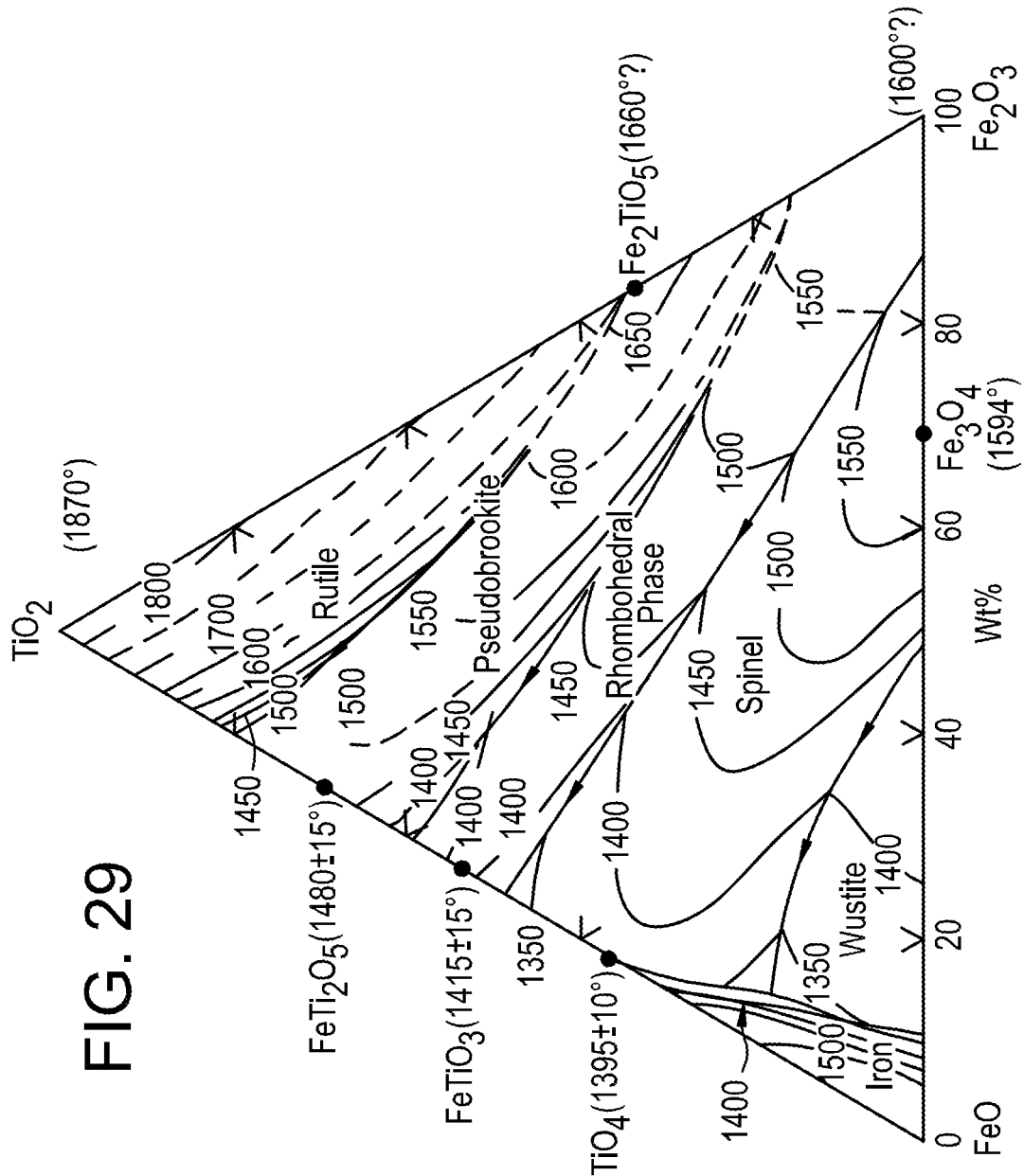
FIG. 29 shows a $FeO$—$TiO_2$—$Fe_2O_3$ phase diagram.

It was also noticed that the compositions of the $\varepsilon$-$Fe_2O_3$ nanocrystals plot right across the gap in the rhombohedral phase field ($\alpha'$-$Fe_2O_3$ (hematite) $\alpha$-$MgTiO_3$ (geikielite) tie line) in FIG. 15. It has been reported that the gap gets smaller with decreasing temperature, but this has not been investigated below 1000° C. due to slow equilibration kinetics. However it is understood that the gap in the $\alpha'$-$Fe_2O_3$ (hematite) $\alpha$-$MgTiO_3$ (geikielite) tie line should disappear in the vicinity of 700° C., which is the temperature regime where the glass-ceramics described herein form $\varepsilon$-$Fe_2O_3$. The $\varepsilon$-$Fe_2O_3$ in glass-ceramics made from Example Compositions 53 and 60 both convert to pseudobrookite when cerammed at 850° C. It should also be pointed out that the pseudo ternary diagram in FIG. 15 is an oversimplification of the crystallite compositions in this glass-ceramic because both $Fe^{2+}$ and $Fe^{3+}$ are simultaneously present (bulk precursor glasses have about 2/3 $Fe^{3+}$ and 1/3 $Fe^{2+}$). The FeO—$TiO_2$—$Fe_2O_3$ ternary in FIG. 29 has the same phase relationships as the MgO—$TiO_2$—$Fe_2O_3$ diagram in FIG. 15, except that MgO is replaced by FeO and the rhombohedral phase extends all the way from $\alpha'$-$Fe_2O_3$ to $\alpha'$-$FeTiO_3$, unlike the $Fe_2O_3$—$MgTiO_3$ solid solution which exhibits a gap in the middle that decreases with temperature. The $MgFe_2O_4$ spinel has the same structure and similar XRD pattern to $Fe_3O_4$ ($FeFe_2O_4$) magnetite so it is very likely the magnetite phase detected by XRD is actually a solid solution of both spinels, $MgFe_2O_4$ and $Fe_3O_4$. FIG. 29 shows that the gap disappears when MgO is replaced with FeO, and the $\varepsilon$-$Fe_2O_3$ crystallites have a mixture of both MgO and FeO. Finally, $\varepsilon$-$Fe_2O_3$ is orthorhombic with a different crystal structure than the rhombohedral isomorphs of $\alpha'$-$Fe_2O_3$, $\alpha'$-$FeTiO_3$, and $\alpha$-$MgTiO_3$. While $\varepsilon$-$Fe_2O_3$ may be metastable, metastable phases can often be formed from the crystallization of glass because metastable phases often require less structural rearrangement from the glass than the stable phase would require. Thus the combination of well dispersed crystals, compositional complexity, low ceram temperature, different structure, and precipitation from a glass all can contribute to the stability of the $\varepsilon$-$Fe_2O_3$ phase and its extensive solid solution.

While $TiO_2$ additions enabled the formation of non-magnetic black glass ceramics, they also increased the dielectric constant and loss tangent of the glass-ceramic. By lowering the amount of $\varepsilon$-$Fe_2O_3$ and or pseudobrookite to the minimum amount needed to achieve the desired color, the dielectric constant and loss tangent can both be lowered back to below 7.1 and 0.023 respectively as demonstrated by the glasses made from Example Compositions 15, 43 and 44 plotted in FIG. 9, which is comparable to the Example Compositions of FIGS. 26-28 with 7.17 dielectric constant, and 0.022 average loss tangent. As a benefit, the lower the amount of the low solubility phase, the lower the liquidus temperature, and correspondingly the liquidus viscosity will be greater.

By taking the low loss of Example Composition 43 and then fine tuning the composition while keeping the minimal amounts of $Fe_2O_3$ and $TiO_2$ necessary to achieve opacity and color, the high liquidus viscosity glass-ceramic made from Example Composition 53 was achieved with 135.8 kPa*s liquidus viscosity. An even darker glass-ceramic was achieved by increasing the $Fe_2O_3$ in the composition by only 0.15% resulting in Example Composition 60, which forms a clear glass, but was completely opaque after ceramming, even with a thickness of about 0.8 mm, yet still had well over 60 kPa*s liquidus viscosity. A benefit of having a clear or transparent glass is that it permits for automated real time automated inspection of defects and assessment of quality before the material is cerammed. A transparent precursor glass is thus recognized as a benefit in manufacturing, since a spontaneous black material would mask the quantity and identity of melting defects such as cord, seeds, knots, and stones that operators need to adjust melting conditions. These defects must be detected swiftly and the melting process tuned to eliminate them, since they can degrade the strength and performance of the material.

To fine tune the color and optimize the heat treatment time of glass-ceramics made from Example Composition 60, the transmission was studied using in-situ transmission measurements during a ceram cycle. The transmission decrease during the 630° C. nucleation hold in FIG. 11 indicates substantial changes occurring in the glass, even though neither TEM nor XRD could detect any signs of crystallization for samples heat treated at 630° C. Without being bound by theory, it is believed that this must be when the nuclei form and that they are too small for either technique (i.e., TEM and/or XRD) to detect without damaging the glass. Difficulty in observing the nucleating phase is not unusual even in 'traditional' high crystallinity glass-ceramics but in the case reported here, these materials have less than 2 mole % of the composition available to partition into the crystal. If only a small fraction of that 2 mol % is converting to nuclei, it can be extremely hard to detect. Since the precursor glass is designed to respond thermally and ceram, it is very beam sensitive in the TEM and crystallites below 5 nm cannot be imaged without damaging the glass, nor can meaningful EELS spectra be acquired on features smaller than 15 nm. The precipitous drop in transmission at 700° C. corresponds to the growth temperature of the crystallites.

Figure 30:
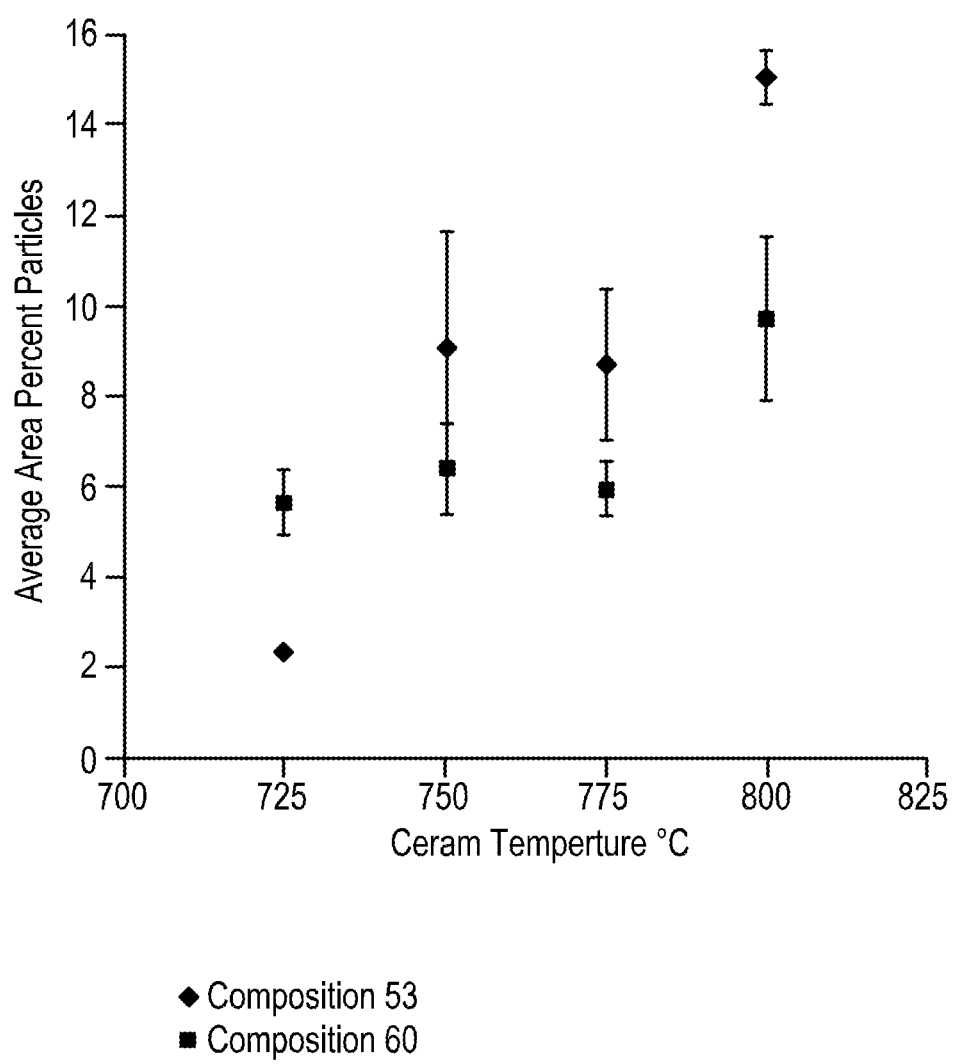
FIG. 30 shows the average area fraction of crystallites in glass-ceramics made from Example Compositions 14 and 16, as a function of ceram temperature.

The maximum in blackness and opacity at a ceramming temperature of about 750° C. followed by diminished opacity and greying at higher temperatures was initially believed that the nanocrystallites were dissolving back into the glass at higher temperatures, but the TEM images showed even larger crystallites with higher ceram temperatures. The areal density of the nanocrystallites was calculated from the TEM images and plotted in FIG. 30 showing an increase in crystallinity with increased ceram temperature, which rules out decreased crystallinity, as the cause of diminished opacity and greying.

Figure 12:
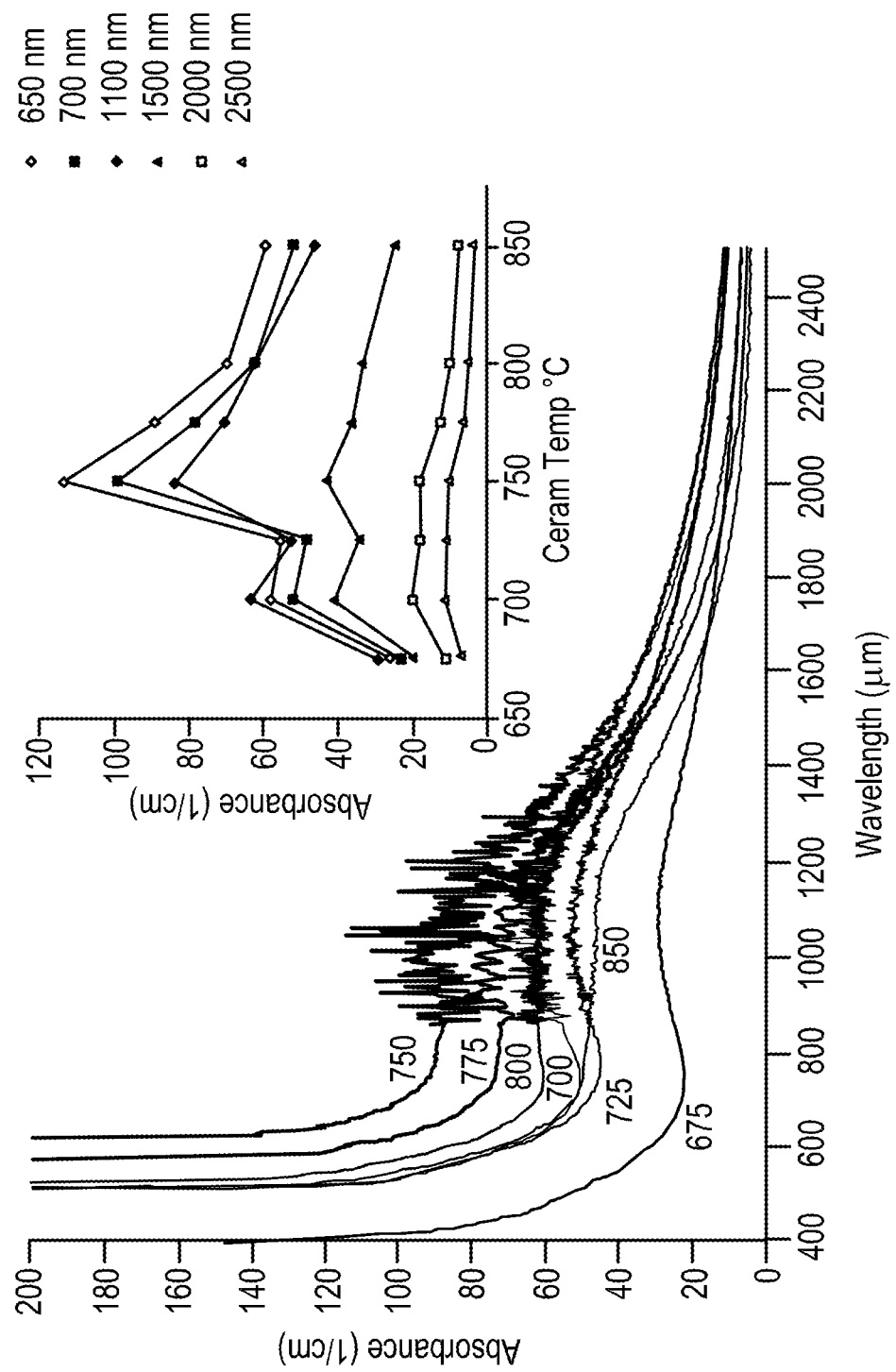
FIG. 12 illustrates extinction spectra through 0.8 mm thick samples of glass-ceramics made from Example Composition 14, after ceramming at various temperatures between 700 and 850° C.
Figure 13:
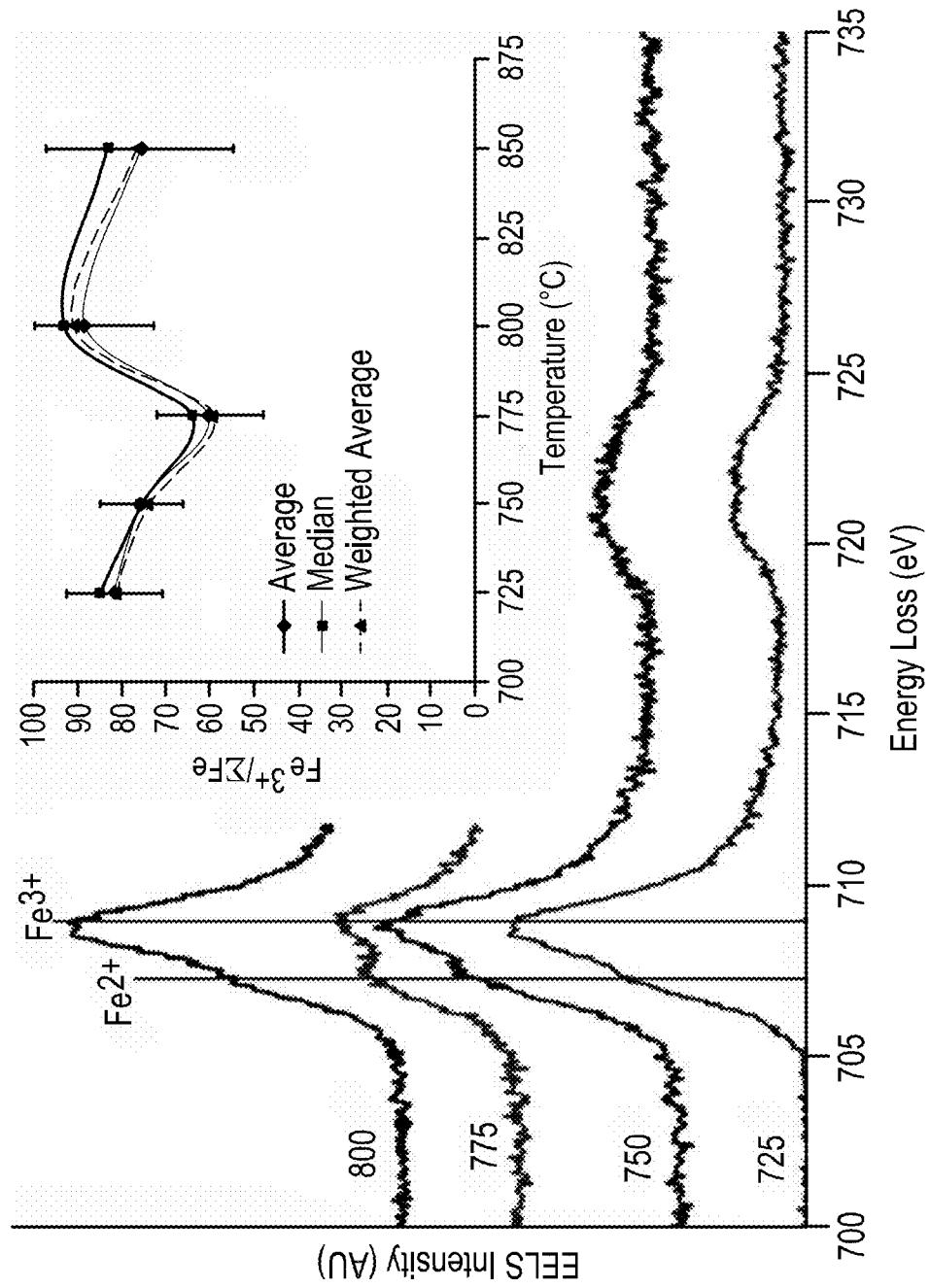
FIG. 13 shows an Fe L23 EELS spectra of a glass-ceramic made from Example Composition 14, after ceramming at various temperatures, with an inset showing Fe3+/Total Fe ratio as a function of ceram temperature.

The shape of the absorption curves in FIG. 12 coupled with the Fe EELS spectra in FIG. 13 provides insight in understanding the transmission increase with ceram temperatures above 750° C. While the shape of the absorption tail between 400 and 700 nm may resemble scattering, it follows neither a $\lambda^{-4}$ dependence indicative of Rayleigh scattering, nor a $\lambda^{-2}$ dependence indicative of larger particle Mie scattering. It is actually well fit by a $\lambda^{-3}$ dependence and is most likely the tail of the strong absorption in the visible that makes the material black. If scattering were dominating extinction in the visible, the material would look hazy or white. Accordingly, intense absorption is necessary to make a material black.

The $Fe^{2+}$—$Ti^{4+}$ charge transfer band has a very large absorption cross section and results in intense absorption in the visible portion of the spectrum. Even a few tens of ppm of $Fe^{2+}$ and $Ti^{4+}$ result in a yellow tint that is detectable by eye. For charge transfer mechanisms to be active, the $Fe^{2+}$ and $Ti^{4+}$ must be in close proximity such as next nearest neighbors bound to a common $O^{2-}$ ion. Even though both $Fe^{2+}$ and $Ti^{4+}$ are present in the precursor glass, they are at low concentrations, and thus fairly well dispersed resulting only in a dark amber colored glass due to the few $Fe^{2+}$ and $Ti^{4+}$ ions in close proximity. However when they are partitioned into the crystallites, they become next nearest neighbors creating an intense absorption band covering most of the visible spectrum. Close inspection of FIG. 12 shows the $Fe^{2+}$ band at 1100 nm reaching a maximum at the 750° C. ceram temperature and then diminishing at higher ceram temperatures in agreement with the 750° C. opacity maximum. The intensity of the charge transfer band must be 0 in the absence of $Fe^{2+}$ and then increases as the $Fe^{2+}$ increases with optimized ceram temperatures.

Figure 31:
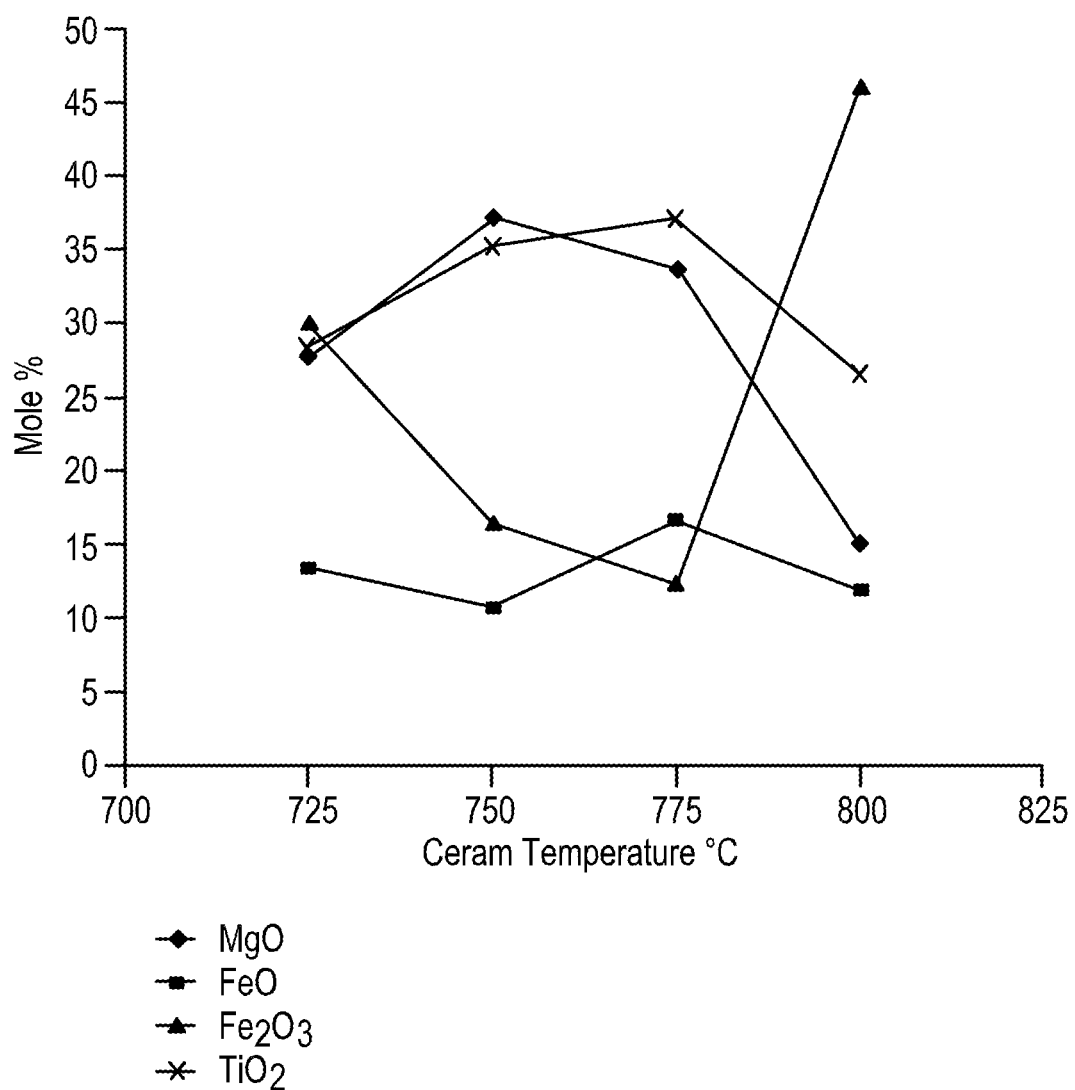
FIG. 31 shows the composition of crystallites in glass-ceramics made from Example Composition 14 as a function of ceram temperature broken down into FeO, $Fe_2O_3$, MgO and $TiO_2$ via EELS and Fe $L_{23}$ edge spectra.

The EELS spectra of the nanocrystallites provide their composition as well as the $Fe^{2+}$ fraction. The highest fraction of $Fe^{2+}$ occurs at the minimum in $Fe^{3+}$/Total Fe ratio in FIG. 13 at the 775° C. ceram temperature, which is 25° C. hotter than the observed opacity maximum and $Fe^{2+}$ peak in the optical data. FIG. 31 shows the total $Fe^{2+}$ concentration from EELS ($Fe^{2+}$ fraction*Total $Fe_2O_3$) as well as the MgO content of the crystallites. While the $Fe^{2+}$ peaks at a ceram temperature of 775° C., the MgO peaks at a ceram temperature of 750° C. in agreement with the observed opacity maximum. $Fe^{2+}$—$Fe^{3+}$ and $Fe^{2+}$—$Ti^{4+}$ coordination clusters may coexist in the same structure and give rise to both homonuclear $Fe^{2+}$—$Fe^{3+}$ as well as heteronuclear $Fe^{2+}$—$Ti^{4+}$ charge transfer bands. The optical absorption data indicates the largest $Fe^{2+}$ concentration occurs at the 750° C. ceram temperature, so there should be an accompanying maximum in both $Fe^{2+}$—$Fe^{3+}$ and $Fe^{2+}$—$Ti^{4+}$ coordination clusters and charge transfer absorption, since both clusters require $Fe^{2+}$. In addition, it is understood that the local charge misbalance that occurs with the isomorphous substitution of ions facilitates homonuclear charge transfer bands, such as the replacement of $Fe^{2+}$ and $Mg^{2+}$ by $Al^{3+}$ and $Fe^{3+}$ in ferromagnesian silicates. In the case of $\varepsilon$-$Fe_2O_3$, all of the cations are nominally $Fe^{3+}$, so for the structure to accommodate $Mg^{2+}$ and $Fe^{2+}$, $Ti^{4+}$ ions or oxygen vacancies must compensate the charge deficit. Either will result in local charge imbalance to lift the degeneracy of the Fe sites giving rise to homonuclear $Fe^{2+}\rightarrow Fe^{3+}$. Thus the higher levels of $Mg^{2+}$ and $Fe^{2+}$ in the $\varepsilon$-$Fe_2O_3$ crystallites are correlated with the opacity of the glass-ceramics and likely explain the absorption maximum at the 750° C. ceram temperature via the greater total absorption intensity of the $Fe^{2+}$—$Fe^{3+}$ and $Fe^{2+}$—$Ti^{4+}$ charge transfer bands. At the higher ceram temperatures where the crystallites are larger and the $Fe^{2+}$—$Ti^{4+}$ charge transfer band diminished, scattering becomes significant. Pure scattering makes a white material, but when mixed with black, results in the greys observed in the samples cerammed at 800 and 850° C.

Figure 32:
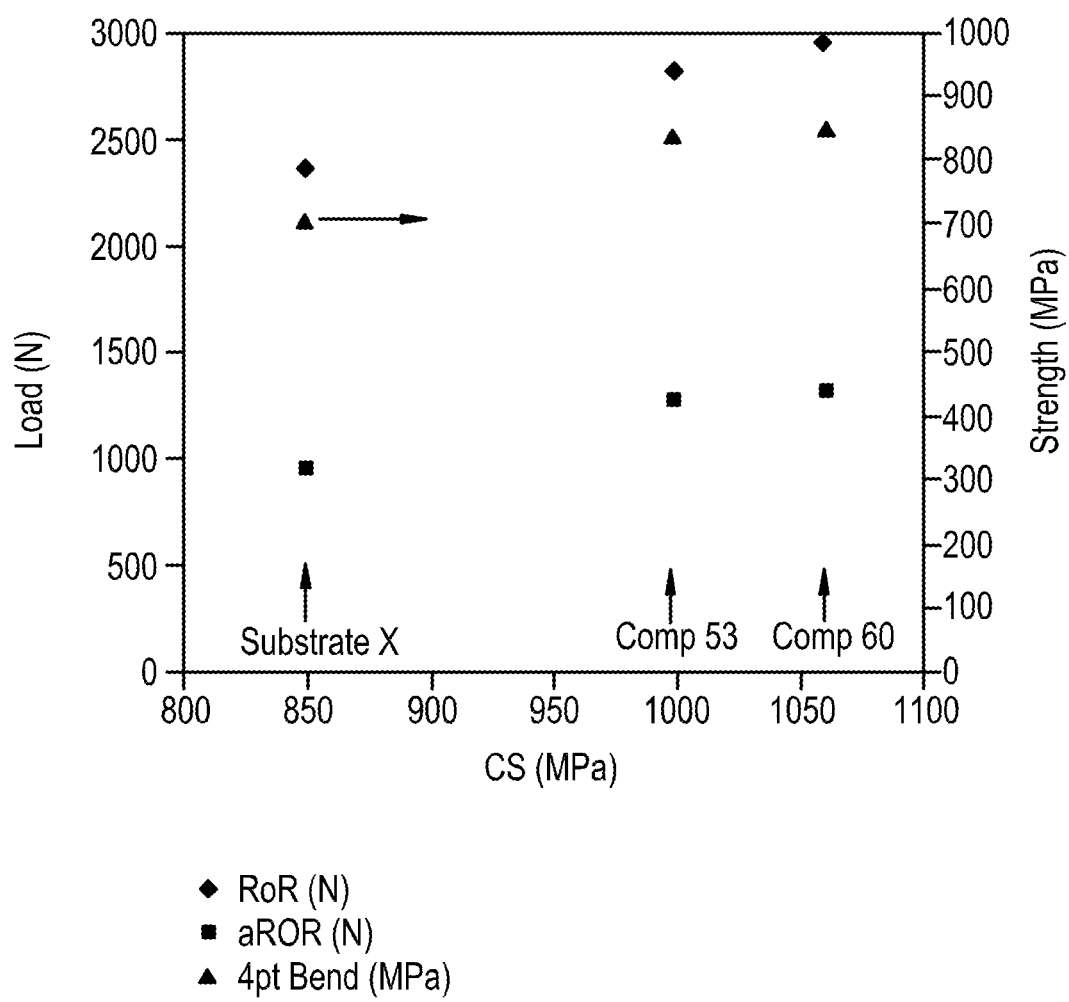
FIG. 32 shows the characteristic failure load and strength versus ion exchanged compressive stress in a known glass sample and glass-ceramics made from Example Compositions 14 and 16, after ceramming at 700° C. for 4 hours.

The ring-on-ring data provided herein demonstrate that the glass-ceramic mechanical performance and surface finish were no different from that of known glass substrates before ion exchange. After ion exchange, the failure load for the glass and glass-ceramics was increased by a factor of about 6 because the compressive stress induced by the ion exchange process put approximately 1 GPa of compression onto any existing flaws near the surface of the glass or glass-ceramic. This chemically induced compression then needs to be overcome before the flaws can experience tension and subsequent failure. Abraded ring-on-ring data provided an indication of how the material will perform in the field after use, once damage and flaws have been introduced. The black glass-ceramics showed slightly better performance in both the abraded and non-abraded tests. To understand why, the ring-on-ring and 4 point bend results were plotted as a function of ion exchanged compressive stress in FIG. 32 which shows the correlation between compressive stress and load to failure. It should be noted that the 4 point bend measured modulus of rupture, and not edge strength. For samples with the same nominal exchange depths, the higher compressive stress puts a greater compressive force on existing flaws as well as a greater compressive stress below the surface at the depth the damage was driven by abrasion, which is typically on the order of 10 microns deep and well within the 41 micron compressive layer.

It was observed that the compressive stress was higher for the glass-ceramics than the glass Substrate X samples, even though the glass ceramics were ion exchanged for longer time at a hotter temperature, both of which typically reduce the compressive stress for an ion exchanged glass. One reason for this may be that the glass Substrate X samples were quenched into air after fusion draw, while the glass-ceramics were also initially quenched, but they were subsequently cerammed and cooled much slower in an oven at furnace rate resulting in a denser residual glass in the glass-ceramic. It has been demonstrated that annealed glasses have higher compressive stress and lower diffusivities than quenched glasses. Without being bound by theory, this may be why the slowly cooled glass-ceramics have higher compressive stress and strength than their glass counterpart. Without being bound by theory, this may also be the reason why the glass-ceramics needed to be ion exchanged 10° C. hotter and 1.5 hours longer to achieve the same DOL as the Substrate X samples.

The foregoing embodiments describe crystallizable glasses that provide low crystallinity glass-ceramics with high liquidus viscosity. Magnetite, pseudobrookite, and $\epsilon\text{-}Fe_2O_3$ glass-ceramics were made by heat treating silicate glasses doped with $Fe_2O_3$, MgO, and or $TiO_2$. Extensive solid solution of $\epsilon\text{-}Fe_2O_3$ with $MgTiO_3$ was discovered for ceram temperatures between 675 and 800° C. EELS and optical absorption data showed that the $Fe^{2+}$ content of the crystallites reached a maximum near 750° C. resulting in maximum blackness and opacity because of optimized $Fe^{2+}$—$Ti^{4+}$ charge transfer. By keeping the amount of crystalline material minimal, the dielectric losses and liquidus temperatures were minimized providing a first fusion formable oxide glass-ceramic. Utilizing crystallizable glass compositions with fast ion exchange properties and high compressive stress, resulted in glass-ceramics with strengths of 840 to 850 MPa after ion exchange.

Example Compositions 116-170: The Example Compositions listed in Table IX were used to form crystallizable glasses by introducing appropriately batched raw materials to a platinum crucible. The crucible was then placed in a furnace having a temperature up to about 1700° C. The materials were then refined and the molten glasses were then either poured onto a steel plate to make patties of glass, or they were formed into sheet by rolling or down draw.

In particular, crystallizable glasses formed from Example Compositions 116-170 were melted by mixing 2500 g of batched raw materials in a 1.81 platinum crucible, which was then placed in a SiC globar furnace having a temperature of about 1600° C. for 5 hours. The melted materials were then poured a thin stream into a bucket of flowing cold water to make cullet. The cullet was then remelted at 1650° C. for 5 hours to obtain a homogeneous melt and then poured onto a steel table and subsequently annealed for 2 hours at about 620° C.

TABLE IX

| Ex. | $SiO_2$ | $Al_2O_3$ | $B_2O_3$ | $Li_2O$ | $Na_2O$ | $K_2O$ | MgO | CaO | $SnO_2$ |
|---|---|---|---|---|---|---|---|---|---|
| 116 | 64.277 | 13.240 | 5.369 | 0 | 13.794 | 0.002 | 2.040 | 0.036 | 0.003 |
| 117 | 64.306 | 13.267 | 5.241 | 0 | 13.881 | 0.002 | 1.546 | 0.031 | 0.003 |
| 118 | 64.404 | 13.327 | 5.188 | 0 | 13.794 | 0.002 | 1.274 | 0.031 | 0.003 |
| 119 | 64.357 | 13.297 | 5.173 | 0 | 13.835 | 0.002 | 1.898 | 0.035 | 0.003 |
| 120 | 64.201 | 13.274 | 5.298 | 0 | 13.902 | 0.001 | 1.805 | 0.033 | 0.003 |
| 121 | 64.248 | 13.267 | 5.282 | 0 | 13.902 | 0.002 | 1.693 | 0.032 | 0.003 |
| 122 | 66.710 | 11.880 | 6.750 | 4.420 | 6.790 | 0.480 | 1.570 | 0 | 0 |
| 123 | 63.908 | 13.579 | 5.355 | 0 | 13.784 | 0.018 | 1.554 | 0.032 | 0.038 |
| 124 | 63.904 | 13.557 | 5.364 | 0 | 13.784 | 0.019 | 1.553 | 0.032 | 0.042 |
| 125 | 63.829 | 13.526 | 5.371 | 0 | 13.849 | 0.019 | 1.551 | 0.032 | 0.042 |
| 126 | 63.753 | 13.496 | 5.378 | 0 | 13.915 | 0.019 | 1.550 | 0.031 | 0.042 |
| 127 | 63.866 | 13.506 | 5.384 | 0 | 13.826 | 0.020 | 1.534 | 0.031 | 0.039 |
| 128 | 63.831 | 13.525 | 5.386 | 0 | 13.805 | 0.019 | 1.531 | 0.047 | 0.042 |
| 129 | 63.829 | 13.530 | 5.410 | 0 | 13.819 | 0.018 | 1.502 | 0.035 | 0.038 |
| 130 | 63.885 | 13.430 | 5.404 | 0 | 13.849 | 0.017 | 1.524 | 0.032 | 0.040 |
| 131 | 63.849 | 13.467 | 5.403 | 0 | 13.853 | 0.017 | 1.522 | 0.031 | 0.038 |
| 132 | 63.850 | 13.443 | 5.406 | 0 | 13.858 | 0.019 | 1.525 | 0.030 | 0.038 |
| 133 | 63.811 | 13.396 | 5.406 | 0 | 13.960 | 0.018 | 1.523 | 0.030 | 0.036 |
| 134 | 63.967 | 13.447 | 5.350 | 0 | 13.794 | 0.018 | 1.515 | 0.031 | 0.043 |
| 135 | 63.899 | 13.458 | 5.373 | 0 | 13.838 | 0.019 | 1.518 | 0.030 | 0.041 |
| 136 | 63.833 | 13.374 | 5.393 | 0 | 13.981 | 0.018 | 1.515 | 0.031 | 0.036 |
| 137 | 63.862 | 13.366 | 5.413 | 0 | 13.940 | 0.019 | 1.524 | 0.032 | 0.035 |
| 138 | 63.889 | 13.339 | 5.443 | 0 | 13.936 | 0.019 | 1.511 | 0.030 | 0.034 |
| 139 | 63.966 | 13.317 | 5.416 | 0 | 13.920 | 0.019 | 1.501 | 0.031 | 0.030 |
| 140 | 63.785 | 13.536 | 5.400 | 0 | 13.887 | 0.017 | 1.593 | 0.032 | 0.029 |
| 141 | 63.605 | 13.755 | 5.385 | 0 | 13.854 | 0.016 | 1.684 | 0.032 | 0.028 |

TABLE IX-continued

| Ex. | | | | | | | | |
|---|---|---|---|---|---|---|---|---|
| 142 | 63.483 | 13.863 | 5.368 | 0 | 13.865 | 0.017 | 1.736 | 0.032 | 0.030 |
| 143 | 63.577 | 13.911 | 5.335 | 0 | 13.767 | 0.016 | 1.758 | 0.032 | 0.031 |
| 144 | 63.420 | 13.908 | 5.329 | 0 | 13.688 | 0.017 | 1.770 | 0.035 | 0.032 |
| 145 | 63.533 | 13.952 | 5.327 | 0 | 13.749 | 0.016 | 1.776 | 0.035 | 0.032 |
| 146 | 63.606 | 13.962 | 5.327 | 0 | 13.701 | 0.016 | 1.764 | 0.032 | 0.030 |
| 147 | 63.534 | 13.971 | 5.321 | 0 | 13.775 | 0.016 | 1.769 | 0.033 | 0.031 |
| 148 | 63.497 | 13.981 | 5.325 | 0 | 13.806 | 0.016 | 1.773 | 0.034 | 0.026 |
| 149 | 63.586 | 13.935 | 5.327 | 0 | 13.766 | 0.016 | 1.765 | 0.036 | 0.026 |
| 150 | 63.760 | 13.990 | 5.018 | 0 | 13.801 | 0.016 | 1.800 | 0.040 | 0.025 |
| 151 | 64.329 | 13.726 | 4.690 | 0 | 13.648 | 0.130 | 1.747 | 0.043 | 0.025 |
| 152 | 64.970 | 13.353 | 4.349 | 0 | 13.452 | 0.299 | 1.708 | 0.040 | 0.026 |
| 153 | 65.667 | 12.945 | 4.009 | 0 | 13.242 | 0.463 | 1.662 | 0.035 | 0.023 |
| 154 | 65.642 | 12.929 | 3.999 | 0 | 13.182 | 0.516 | 1.669 | 0.032 | 0.027 |
| 155 | 65.761 | 12.858 | 3.984 | 0 | 13.162 | 0.520 | 1.655 | 0.033 | 0.027 |
| 156 | 65.810 | 12.813 | 3.976 | 0 | 13.157 | 0.531 | 1.650 | 0.033 | 0.027 |
| 157 | 65.829 | 12.819 | 3.959 | 0.000 | 13.147 | 0.535 | 1.641 | 0.035 | 0.027 |
| 158 | 65.852 | 12.778 | 3.948 | 0.000 | 13.172 | 0.536 | 1.651 | 0.036 | 0.027 |
| 159 | 65.632 | 12.722 | 4.275 | 0.000 | 13.126 | 0.539 | 1.639 | 0.038 | 0.026 |
| 160 | 65.482 | 12.643 | 4.594 | 0.000 | 13.047 | 0.538 | 1.631 | 0.043 | 0.027 |
| 161 | 65.466 | 12.564 | 4.906 | 0.674 | 12.257 | 0.531 | 1.616 | 0.045 | 0.026 |
| 162 | 65.913 | 12.426 | 5.228 | 1.344 | 11.060 | 0.520 | 1.630 | 0.046 | 0.026 |
| 163 | 66.291 | 12.297 | 5.546 | 2.108 | 9.874 | 0.510 | 1.616 | 0.048 | 0.025 |
| 164 | 66.613 | 12.136 | 5.844 | 2.989 | 8.674 | 0.500 | 1.600 | 0.045 | 0.025 |
| 165 | 67.438 | 12.081 | 6.103 | 3.371 | 7.370 | 0.490 | 1.606 | 0.045 | 0.026 |
| 166 | 66.985 | 11.938 | 6.296 | 4.355 | 6.861 | 0.483 | 1.590 | 0.044 | 0.024 |
| 167 | 66.954 | 11.921 | 6.410 | 4.362 | 6.802 | 0.481 | 1.587 | 0.043 | 0.023 |
| 168 | 66.924 | 11.903 | 6.523 | 4.369 | 6.743 | 0.480 | 1.584 | 0.043 | 0.022 |
| 169 | 66.822 | 11.886 | 6.636 | 4.403 | 6.726 | 0.480 | 1.577 | 0.041 | 0.022 |
| 170 | 66.720 | 11.868 | 6.749 | 4.437 | 6.709 | 0.479 | 1.570 | 0.040 | 0.021 |

| Ex. | $ZrO_2$ | $TiO_2$ | $Fe_2O_3$ | MnO | $CoO_2$ | Total | $R_2O$—$Al_2O_3$ | $R_xO$—$Al_2O_3$ | $TiO_2$/$Fe_2O_3$ |
|---|---|---|---|---|---|---|---|---|---|
| 116 | 0.000 | 0.734 | 0.505 | 0 | 0 | 100 | 0.556 | 2.632 | 1.452 |
| 117 | 0.000 | 1.217 | 0.506 | 0 | 0 | 100 | 0.616 | 2.193 | 2.407 |
| 118 | 0.000 | 1.470 | 0.506 | 0 | 0 | 100 | 0.470 | 1.775 | 2.905 |
| 119 | 0.000 | 1.079 | 0.322 | 0 | 0 | 100 | 0.540 | 2.473 | 3.353 |
| 120 | 0.000 | 0.980 | 0.503 | 0 | 0 | 100 | 0.630 | 2.469 | 1.950 |
| 121 | 0.000 | 0.882 | 0.689 | 0 | 0 | 100 | 0.637 | 2.362 | 1.280 |
| 122 | 0 | 0.880 | 0.520 | 0 | 0 | 100 | −0.190 | 1.380 | 1.692 |
| 123 | 0.009 | 1.183 | 0.519 | 0 | 0 | 100 | 0.223 | 1.809 | 2.278 |
| 124 | 0.009 | 1.192 | 0.525 | 0 | 0 | 100 | 0.246 | 1.831 | 2.271 |
| 125 | 0.010 | 1.218 | 0.534 | 0 | 0 | 100 | 0.342 | 1.925 | 2.281 |
| 126 | 0.011 | 1.244 | 0.543 | 0 | 0 | 100 | 0.438 | 2.019 | 2.291 |
| 127 | 0.010 | 1.227 | 0.538 | 0 | 0 | 100 | 0.339 | 1.905 | 2.282 |
| 128 | 0.012 | 1.242 | 0.541 | 0 | 0 | 100 | 0.298 | 1.876 | 2.295 |
| 129 | 0.013 | 1.243 | 0.543 | 0 | 0 | 100 | 0.307 | 1.844 | 2.290 |
| 130 | 0.012 | 1.242 | 0.545 | 0 | 0 | 100 | 0.436 | 1.993 | 2.277 |
| 131 | 0.012 | 1.242 | 0.547 | 0 | 0 | 100 | 0.403 | 1.956 | 2.270 |
| 132 | 0.013 | 1.251 | 0.548 | 0 | 0 | 100 | 0.433 | 1.988 | 2.284 |
| 133 | 0.011 | 1.243 | 0.547 | 0 | 0 | 100 | 0.582 | 2.134 | 2.272 |
| 134 | 0.015 | 1.252 | 0.548 | 0 | 0 | 100 | 0.365 | 1.911 | 2.284 |
| 135 | 0.015 | 1.243 | 0.546 | 0 | 0 | 100 | 0.399 | 1.948 | 2.275 |
| 136 | 0.013 | 1.242 | 0.546 | 0 | 0 | 100 | 0.625 | 2.171 | 2.275 |
| 137 | 0.013 | 1.233 | 0.543 | 0 | 0 | 100 | 0.593 | 2.150 | 2.271 |
| 138 | 0.013 | 1.225 | 0.542 | 0 | 0 | 100 | 0.616 | 2.157 | 2.262 |
| 139 | 0.012 | 1.226 | 0.544 | 0 | 0 | 100 | 0.621 | 2.154 | 2.255 |
| 140 | 0.012 | 1.142 | 0.548 | 0 | 0 | 100 | 0.368 | 1.993 | 2.084 |
| 141 | 0.011 | 1.058 | 0.552 | 0 | 0 | 100 | 0.115 | 1.832 | 1.915 |
| 142 | 0.013 | 1.018 | 0.557 | 0 | 0 | 100 | 0.019 | 1.787 | 1.829 |
| 143 | 0.011 | 0.983 | 0.558 | 0 | 0 | 100 | −0.128 | 1.662 | 1.761 |
| 144 | 0.013 | 1.210 | 0.561 | 0 | 0 | 100 | −0.203 | 1.602 | 2.157 |
| 145 | 0.011 | 0.991 | 0.558 | 0 | 0 | 100 | −0.186 | 1.625 | 1.776 |
| 146 | 0.012 | 0.974 | 0.558 | 0 | 0 | 100 | −0.245 | 1.551 | 1.747 |
| 147 | 0.008 | 0.965 | 0.558 | 0 | 0 | 100 | −0.180 | 1.622 | 1.729 |
| 148 | 0.007 | 0.958 | 0.559 | 0 | 0 | 100 | −0.159 | 1.647 | 1.713 |
| 149 | 0.007 | 0.959 | 0.558 | 0 | 0 | 100 | −0.153 | 1.648 | 1.717 |
| 150 | 0.007 | 0.962 | 0.562 | 0 | 0 | 100 | −0.173 | 1.666 | 1.711 |
| 151 | 0.008 | 1.046 | 0.589 | 0 | 0 | 100 | 0.051 | 1.842 | 1.777 |
| 152 | 0.009 | 1.152 | 0.623 | 0 | 0 | 100 | 0.398 | 2.146 | 1.848 |
| 153 | 0.009 | 1.265 | 0.661 | 0 | 0 | 100 | 0.759 | 2.456 | 1.913 |
| 154 | 0.011 | 1.299 | 0.676 | 0 | 0 | 100 | 0.769 | 2.471 | 1.922 |
| 155 | 0.010 | 1.298 | 0.673 | 0 | 0 | 100 | 0.824 | 2.512 | 1.928 |
| 156 | 0.010 | 1.299 | 0.674 | 0 | 0 | 100 | 0.875 | 2.558 | 1.928 |
| 157 | 0.010 | 1.305 | 0.673 | 0 | 0 | 100 | 0.863 | 2.538 | 1.939 |
| 158 | 0.010 | 1.297 | 0.673 | 0 | 0 | 100 | 0.931 | 2.618 | 1.928 |
| 159 | 0.010 | 1.301 | 0.672 | 0 | 0 | 100 | 0.944 | 2.621 | 1.938 |
| 160 | 0.012 | 1.295 | 0.669 | 0 | 0 | 100 | 0.942 | 2.616 | 1.937 |
| 161 | 0.011 | 1.239 | 0.647 | 0 | 0 | 100 | 0.898 | 2.559 | 1.914 |
| 162 | 0.009 | 1.162 | 0.619 | 0 | 0 | 100 | 0.497 | 2.173 | 1.878 |

TABLE IX-continued

| | | | | | | | | | |
|---|---|---|---|---|---|---|---|---|---|
| 163 | 0.009 | 1.067 | 0.590 | 0 | 0 | 100 | 0.195 | 1.860 | 1.808 |
| 164 | 0.007 | 0.987 | 0.561 | 0 | 0 | 100 | 0.027 | 1.672 | 1.759 |
| 165 | 0.008 | 0.907 | 0.536 | 0 | 0 | 100 | −0.850 | 0.801 | 1.694 |
| 166 | 0.008 | 0.875 | 0.520 | 0 | 0 | 100 | −0.239 | 1.395 | 1.682 |
| 167 | 0.008 | 0.870 | 0.519 | 0 | 0 | 100 | −0.275 | 1.356 | 1.677 |
| 168 | 0.008 | 0.865 | 0.517 | 0 | 0 | 100 | −0.310 | 1.317 | 1.671 |
| 169 | 0.008 | 0.863 | 0.517 | 0 | 0 | 100 | −0.276 | 1.342 | 1.670 |
| 170 | 0.008 | 0.862 | 0.516 | 0 | 0 | 100 | −0.243 | 1.367 | 1.669 |

TABLE X

| Ex. | Strain Pt. °C. | Anneal Pt. °C. | Soft Pt. °C. | a (10⁻⁷/°C.) | ρ (g/cm³) | β-OH | Indent Thres. (kgf) | Liquidus Temp (°C.)—24 hrs. Air | Int. | Pt. | Liquidus Temp (°C.)—72 hrs. Air | Int. | Pt. | LiqVisc (kP)—24 hrs. Air | Int. | Pt. | LiqVisc (kP)—72 hrs. Air | Int. | Pt. |
|---|---|---|---|---|---|---|---|---|---|---|---|---|---|---|---|---|---|---|---|
| 116 | 553 | 602 | 865 | 75.5 | 2.413 | | | 985 | 1000 | 1000 | | | | | | | | | |
| 117 | 550 | 601 | 869 | 76 | 2.413 | | 15–20 | 990 | 995 | 990 | | | | 1782 | 1585 | 1782 | | | |
| 118 | 554 | 605 | 883 | 75.4 | 2.412 | | | 1085 | 1070 | 1070 | | | | 257 | 344 | 344 | | | |
| 119 | 555 | 604 | 861 | 75.8 | 2.41 | | | 990 | 995 | 990 | | | | | | | | | |
| 120 | 552 | 603 | 863 | 77.2 | 2.414 | | | 1000 | 1000 | 995 | | | | 739 | 597 | 538 | | | |
| 121 | 551 | 602 | 859 | 76.6 | 2.417 | | | 1025 | 1035 | 1040 | | | | 320 | 239 | 290 | | | |
| 122 | 509 | 554 | 812 | 60.4 | 2.369 | | | 1015 | 1030 | 1020 | | | | | | | | | |
| 123 | 558 | 608 | 879.4 | 75 | 2.406 | 0.496 | | | | | 1040 | 1050 | 1050 | | | | 568 | 463 | 463 |
| 124 | | | | | | | | | | | | | | | | | | | |
| 125 | | | | | | | | | | | | | | | | | | | |
| 126 | | | | | | | | | | | | | | | | | | | |
| 127 | | | | | | | | | | | | | | | | | | | |
| 128 | 556 | 607 | | | 2.407 | | | | | | | | | | | | | | |
| 129 | | | | | 2.406 | 0.471 | | | | | 1065 | 1065 | 1065 | | | | 330 | 330 | 330 |
| 130 | | | | | | | | | | | 1050 | 1050 | 1055 | | | | 425 | 425 | 384 |
| 131 | | | | | | | | | | | | | | | | | | | |
| 132 | | | | | | | | | | | | | | | | | | | |
| 133 | 557 | 608 | | | 2.406 | 0.465 | | | | | 1050 | 1055 | 1055 | | | | 439 | 396 | 396 |
| 134 | | | | | | | | | | | 1075 | 1065 | 1070 | | | | 295 | 362 | 327 |
| 135 | | | | | | | | | | | | | | | | | | | |
| 136 | | | | | | | | | | | | | | | | | | | |
| 137 | | | | | | | | | | | 1055 | 1055 | 1050 | | | | 388 | 388 | 431 |
| 138 | 553 | 603 | 867.1 | 75.1 | 2.407 | 0.476 | | | | | | | | | | | | | |
| 139 | | | | | | | | | | | | | | | | | | | |
| 140 | | | | | 2.408 | | | | | | 1045 | 1055 | 1050 | | | | 497 | 406 | 449 |
| 141 | | | | | 2.408 | 0.458 | | | | | 1025 | 1040 | 1040 | | | | 870 | 625 | 625 |
| 142 | | | | | | | | | | | | | | | | | | | |
| 143 | 563 | 614 | | | | | | | | | 1060 | 1065 | 1060 | | | | 407 | 368 | 407 |
| 144 | | | | | | | | | | | 1070 | 1070 | 1075 | | | | 326 | 326 | 295 |
| 145 | | | | | | | | | | | | | | | | | | | |
| 146 | | | | | | | | | | | | | | | | | | | |
| 147 | | | | | | | | | | | | | | | | | | | |
| 148 | | | | | | | | | | | | | | | | | | | |
| 149 | 561 | 613 | | | 2.407 | 0.497 | | | | | 1065 | 1060 | 1060 | | | | 411 | 454 | 454 |
| 150 | | | | | | | | | | | 1070 | 1065 | 1065 | | | | 418 | 462 | 462 |
| 151 | | | | | | | | | | | | | | | | | | | |
| 152 | | | | | | | | | | | | | | | | | | | |
| 153 | 562 | 614 | 889.3 | 76 | 2.414 | 0.424 | | | | | 1075 | 1070 | 1065 | | | | 416 | 459 | 507 |
| 154 | | | | | | | | | | | | | | | | | | | |
| 155 | | | | | | | | | | | | | | | | | | | |
| 156 | | | | | | | | | | | | | | | | | | | |
| 157 | | | | | | | | | | | | | | | | | | | |
| 158 | 563 | 614 | | | 2.415 | 0.441 | | | | | 1075 | 1070 | 1060 | | | | 373 | 412 | 503 |
| 159 | | | | | | | | | | | | | | | | | | | |
| 160 | | | | | | | | | | | | | | | | | | | |
| 161 | | | | | | | | | | | | | | | | | | | |

TABLE X-continued

| Ex. | A | B | To | T200 P | T16 kP | T35 kP | T160 kP | Indentation Threshold 430 | | |
|---|---|---|---|---|---|---|---|---|---|---|
| | | HTV | | | | | | | | |
| 162 | | | | | | | | 238 | 238 | 238 |
| 163 | | | | | | | | 222 | 222 | 203 |
| 164 | 519 | 567 | | | 1070 | 1070 | 1070 | 206 | 188 | 188 |
| 165 | | | | | 1060 | 1060 | 1065 | | | |
| 166 | | | | | 1060 | 1065 | 1065 | | | |
| 167 | | | | | | | | | | |
| 168 | | | 60.3 | 2.383 | 0.498 | | | | | |
| 169 | | | | | | | | | | |
| 170 | 513 | 561 | | 2.368 | 0.554 | 1055 | 1065 | 1045 | 145 | 122 | 174 |
| 116 | | | | | | | | | | |
| 117 | −3.30734265 | 8945.332233 | 54.12027364 | 1649 | 1245 | 1193 | 1105 | | | |
| 118 | −3.943709486 | 10557.79007 | −43.72587969 | 1647 | 1252 | 1200 | 1110 | | | |
| 119 | | | | | | | | | | |
| 120 | | | | | | | | | | |
| 121 | −3.72223712 | 9886.571911 | −5.851457092 | 1636 | 1241 | 1190 | 1102 | | | |
| 122 | −2.953207662 | 8345.482028 | 28.31570186 | 1617 | 1194 | 1141 | 1051 | | | |
| 123 | −3.998970355 | 10607.22174 | −47.53043617 | 1636 | 1246 | 1194 | 1105 | | | |
| 124 | | | | | | | | | | |
| 125 | | | | | | | | | | |
| 126 | | | | | | | | | | |
| 127 | | | | | | | | | | |
| 128 | | | | | | | | | | |
| 129 | −3.662290354 | 9757.207057 | 2.219928775 | 1638 | 1243 | 1191 | 1103 | | | |
| 130 | −3.996576605 | 10658.76698 | −57.44735184 | 1635 | 1242 | 1191 | 1101 | | | |
| 131 | | | | | | | | | | |
| 132 | | | | | | | | | | |
| 133 | −2.838759569 | 7941.917342 | 113.6168048 | 1659 | 1241 | 1189 | 1101 | | | |
| 134 | −2.735780569 | 7667.308512 | 140.612092 | 1663 | 1245 | 1194 | 1106 | | | |
| 135 | | | | | | | | | | |
| 136 | −2.93989907 | 8155.890629 | 98.77631831 | 1655 | 1240 | | | | | |
| 137 | | | | | | | | | | |
| 138 | | | | | | | | | | |
| 139 | | | | | | | | | | |
| 140 | −3.885449585 | 10279.76775 | −27.81773689 | 1634 | 1243 | 1192 | 1103 | | | |
| 141 | −3.164251035 | 8524.185247 | 88.64381053 | 1648 | 1246 | 1194 | 1107 | | | |
| 142 | | | | | | | | | | |
| 143 | −4.025680139 | 10506.38682 | −30.3745192 | 1630 | 1246 | 1196 | 1108 | | | |
| 144 | −3.893817967 | 10158.71538 | −9.860563075 | 1630 | 1245 | 1194 | 1107 | | | |
| 145 | | | | | | | | | | |
| 146 | | | | | | | | | | |
| 147 | | | | | | | | | | |
| 148 | | | | | | | | | | |
| 149 | | | | | | | | | | |
| 150 | | | | | | | | | | |
| 151 | −4.070974917 | 10734.94875 | −43.47341758 | 1641 | 1254 | 1203 | 1114 | | | |
| 152 | −3.982037548 | 10674.56709 | −41.58276344 | 1657 | 1262 | 1210 | 1120 | | | |
| 153 | | | | | | | | | | |
| 154 | | | | | | | | | | |

TABLE X-continued

| | As-made | $T_n$ 620° C. | $T_n$ 630° C. | $T_n$ 640° C. | $T_n$ 660° C. | 675-4 | 700-4 | 725-4 |
|---|---|---|---|---|---|---|---|---|
| 155 | -3.822080075 | | | | | | | |
| 156 | | | | | | | | |
| 157 | | | | | | | | |
| 158 | | | | | | | | |
| 159 | -3.435473834 | 10411.01967 | -27.74613813 | 1673 | 1269 | 1217 | | |
| 160 | | | | | | | | |
| 161 | | 9488.852121 | 21.51967142 | 1676 | 1264 | 1211 | | |
| 162 | -3.715779117 | 10364.57238 | -69.9415823 | 1653 | 1239 | 1185 | | |
| 163 | -3.774518631 | 10532.60088 | -94.74870613 | 1639 | 1225 | 1171 | | |
| 164 | -3.676116288 | 10214.74357 | -76.20201457 | 1633 | 1220 | 1166 | | |
| 165 | | | | | | | | |
| 166 | | | | | | | | |
| 167 | | | | | | | | |
| 168 | | | | | | | | |
| 169 | | | | | | | | |
| 170 | -3.673843809 | 10131.86317 | -91.71249262 | 1604.03264 | 1194.389277 | 1141.187464 | | 1049.524779 |

Color L

| Ex. | 675-4 | 700-4 | 725-4 | 750-4 | 775-4 | 800-4 |
|---|---|---|---|---|---|---|
| | | | | D65 SCE L* | | |
| 116 | | | | | | |
| 117 | | 1.26 | 3.53 | 4.73 | | 23.76 |
| 118 | | 0.44 | 0.62 | 0.94 | | 1.52 |
| 119 | | | | | | |
| 120 | | | | | | |
| 121 | | 20.8 | 7.27 | 12.11 | | 15.69 |
| 122 | | | | | | |
| 123 | | 0.6 | | 13.13 | | |
| 124 | | 0.27 | | 3.42 | | |
| 125 | | 0.57 | | 5.07 | | |
| 126 | | 0.34 | | 6.35 | | |
| 127 | | | | | | |
| 128 | | | | | | |
| 129 | | | | | | |
| 130 | | | | | | |
| 131 | | | | | | |
| 132 | | | | | | |
| 133 | | | | | | |
| 134 | | | | | | |
| 135 | | | | | | |
| 136 | | | | | | |
| 137 | | | | | | |
| 138 | | | | | | |
| 139 | | | | | | |
| 140 | | 0.36 | | 7.63 | | |
| 141 | | 0.38 | | 6.59 | | |
| 142 | | | | | | |
| 143 | | 0.57 | | 5.6 | | |
| 144 | | 0.23 | | 2.12 | | |
| 145 | | | | | | |
| 146 | | | | | | |
| 147 | | | | | | |

TABLE X-continued

| Ex. | As-made | Color a Tn 620°C | Tn 630°C | Tn 640°C | Tn 660°C | 675-4 | 700-4 | 725-4 | 750-4 | 775-4 | 800-4 |
|---|---|---|---|---|---|---|---|---|---|---|---|
| 148 | | | | | | | | | | | |
| 149 | | | | | | | | | | | |
| 150 | | | | | | | | | | | |
| 151 | | | 0.53 | 0.34 | | | 0.2 | | 2.85 | | |
| 152 | | | 0.14 | 0.17 | | | 0.46 | | 1.76 | | |
| 153 | | | 0.41 | 0.19 | | | | | | | |
| 154 | | | | | | | | | | | |
| 155 | | | | | | | 0.3 | | 0.98 | | |
| 156 | | | | | | | | | | | |
| 157 | | | | | | | | | | | |
| 158 | | | | | | | | | | | |
| 159 | | | | | | | 0.41 | | 2.66 | | |
| 160 | | | | | | | | | | | |
| 161 | | | | | | 0.22 | | | | | |
| 162 | | | | | | 0.2 | 0.205 | | 1.93 | | |
| 163 | | | | | | 0.24 | 0.205 | | 3 | | |
| 164 | | | | | | | 0.7 | | | | |
| 165 | | | | | | | | | | | |
| 166 | | | | | | | | | | | |
| 167 | 0.27 | | 0.72 | 0.69 | 1.51 | | | | | | |
| 168 | 0.38 | | 1.2 | 0.86 | 1.52 | | | | | | |
| 169 | 0.28 | | 0.71 | 0.67 | 1.43 | | | | | | |
| 170 | 0.51 | | 0.76 | 1.13 | 2.14 | 3.28 | 13.82 | | | | |

| Ex. | D65 SCE a* 675-4 | 700-4 | 725-4 | 750-4 | 775-4 | 800-4 |
|---|---|---|---|---|---|---|
| 116 | | | | | | |
| 117 | | 0.15 | −0.11 | −0.49 | | −1.88 |
| 118 | | 0.09 | 0.05 | 0.01 | | 0.08 |
| 119 | | | | | | |
| 120 | | | | | | |
| 121 | | 12.86 | −0.14 | −0.05 | | −0.4 |
| 122 | | | | | | |
| 123 | | −0.03 | | −0.99 | | |
| 124 | | 0.01 | | −0.14 | | |
| 125 | | 0.03 | | −0.28 | | |
| 126 | | 0.06 | | −0.67 | | |
| 127 | | | | | | |
| 128 | | | | | | |
| 129 | | | | | | |
| 130 | | | | | | |
| 131 | | | | | | |
| 132 | | | | | | |
| 133 | | | | | | |
| 134 | | | | | | |
| 135 | | | | | | |
| 136 | | | | | | |
| 137 | | | | | | |
| 138 | | | | | | |
| 139 | | | | | | |

TABLE X-continued

| Ex. | Color b | | | | | | | | | | |
|---|---|---|---|---|---|---|---|---|---|---|---|
| | As-made | T$_n$ 620° C. | T$_n$ 630° C. | T$_n$ 640° C. | T$_n$ 660° C. | 675-4 | 700-4 | 725-4 | 750-4 | 775-4 | 800-4 |
| 140 | | | | | | | -0.01 | | -0.5 | | |
| 141 | | | | | | | -0.06 | | -0.45 | | |
| 142 | | | | | | | | | | | |
| 143 | | | | | | | 0.01 | | -0.29 | | |
| 144 | | | | | | | -0.01 | | -0.1 | | |
| 145 | | | | | | | | | | | |
| 146 | | | | | | | | | | | |
| 147 | | | | | | | | | | | |
| 148 | | | | | | | | | | | |
| 149 | | | | | | | | | | | |
| 150 | | | | | | | | | | | |
| 151 | | | | | | | 0 | | 0.08 | | |
| 152 | | | | | | | -0.08 | | -0.15 | | |
| 153 | | | | | | | | | | | |
| 154 | | | | | | | | | | | |
| 155 | | | | | | | 0 | | -0.01 | | |
| 156 | | | | | | | | | | | |
| 157 | | | | | | | | | | | |
| 158 | | | | | | | | | | | |
| 159 | | | | | | | -0.11 | | -0.1 | | |
| 160 | | | | | | | | | | | |
| 161 | -0.03 | | | | | | -0.05 | | -0.14 | | |
| 162 | 0.04 | 0 | 0.35 | 0.7 | | | -0.04 | | -0.16 | | |
| 163 | 0.07 | -0.02 | 0 | -0.03 | | | -0.09 | | | | |
| 164 | -0.1 | -0.05 | -0.05 | -0.13 | | | | | | | |
| 165 | | -0.01 | | | | | | | | | |
| 166 | | | | | | | | | | | |
| 167 | | | -0.01 | -0.08 | | -0.07 | | | | | |
| 168 | | | 0 | -0.15 | | -0.1 | | | | | |
| 169 | | | -0.02 | -0.09 | | -0.04 | | | | | |
| 170 | | | -0.03 | 3.41 | -0.03 | -0.69 | | | | | |

| Ex. | D65 SCE b* | | | | |
|---|---|---|---|---|---|
| | 700-4 | 725-4 | 750-4 | 775-4 | 800-4 |
| 116 | -1.34 | -4.65 | -5.72 | | -3.94 |
| 117 | -0.28 | -0.63 | -1.42 | | -2.33 |
| 118 | | | | | |
| 119 | | | | | |
| 120 | | -3.97 | -3.45 | | -3.34 |
| 121 | 25.58 | | | | |
| 122 | | | | | |
| 123 | -1.04 | | -7.5 | | |
| 124 | -0.78 | | -4.28 | | |
| 125 | -1.1 | | -5.9 | | |
| 126 | -0.73 | | -6.25 | | |
| 127 | | | | | |
| 128 | | | | | |
| 129 | | | | | |
| 130 | | | | | |
| 131 | | | | | |
| 132 | | | | | |

TABLE X-continued

| | | | | | | | | | |
|---|---|---|---|---|---|---|---|---|---|
| 133 | | | | | | | | | |
| 134 | | | | | | | | | |
| 135 | | | | | | | | | |
| 136 | | | | | | | | | |
| 137 | | | | | | | | | |
| 138 | | | | | | | | | |
| 139 | | | | | | | | | |
| 140 | | | | | | | | −0.63 | −3.62 |
| 141 | | | | | | | | −0.36 | −3.44 |
| 142 | | | | | | | | −0.36 | −2.93 |
| 143 | | | | | | | | −0.43 | −2.96 |
| 144 | | | | | | | | | |
| 145 | | | | | | | | | |
| 146 | | | | | | | | | |
| 147 | | | | | | | | | |
| 148 | | | | | | | | | |
| 149 | | | | | | | | | |
| 150 | | | | | | | | −0.18 | −2.19 |
| 151 | | | | | | | | −0.25 | −1.87 |
| 152 | | | | | | | | | |
| 153 | | | | | | | | | |
| 154 | | | | | | | | −0.29 | −1.32 |
| 155 | | | | | | | | | |
| 156 | | | | | | | | | |
| 157 | | | | | | | | | |
| 158 | | | | | | | | −0.31 | −2.86 |
| 159 | | | | | | | | | |
| 160 | | | | | | | | | |
| 161 | −0.48 | −0.27 | | | | | 0.07 | −0.1 | −2.48 |
| 162 | −0.32 | −0.36 | | | | | 0.02 | −0.15 | −3.05 |
| 163 | −0.45 | −0.42 | | −0.03 | | | −0.11 | −1.02 | |
| 164 | −0.53 | | | −0.36 | | | | | |
| 165 | | | | −0.09 | | | | | |
| 166 | | | | | | | | | |
| 167 | | | −0.6 | | −0.72 | −0.81 | −1.6 | −0.47 | |
| 168 | | | −0.85 | | −0.93 | −0.84 | | | |
| 169 | | | −0.66 | | −0.81 | −0.85 | | | |
| 170 | | | −0.78 | | −0.87 | 1.03 | | | |

Accordingly, various modifications, adaptations, and alternatives may occur to one skilled in the art without departing from the spirit and scope of this disclosure. It should be understood that all such modifications and improvements have been deleted herein for the sake of conciseness and readability but are properly within the scope of the following claims.

What is claimed is:

1. A glass-ceramic comprising:
    greater than 0 wt % and less than about 20 wt % of one or more crystalline phases, and
    a compressive stress of at least about 200 MPa and a depth of layer of at least about 15 µm,
    wherein at least one crystalline phase comprises a plurality of crystallites in the $Fe_2O_3$—$TiO_2$—MgO system, and the crystallites comprise at least one of:
        MgO in an amount in the range from about 5 mol % to about 50 mol %, and
        $Fe_2O_3$ in an amount in the range from about 15 mol % to about 65 mol %.

2. The glass-ceramic of claim 1, wherein the glass ceramic exhibits any one of:
    an edge strength, as measured by 4-point bend of at least about 700 MPa, an flexural strength, as measured by ring-on-ring testing, of about 2000 N or greater, and
    an flexural strength, as measured by abraded ring-on-ring testing, of about 1000 N or greater.

3. The glass-ceramic of claim 1, wherein the glass ceramic exhibits an edge strength, as measured by 4-point bend of at least about 700 MPa.

4. The glass-ceramic of claim 1, wherein the glass ceramic exhibits an flexural strength, as measured by ring-on-ring testing, of about 2000 N or greater.

5. The glass-ceramic of claim 1, wherein the glass ceramic exhibits an flexural strength, as measured by abraded ring-on-ring testing, of about 1000 N or greater.

6. The glass-ceramic of claim 1, wherein the crystallites comprise MgO in an amount in the range from about 5 mol % to about 50 mol %.

7. The glass-ceramic of claim 1, wherein the crystallites comprise $Fe_2O_3$ in an amount in the range from about 15 mol % to about 65 mol %.

8. The glass-ceramic of claim 1, wherein the crystallites comprise $TiO_2$ in an amount in the range from about 25 mol % to about 45 mol %.

9. The glass-ceramic of claim 1, wherein the glass-ceramic comprises a color presented in CIELAB color space coordinates for CIE illuminant D65 determined from reflectance spectra measurements using a spectrophotometer with SCE of the following ranges:
    L*=from about 14 to about 30;
    a*=from about −1 to about +3; and
    b*=from about −7 to about +3.

10. The glass-ceramic of claim 1, wherein the plurality of crystallites form an area fraction of about 15% or less.

11. The glass-ceramic of claim 1, wherein the crystallites comprise at least one of magnetite, pseudobrookite, or ε-$Fe_2O_3$.

12. The glass-ceramic of claim 1, wherein the one or more crystalline phases comprises one or more ε-$Fe_2O_3$ crystallites.

13. The glass-ceramic of claim 1, wherein the one or more crystalline phases comprises a solid solution of ε-$Fe_2O_3$ and $MgTiO_3$.

14. The glass-ceramic of claim 1, wherein the one or more crystalline phases comprises a solid solution of MgO, $TiO_2$, and $Fe_2O_3$.

15. The glass-ceramic of claim 1, wherein the ratio of $TiO_2$:$Fe_2O_3$ is in the range from about 0.1 to about 3.

16. The glass-ceramic of claim 1, comprising, on an oxide basis, in mol %:
    $SiO_2$ in the range from about 50 to about 76;
    $Al_2O_3$ in the range from about 4 to about 25;
    $P_2O_5$+$B_2O_3$ in the range from about 0 to about 14;
    $Fe_2O_3$ in the range from about 0.25 to about 5;
    $R_2O$ in the range from about 2 to about 20, wherein $R_2O$ includes one or more of $Li_2O$, $Na_2O$, $K_2O$, $Rb_2O$, $Cs_2O$, $Cu_2O$, and $Ag_2O$;
    one or more nucleating agents in the range from about 0 to about 5;
    RO in the range from about 0 to about 20, wherein RO includes one or more of MgO, CaO, SrO, BaO, and ZnO; and
    at least one of the compositional relationships of:
        $R_2O$-$Al_2O_3$ in the range from about −2 to about 3; and
        $R_2O$+RO-$Al_2O_3$ in the range from about −2 to about 5,
    wherein the crystalline phases comprise a plurality of crystallites in the $Fe_2O_3$—$TiO_2$—MgO system and having an area fraction of about 10% or less.

17. The glass-ceramic of claim 16, wherein the one or more nucleating agents comprises $TiO_2$.

18. The glass-ceramic of claim 16, wherein the composition comprises, on an oxide basis, in mol %:
    $SiO_2$ in an amount in the range from about 58 to about 72;
    $Al_2O_3$ in an amount in the range from about 8 to about 20;
    $B_2O_3$ in an amount in the range from about 0 to about 12;
    $R_2O$ in an amount in the range from about 2 to about 20;
    RO in an amount in the range from about 0 to about 10;
    $SnO_2$ in an amount in the range from about 0 to about 0.5;
    $TiO_2$ in an amount in the range from about 0.25 to about 5;
    $Fe_2O_3$ in an amount in the range from about 0.25 to about 5; and
    at least one of the compositional relationships of:
        $R_2O$—$Al_2O_3$ in the range from about −2 to about 3; and
        $R_2O$+RO—$Al_2O_3$ in the range from about −2 to about 5.

19. An electronic device comprising the glass-ceramic of claim 1.

20. A light emitting device comprising a display cover, wherein the display cover comprises the glass-ceramic of claim 1.

21. A glass-ceramic comprising:
    greater than 0 wt % and less than about 20 wt % of one or more crystalline phases, and
    a compressive stress of at least about 200 MPa and a depth of layer of at least about 15 µm,
    wherein at least one crystalline phase comprises a plurality of crystallites in the $Fe_2O_3$—$TiO_2$—MgO system, and the one or more crystalline phases comprises a solid solution of MgO, $TiO_2$, and $Fe_2O_3$.

22. A glass-ceramic comprising:
    greater than 0 wt % and less than about 20 wt % of one or more crystalline phases, and
    a compressive stress of at least about 200 MPa and a depth of layer of at least about 15 µm,
    wherein at least one crystalline phase comprises a plurality of crystallites in the $Fe_2O_3$—$TiO_2$—MgO system, and the one or more crystalline phases comprises one or more ε-$Fe_2O_3$ crystallites.

* * * * *

UNITED STATES PATENT AND TRADEMARK OFFICE
CERTIFICATE OF CORRECTION

PATENT NO. : 11,407,679 B2
APPLICATION NO. : 16/834187
DATED : August 9, 2022
INVENTOR(S) : David Eugene Baker et al.

It is certified that error appears in the above-identified patent and that said Letters Patent is hereby corrected as shown below:

On the Title Page

On the page 2, in Column 2, under "Other Publications", Line 13, delete "strenghtening" and insert -- strengthening --.

On the page 2, in Column 2, under "Other Publications", Line 17, delete "Signitures" and insert -- Signatures --.

On the page 2, in Column 2, under "Other Publications", Line 23, delete "H?land" and insert -- Holand --.

On the page 2, in Column 2, under "Other Publications", Line 32, delete "e-Fe2O3" and insert -- $\varepsilon\text{-}Fe_2O_3$ --.

On the page 2, in Column 2, under "Other Publications", Line 41, delete "e-Fe2O3"" and insert -- $\varepsilon\text{-}Fe_2O_3$" --.

On the page 2, in Column 2, under "Other Publications", Line 45, delete "Fe2O3" and insert -- $Fe_2O_3$ --.

On the page 2, in Column 2, under "Other Publications", Line 46, delete "TiO2"" and insert -- $TiO_2$" --.

On the page 2, in Column 2, under "Other Publications", Line 49, delete "e-Fe2O3,"" and insert -- $\varepsilon\text{-}Fe_2O_3$," --.

On the page 2, in Column 2, under "Other Publications", Line 52, delete "TiO2" and insert -- $TiO_2$ --.

On the page 2, in Column 2, under "Other Publications", Line 55, delete "Chem" and insert -- Chem. --.

Signed and Sealed this
Eighteenth Day of October, 2022

*Katherine Kelly Vidal*
*Director of the United States Patent and Trademark Office*